US011823447B2

(12) United States Patent
Ogawa

(10) Patent No.: US 11,823,447 B2
(45) Date of Patent: Nov. 21, 2023

(54) INFORMATION PROCESSING APPARATUS, INFORMATION PROCESSING METHOD, PROGRAM, AND INFORMATION PROCESSING SYSTEM

(71) Applicant: Sony Group Corporation, Tokyo (JP)

(72) Inventor: Tetsu Ogawa, Tokyo (JP)

(73) Assignee: Sony Group Corporation, Tokyo (JP)

(*) Notice: Subject to any disclaimer, the term of this patent is extended or adjusted under 35 U.S.C. 154(b) by 674 days.

(21) Appl. No.: 16/756,999

(22) PCT Filed: Sep. 6, 2018

(86) PCT No.: PCT/JP2018/032993
§ 371 (c)(1),
(2) Date: Apr. 17, 2020

(87) PCT Pub. No.: WO2019/082519
PCT Pub. Date: May 2, 2019

(65) Prior Publication Data
US 2021/0201025 A1    Jul. 1, 2021

(30) Foreign Application Priority Data
Oct. 26, 2017  (JP) ................. 2017-206815

(51) Int. Cl.
*G06V 20/10* (2022.01)
*G06T 7/00* (2017.01)
(Continued)

(52) U.S. Cl.
CPC .............. *G06V 20/188* (2022.01); *G06T 5/50* (2013.01); *G06T 7/97* (2017.01); *G06V 10/143* (2022.01);
(Continued)

(58) Field of Classification Search
CPC .... G06V 20/188; G06V 10/44; G06V 20/194; G06V 10/58; G06T 7/97; G06T 5/50; G06T 2207/10036; G06T 2207/30188
See application file for complete search history.

(56) References Cited

U.S. PATENT DOCUMENTS 6,160,902 A * 12/2000 Dickson ................ G01J 3/2803
382/110
6,366,681 B1 * 4/2002 Hutchins ................ G06V 20/13
382/110
(Continued)

FOREIGN PATENT DOCUMENTS

JP    08-159762 A    6/1996
JP    2006-085517 A    3/2006
(Continued)

OTHER PUBLICATIONS

Maselli et al., "Integration of High and Low Resolution NDVI Data for Monitoring Vegetation in Mediterranean Environments" (pp. 208-218) (Year: 1997).*
(Continued)

*Primary Examiner* — Manav Seth
(74) *Attorney, Agent, or Firm* — Michael Best & Friedrich LLP

(57) ABSTRACT

There is achieved short-time measurement of a measurement target such as a farm field with high accuracy. Therefore, processing is performed on a sampling image obtained by the imaging of a part of a range as a measurement target with a multi spectrum camera that performs imaging to capture images in a plurality of different wavelength bands. Then, arithmetic processing is performed on the sampling image as a processing target to generate a calculation result image serving as evaluation information for the entire measurement target.

18 Claims, 41 Drawing Sheets

(51) Int. Cl.
*G06T 5/50* (2006.01)
*G06V 10/143* (2022.01)
*G06V 10/26* (2022.01)
*G06V 10/58* (2022.01)

(52) U.S. Cl.
CPC .. *G06V 10/267* (2022.01); *G06T 2207/10036* (2013.01); *G06T 2207/30188* (2013.01); *G06V 10/58* (2022.01); *G06V 20/194* (2022.01)

(56) References Cited

U.S. PATENT DOCUMENTS

| | | | | |
|---|---|---|---|---|
| 6,608,931 | B2 * | 8/2003 | Sunshine | G06F 18/2134 |
| | | | | 382/274 |
| 7,058,197 | B1 * | 6/2006 | McGuire | G06V 20/188 |
| | | | | 382/108 |
| 7,400,770 | B2 * | 7/2008 | Keaton | G06V 20/13 |
| | | | | 382/191 |
| 8,680,994 | B2 * | 3/2014 | Leppanen | G06V 20/188 |
| | | | | 340/2.81 |
| 9,230,170 | B2 * | 1/2016 | Naganuma | G06V 20/188 |
| 9,495,597 | B2 * | 11/2016 | Hundley | H04N 23/11 |
| 2001/0016053 | A1 * | 8/2001 | Dickson | G06T 7/90 |
| | | | | 382/110 |
| 2015/0254800 | A1 * | 9/2015 | Johnson | G06V 20/188 |
| | | | | 382/141 |
| 2017/0084039 | A1 * | 3/2017 | Ritter | G06T 7/62 |
| 2017/0228118 | A1 * | 8/2017 | Sugumaran | G01N 33/0098 |
| 2023/0005261 | A1 * | 1/2023 | Kolodner | G06V 20/194 |

FOREIGN PATENT DOCUMENTS

| | | | |
|---|---|---|---|
| JP | 2010086276 A | 4/2010 | |
| JP | 4903469 B2 | 3/2012 | |
| JP | 2016110292 A | 6/2016 | |
| WO | WO-2010144877 A1 * | 12/2010 | ......... G06K 9/00657 |

OTHER PUBLICATIONS

Wang et al., "On the relationship of NDVI with leaf area index in a deciduous forest site" (pp. 244-255) (Year: 2004).*
Australian Office Action dated Oct. 22, 2020 for corresponding Australian Application No. 2018357616.

* cited by examiner

FIG. 4
A
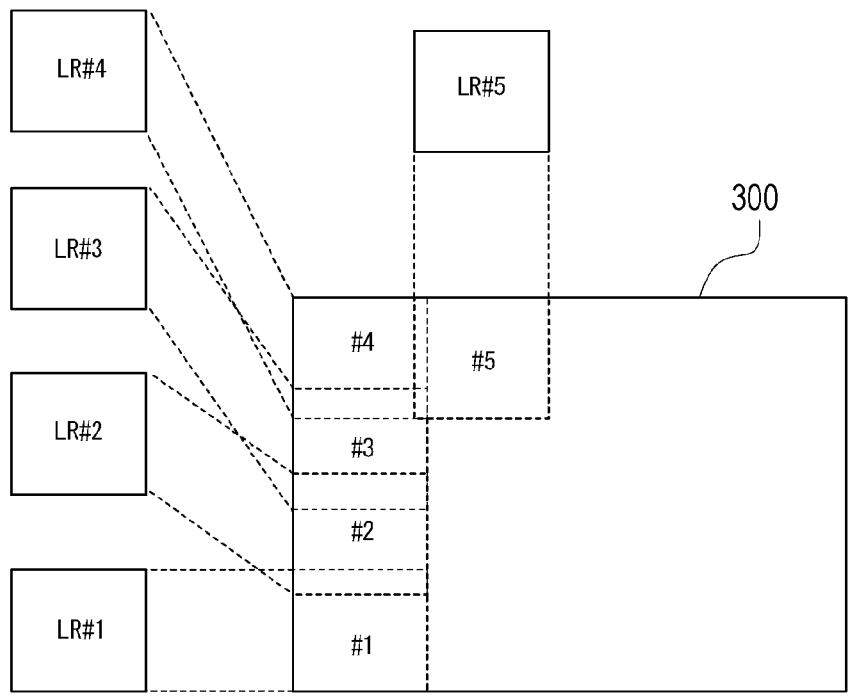
B
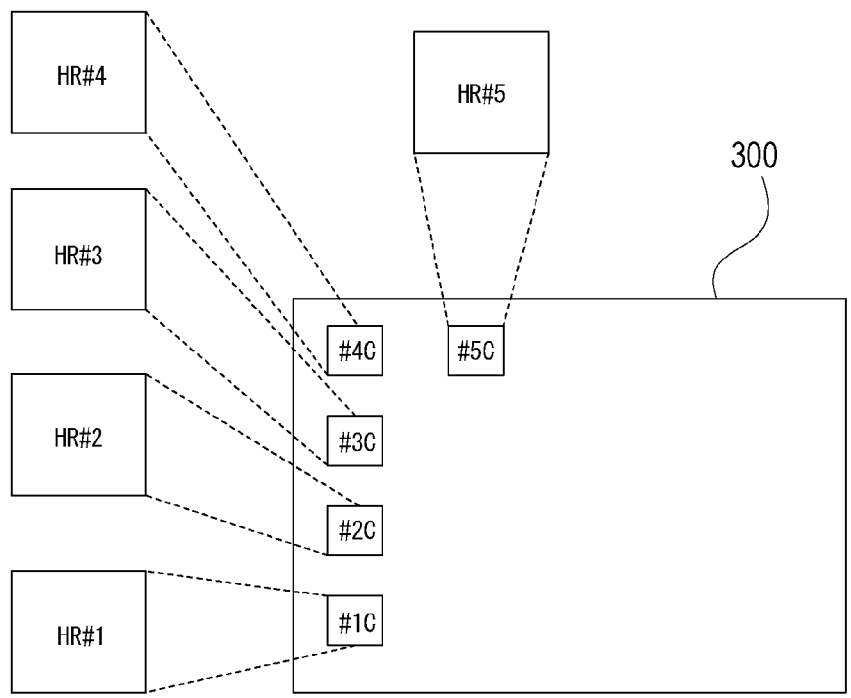

FIG. 30

| SETTING PATTERNS OF RANGE | EXAMPLES OF SETTING VALUE | EXAMPLES OF VEGETATION INDEX |
|---|---|---|
| CERTAIN VALUE OR LESS | 0.3 OR LESS | PRI (WHEN DEFINED AS R531 − R570) |
| CERTAIN VALUE OR MORE | 0.3 OR MORE | PRI (WHEN DEFINED AS R570 − R531) |
| WITHIN CERTAIN RANGE | WITHIN RANGE OF 0.70 TO 0.85 | NDVI |
| OUT OF CERTAIN RANGE | OUT OF RANGE OF 0.70 TO 0.85 | NDVI |

FIG. 32
A  EXAMPLE OF RESULT OF FIRST SAMPLING INSPECTION
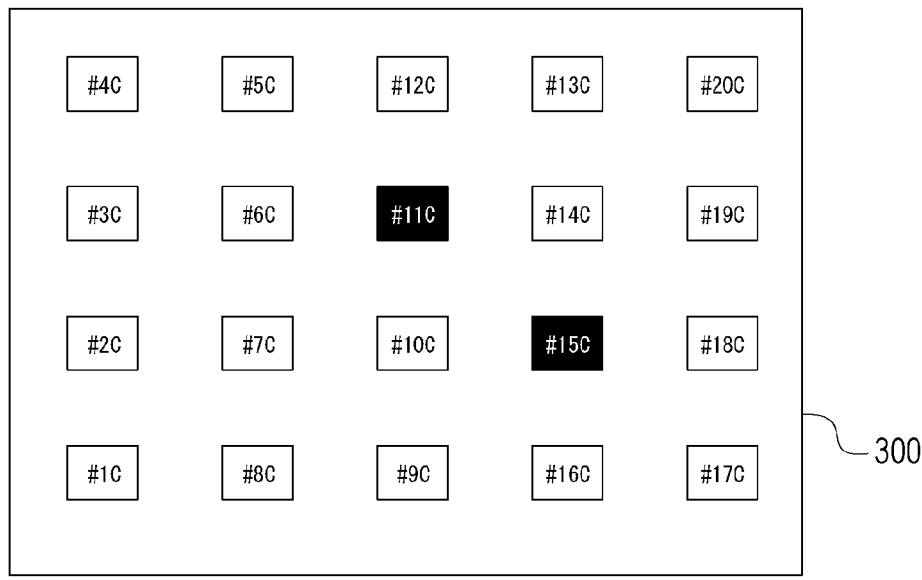
B  CREATION OF SECOND FLIGHT PLAN
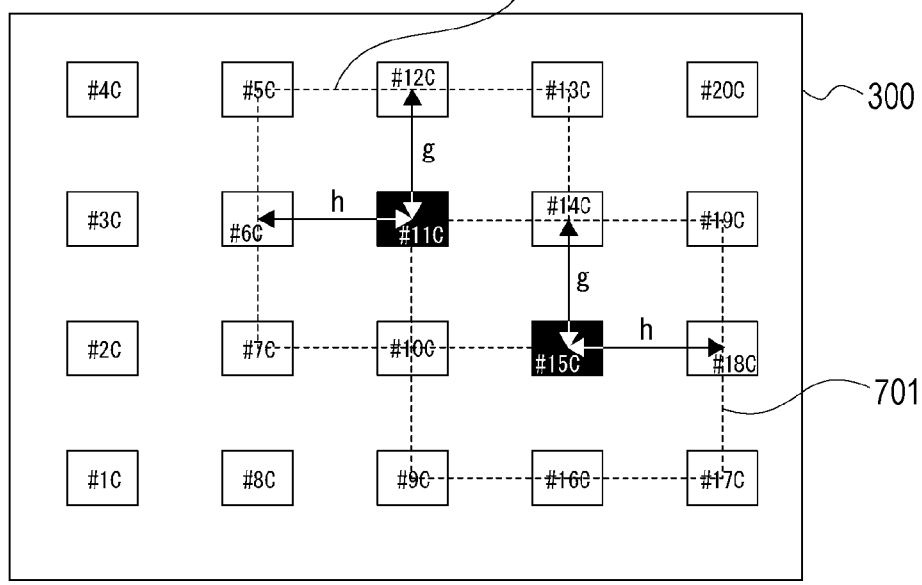

FIG. 34
A   EXAMPLE OF RESULT OF FIRST SAMPLING INSPECTION
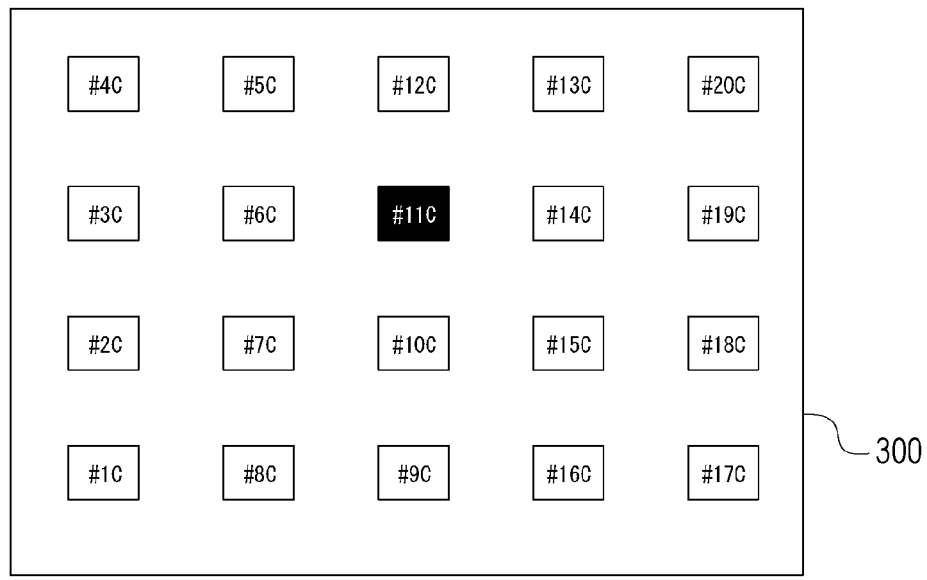
B   CREATION OF SECOND FLIGHT PLAN   702
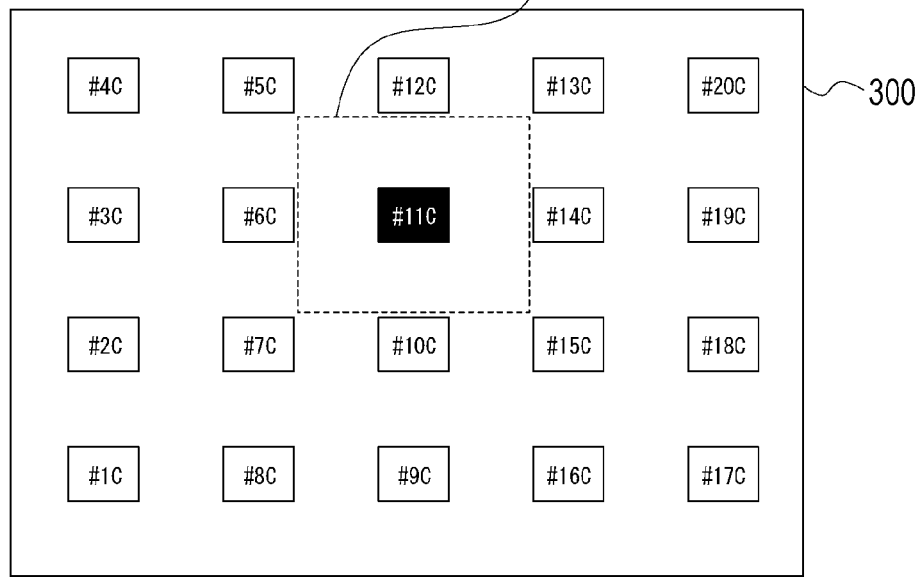

FIG. 35
A EXAMPLE OF RESULT OF SECOND FLIGHT
(ABNORMAL POINT HAS BEEN NEWLY FOUND)
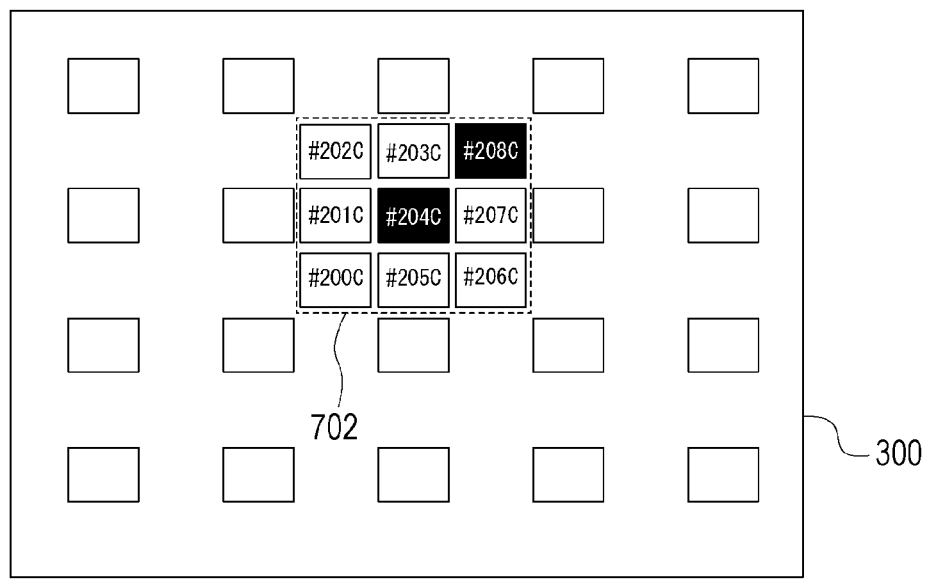
B CREATION OF THIRD FLIGHT PLAN
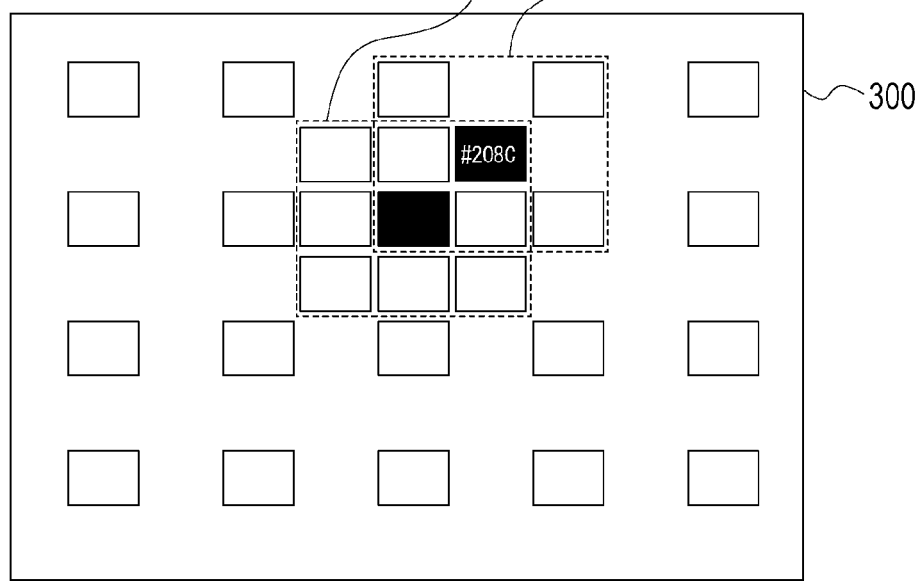

FIG. 36
A  EXAMPLE OF RESULT OF THIRD FLIGHT
(ABNORMAL POINT HAS BEEN NEWLY FOUND)
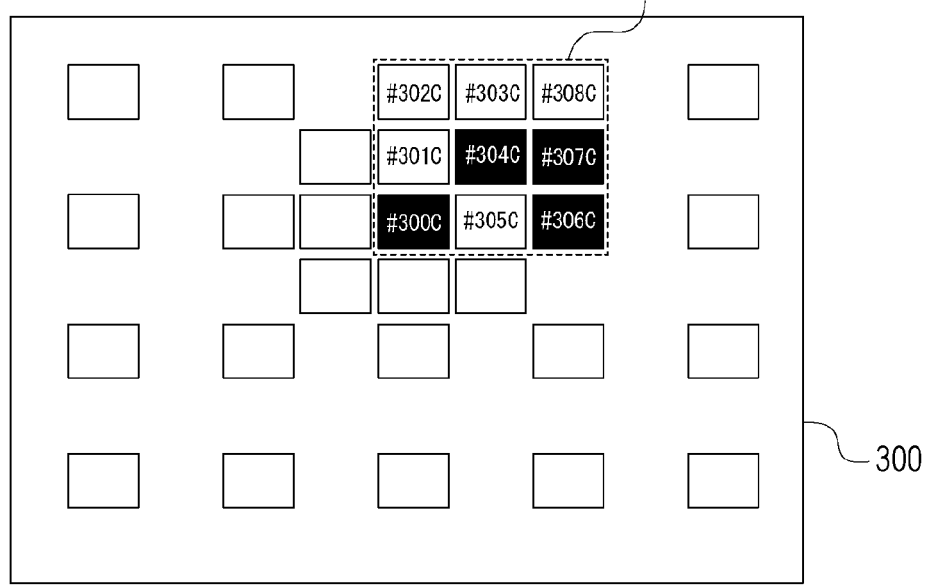
B  CREATION OF FOURTH FLIGHT PLAN
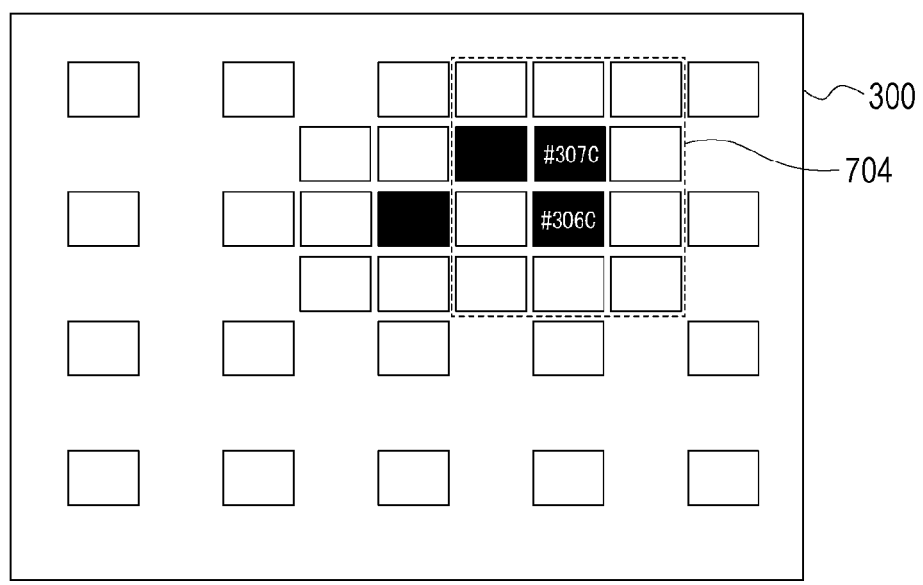

FIG. 37
A  EXAMPLE OF RESULT OF FOURTH FLIGHT
(ABNORMAL POINT HAS BEEN NEWLY FOUND)
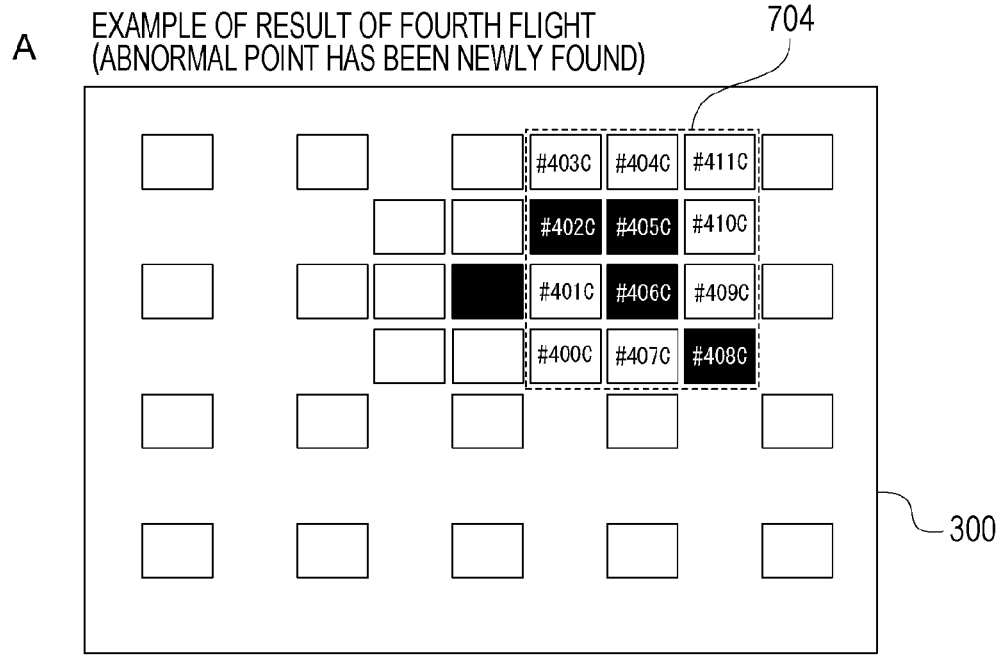
B  CREATION OF FIFTH FLIGHT PLAN
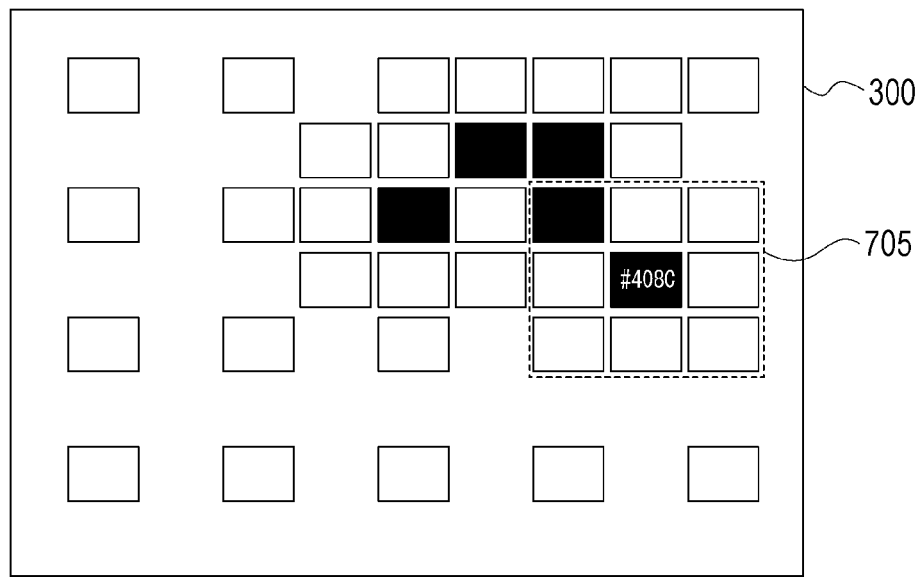

INFORMATION PROCESSING APPARATUS, INFORMATION PROCESSING METHOD, PROGRAM, AND INFORMATION PROCESSING SYSTEM

TECHNICAL FIELD

The present technology relates to an information processing apparatus, an information processing method, a program, and an information processing system, and particularly relates to technology suitable for generating the result of evaluation of a measurement target such as a vegetation state.

BACKGROUND ART

The following techniques are known as techniques for generating desired information by using an image captured by a camera.

Patent Document 1 below discloses a technique for collecting basic data by shooting a video while moving and performing image processing thereof to obtain height data.

Patent Document 2 below describes a forest region vegetation classification method based on satellite data, as follows. Upper and lower limits or a threshold value is set for measurement values at each wavelength according to tree species. Then, there are created tree species target extraction maps, the number of which corresponds to the number of tree species. In addition, the normalized difference vegetation index of a region to be surveyed is generated. Then, a mask process is performed on the tree species target extraction maps by use of the vegetation index. Thus, a mountain forest part or tree species distribution is extracted.

Patent Document 3 below describes a method for detecting a defect in a semiconductor wafer by scanning the semiconductor wafer in a direction different from a longitudinal direction of wire to detect an element having a defect and then scanning the semiconductor wafer along the longitudinal direction.

CITATION LIST

Patent Document

Patent Document 1: Japanese Patent Application Laid-Open No. 8-159762
Patent Document 2: Japanese Patent Application Laid-Open No. 2006-85517
Patent Document 3: Japanese Patent No. 4903469

SUMMARY OF THE INVENTION

Problems to be Solved by the Invention

For example, there is an approach to performing remote sensing of a vegetation state by mounting an imaging device on a small flight vehicle and imaging the vegetation state of plants while moving over a farm field.

As a result of generating an evaluation result of a vegetation state or the like by using an image captured by the camera in this manner, it is possible to efficiently perform observation over a wide range.

Here, in a case where high-precision observation is desired, it is conceivable that higher-resolution imaging is performed. However, performing high-resolution imaging over a wide range such as a farm field causes a deterioration in measurement efficiency.

An object of the present technology is to enable highly accurate measurement to be efficiently performed in a case where a measurement target is imaged and observed.

Solutions to Problems

An information processing apparatus according to the present technology includes a calculation unit that performs arithmetic processing on a sampling image, as a processing target, obtained by imaging of a part of a measurement target with a multi spectrum camera, and generates a calculation result image serving as evaluation information for the measurement target.

A multi spectrum camera that captures a multispectral image in which electromagnetic waves of different wavelength bands are recorded is used to perform sampling imaging of at least a part of the entire range of the measurement target. For example, the entire measurement target area is divided into a plurality of sections, and an image of a part of the range of each section is captured by the multi spectrum camera. The information processing apparatus performs necessary arithmetic processing on a sampling image, as a processing target, obtained by such sampling imaging, and generates a calculation result image serving as one of measurement results.

Note that the multi spectrum camera mentioned in the present specification collectively refers to cameras that can capture images in a plurality of wavelength bands. Examples of the multi spectrum camera also include cameras called hyper spectrum cameras in addition to cameras commonly referred to as multi spectrum cameras.

In the above-described information processing apparatus according to the present technology, it is conceivable that the calculation unit includes a filtering generation unit that generates a filter image that can be used for a filtering process, by using the sampling image.

The filter image is an image showing a part with specific composition or a specific state, and is an image corresponding to information serving as a filter when filtering is performed. In other words, it can also be said that the filter image corresponds to a filtering condition. That is, the calculation unit uses one or more of the sampling images as processing targets to generate a filter image for generating a calculation result image representing a measurement result.

In the above-described information processing apparatus according to the present technology, it is conceivable that the calculation unit includes an evaluation index calculation unit that generates an evaluation index image by using the sampling image.

The evaluation index is obtained as one of evaluations of the measurement target. Examples of the evaluation index include a vegetation index and the like. The evaluation index image is an image representing a vegetation index or the like for each pixel.

In the above-described information processing apparatus according to the present technology, it is conceivable that the evaluation index image is a vegetation index image representing a vegetation index.

There is generated an image representing, for example, NDVI and the like as a vegetation index.

In the above-described information processing apparatus according to the present technology, it is conceivable that the calculation unit includes: an evaluation index calculation unit that generates an evaluation index image by using the sampling image; and a filtering generation unit that generates a filter image that can be used for a filtering process, by using the evaluation index image.

A filter image (an image corresponding to a filtering condition) is generated by use of an image (evaluation index image) representing an evaluation index (for example, a vegetation index).

In the above-described information processing apparatus according to the present technology, it is conceivable that the calculation unit includes: an evaluation index calculation unit that generates an evaluation index image by using the sampling image; and a filtering generation unit that generates a filter image that can be used for a filtering process, by using a filter image generated by use of the sampling image and a filter image generated by use of the evaluation index image.

That is, a filter image is generated by use of a plurality of filter images.

In the above-described information processing apparatus according to the present technology, it is conceivable that the calculation unit includes: a filtering generation unit that generates a filter image that can be used for a filtering process; and a filtering execution unit that generates a filtering result image by using the filter image.

That is, filtering is performed according to a condition represented by the filter image (image corresponding to the filtering condition) to generate a filtering result image.

In the above-described information processing apparatus according to the present technology, it is conceivable that the calculation unit includes: an evaluation index calculation unit that generates an evaluation index image by using the sampling image; a filtering generation unit that generates a filter image that can be used for a filtering process; and a filtering execution unit that generates a filtering result image of the evaluation index image by using the filter image.

That is, filtering is performed on the evaluation index image (for example, a vegetation index image) according to a condition represented by the filter image (image corresponding to a filtering condition) to generate a filtering result image.

In the above-described information processing apparatus according to the present technology, it is conceivable that the calculation unit includes: an evaluation index calculation unit that generates an evaluation index image by using the sampling image; a filtering generation unit that generates a filter image that can be used for a filtering process; a filtering execution unit that generates a filtering result image of the evaluation index image by using the filter image; and a presentation image generation unit that generates a presentation image by using the filtering result image.

The filtering result image is obtained by extraction of pixels from an image before filtering according to a condition represented by a filter image, and may not be suitable to be visually recognized by a person (an evaluation result may be difficult to understand) in some cases. Therefore, an image is generated in a state suitable for presentation to a person.

In the above-described information processing apparatus according to the present technology, it is conceivable that the presentation image generation unit divides the filtering result image into areas, and generates a presentation image in which each area has been color-mapped.

The filtering result image is divided into a plurality of areas, and a color is assigned to each area. Thus, a presentation image is generated.

In the above-described information processing apparatus according to the present technology, it is conceivable that the presentation image generation unit divides the filtering result image into areas, and generates a presentation image color-mapped by use of a representative value of each area.

The representative value refers to an average value, a maximum value, a minimum value, a centroid value, a mode value, or the like of the area.

In the above-described information processing apparatus according to the present technology, it is conceivable that the presentation image generation unit divides the filtering result image into areas, and generates a presentation image by combining an image in which each area has been color-mapped and another image.

For example, an image in which a color has been assigned to each area and another image are combined in the form of, for example, overlay, overwriting, or the like.

In the above-described information processing apparatus according to the present technology, it is conceivable that the another image is any of the sampling image, the evaluation index image, the filter image, or the filtering result image.

An image in which a color has been assigned to each area and a sampling image or the like are combined in the form of, for example, overlay or overwriting.

In the above-described information processing apparatus according to the present technology, it is conceivable that the calculation unit further includes an image composition unit that combines a low-resolution image and the presentation image, the low-resolution image being obtained by imaging of the measurement target, as an image lower in resolution than the sampling image.

The presentation image is generated from a filtering result image, and the filtering result image is based on a sampling image. That is, the presentation image is based not on an image of the entire measurement target, but on an image of a part of the measurement target. Therefore, a presentation image is combined with a low-resolution image obtained by the imaging of a wider range than the sampling image.

In the above-described information processing apparatus according to the present technology, it is conceivable that the image composition unit performs image composition by using correspondence information that associates a presentation image with the low-resolution image obtained by imaging of a range including a sampling image that is a source of the presentation image.

In a composition process, a presentation image for an imaging range of a sampling image is combined with a low-resolution image obtained by the imaging of a wider range including the imaging range of the sampling image. Therefore, the presentation image and the low-resolution image are combined by use of the correspondence information representing correspondence relationships such as information on an imaging position, information on imaging time, and the like.

In the above-described information processing apparatus according to the present technology, it is conceivable that the image composition unit performs composition in which the presentation image is disposed at a position corresponding to an imaging range of a sampling image that is a source of the presentation image in the low-resolution image.

For example, in the composition process, a sampling image is overlaid or overwritten with a presentation image in a low-resolution image. In this case, the presentation image is disposed at the position corresponding to the imaging range of the sampling image in the low-resolution image. In other words, the presentation image and the low-resolution image are aligned and pasted together.

In the above-described information processing apparatus according to the present technology, it is conceivable that the image composition unit performs composition such that a representative value of the presentation image is reflected in the low-resolution image.

The representative value of a presentation image refers to an average value, a maximum value, a minimum value, a centroid value, a mode value, or the like of the presentation image. Composition is performed such that the representative value of the presentation image is represented on the low-resolution image.

An information processing method according to the present technology is an information processing method to be performed by an information processing apparatus, the method including: performing arithmetic processing on a sampling image, as a processing target, obtained by imaging of a part of a measurement target with a multi spectrum camera; and performing a process of generating a calculation result image serving as evaluation information for an entire measurement target. As a result, evaluation information on the measurement target can be efficiently generated in the information processing apparatus.

A program according to the present technology is a program that causes an information processing apparatus to perform the processing of the method described above. This facilitates implementation of a computer apparatus that efficiently generates highly accurate evaluation information.

An information processing system according to the present technology includes: a multi spectrum camera that performs imaging to capture images in a plurality of different wavelength bands; and the information processing apparatus described above. This makes it possible to construct a system suitable to generate evaluation information for the entire measurement target.

Effects of the Invention

According to the present technology, it is possible to achieve analysis with high accuracy and depth by using high-resolution information without increasing measurement time or data volume.

Note that effects described here are not necessarily restrictive, and any of the effects described in the present disclosure may be achieved.

BRIEF DESCRIPTION OF DRAWINGS

FIG. 4 is an explanatory diagram of a high-resolution image and a low-resolution image according to the embodiment.

FIG. 30 is an explanatory diagram of an example of settings according to the embodiment.

FIG. 32 is an explanatory diagram of flight control according to the embodiment.

FIG. 34 is an explanatory diagram of flight control according to the embodiment.

FIG. 35 is an explanatory diagram of flight control according to the embodiment.

FIG. 36 is an explanatory diagram of flight control according to the embodiment.

FIG. 37 is an explanatory diagram of flight control according to the embodiment.

MODE FOR CARRYING OUT THE INVENTION

Hereinafter, embodiments will be described in the following order.
<1. System Configuration of First Embodiment>
<2. Generation of Evaluation Information Based on Sampling Image>
<3. Generation of Presentation Image>
<4. Composition with Low-Resolution Image>
<5. System Configuration of Second Embodiment>
<6. Flight Plan Control>
<7. Summary and Modifications>

<1. System Configuration of First Embodiment>

In the embodiment, the case of performing sensing of the vegetation state of a farm field will be described as an example.

Figure 1:
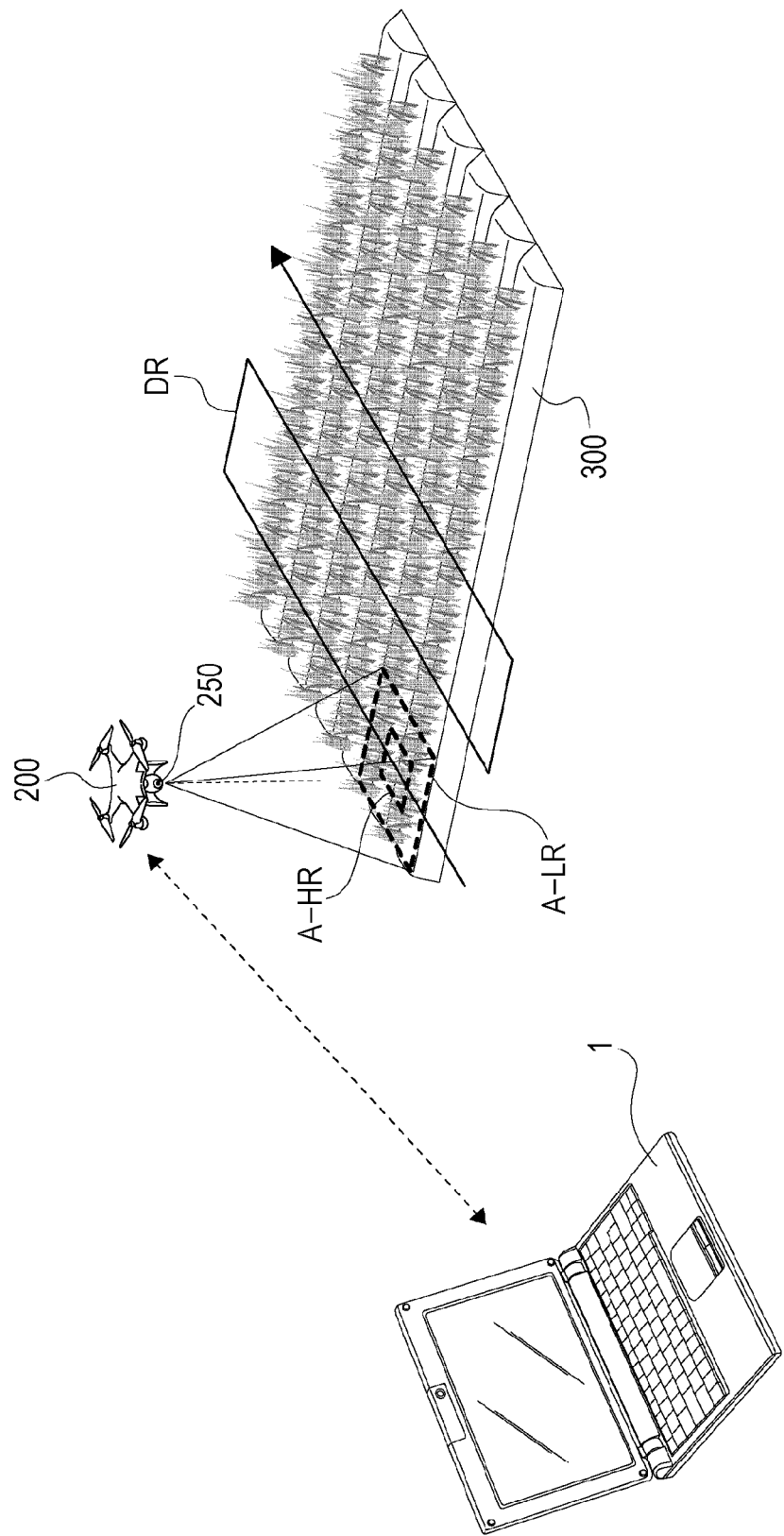
FIG. 1 is an explanatory diagram of remote sensing to be performed in embodiments of the present technology.

For example, as shown in FIG. 1, there is assumed a case where remote sensing is performed on the vegetation of a farm field 300 as a measurement target by use of an imaging device 250 mounted on a flight vehicle 200.

The small flight vehicle 200 can move over the farm field 300 by, for example, an operator's wireless control, automatic control, or the like.

The imaging device 250 is set on the flight vehicle 200 in such a way as to capture, for example, a downward view image. When the flight vehicle 200 moves over the farm field 300 along, for example, path DR set as indicated by an arrow, the imaging device 250, for example, periodically captures still images.

Here, the imaging device 250 is a multi spectrum camera that captures images in a plurality of wavelength bands. For example, it is possible to use a camera that captures a near-infrared (NIR) image and a red (R) image from which Normalized Difference Vegetation Index (NDVI) can be calculated. NDVI is an index indicating the distribution state and activity of vegetation.

Of course, this is just an example. It is sufficient if the imaging device 250 captures images in two or more wavelength bands. A camera that captures a green (G) image, a blue (B) image, an ultraviolet region image, and the like may also be used.

Note that the imaging device 250 just needs to capture images in two or more wavelength bands. Thus, it is also possible to mount a plurality of cameras. For example, two cameras of an NIR image capturing camera and an R image capturing camera may be mounted to collectively function as a multi spectrum camera. Anyway, in the case of the present embodiment, it is sufficient if the flight vehicle 200 is equipped with a required number of cameras of a required type for capturing images in a plurality of wavelength bands. No matter what form such cameras take, these cameras are collectively referred to as "multi spectrum cameras".

Furthermore, the imaging device 250 can capture a high-resolution sampling image (hereinafter also referred to as "high-resolution image") HR and a low-resolution image LR.

The high-resolution image HR is, for example, a captured image of range A-HR indicated by a broken line. The low-resolution image LR is a captured image of range A-LR indicated by a broken line.

The high-resolution image HR is an image obtained by the imaging of a part of a section imaged as the low-resolution image LR.

It is possible to capture the high-resolution image HR and the low-resolution image LR as described above by, for example, mounting a plurality of cameras for high-resolution imaging and low-resolution imaging as the imaging device 250 on the flight vehicle 200.

Note that the high-resolution image HR and the low-resolution image LR may be captured at the same time (including substantially the same time), or may be captured at different timings. For example, the high-resolution image HR is captured in a first flight on path DR, the low-resolution image LR is captured in a second flight on path DR, and the like. Alternatively, the low-resolution camera and the high-resolution camera may be replaced with each other to capture images in two flights.

Furthermore, tag information is added to an image obtained as a result of imaging with the imaging device 250. Tag information contains, for example, imaging date/time information, position information (latitude/longitude information) as global positioning system (GPS) data, imaging device information (such as individual identification information and model information of the camera), and information on each piece of image data (information on image size, wavelength, imaging parameters, and the like).

Note that the position information and the imaging date/time information also serve as correspondence information that associates the low-resolution image LR with the high-resolution image HR.

Image data (high-resolution image HR and low-resolution image LR) and tag information obtained by the imaging device 250 mounted on the flight vehicle 200 as described above are transmitted to an information processing apparatus 1. The information processing apparatus 1 uses the image data and the tag information to generate evaluation information on the farm field 300 as a measurement target. Furthermore, the information processing apparatus 1 performs a process of presenting a user with an evaluation result as an image.

The information processing apparatus 1 is implemented as, for example, a personal computer (PC), a field-programmable gate array (FPGA), or the like.

Note that the information processing apparatus 1 is provided separately from the imaging device 250 in FIG. 1. However, an arithmetic unit (a microcomputer or the like) serving as the information processing apparatus 1 may be provided in a unit including the imaging device 250.

Figure 2:
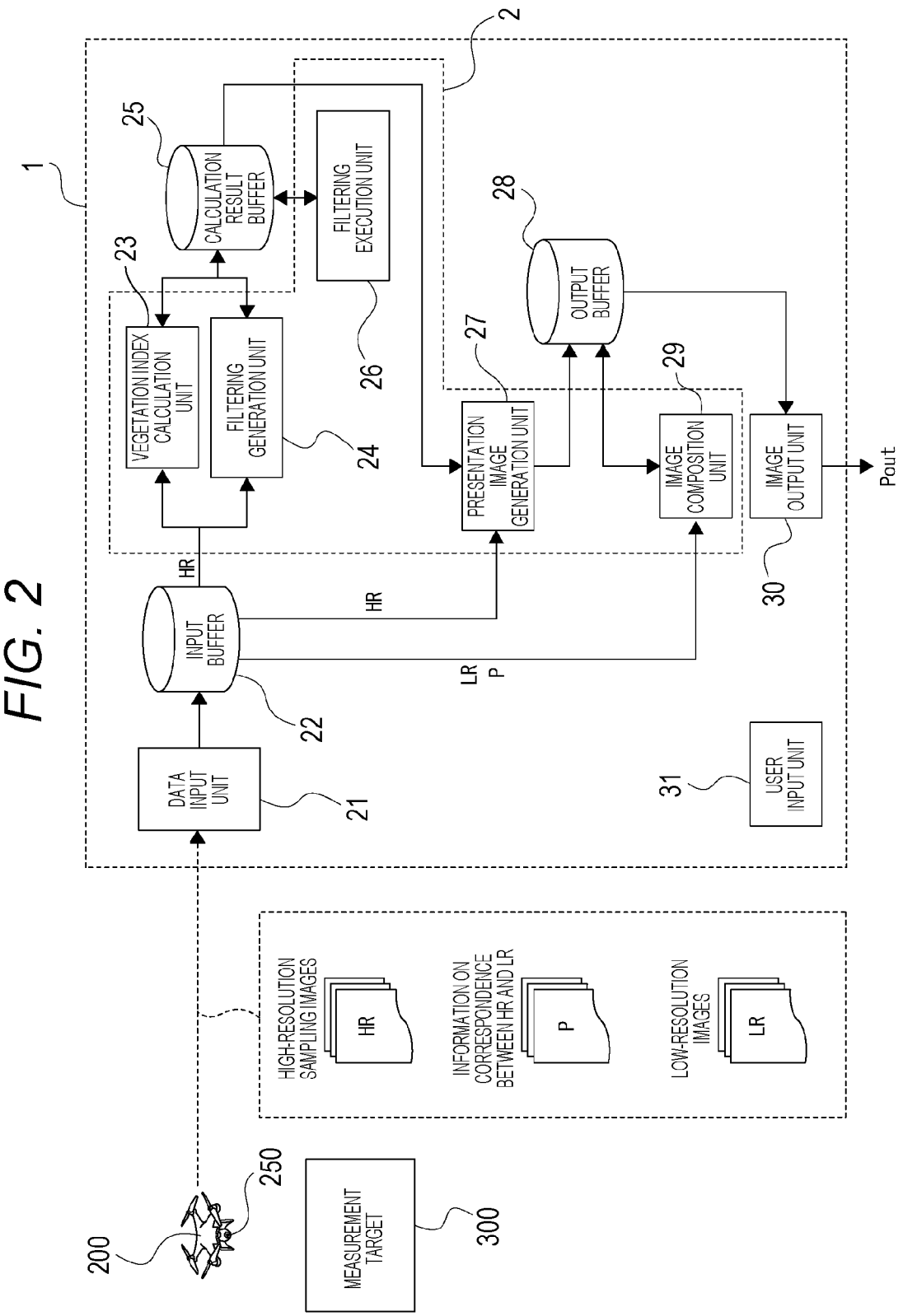
FIG. 2 is a block diagram of a system configuration according to a first embodiment.

The configuration of the information processing apparatus 1 will be described with reference to FIG. 2. Note that FIG. 2 shows the configuration of the information processing apparatus 1, in which, for example, a calculation function by software and a buffering function using a storage area are shown as blocks.

The information processing apparatus 1 includes a data input unit 21, an input buffer 22, a vegetation index calculation unit 23, a filtering generation unit 24, a calculation result buffer 25, a filtering execution unit 26, a presentation image generation unit 27, an output buffer 28, an image composition unit 29, an image output unit 30, and a user input unit 31.

Note that the vegetation index calculation unit 23, the filtering generation unit 24, the filtering execution unit 26, the presentation image generation unit 27, and the image composition unit 29 are shown as a calculation unit 2. The calculation unit 2 is a specific example of a calculation unit set forth in the claims. However, the calculation unit of the present disclosure need not have all the functions shown as the calculation unit 2. Having at least one of the functions is sufficient.

Each unit included in the calculation unit 2 may be configured by hardware. However, in the present embodiment, each unit included in the calculation unit 2 will be described as a function to be implemented by software in a computer apparatus 100 to be described later.

The data input unit 21 acquires, for example, image data on images (high-resolution image HR and low-resolution image LR) captured by the imaging device 250 mounted on the above-described flight vehicle 200, and tag information that serves as correspondence information P.

Then, the data input unit 21 causes the input buffer 22 to store the high-resolution image HR, the low-resolution image LR, and the correspondence information P.

Note that the image data acquired by the data input unit 21 refer to an image data file transmitted from the imaging device 250 or a relay device by wired transmission or wireless transmission and received by the information processing apparatus 1, or an image data file recorded on a recording medium on the imaging device 250 side or recorded on a recording medium by another recording device and acquired by the information processing apparatus 1 when the information processing apparatus 1 runs the recording medium.

Furthermore, the data input unit 21 may acquire image data on captured images (high-resolution image HR and low-resolution image LR) in real time (at the time of imaging) or at a later time. It is sufficient if image data are stored in the input buffer 22 at least when measurement results are calculated by the information processing apparatus 1.

Furthermore, in the present embodiment, the data input unit 21 acquires an image data file of an image obtained by the imaging device 250 as a multi spectrum camera. For example, the image data file contains, as high-resolution images HR obtained by the imaging of a single range, measurement images in two or more wavelengths.

The vegetation index calculation unit 23 generates an evaluation index image (for example, a vegetation index image) by using the high-resolution image HR that is a sampling image of the farm field 300. Specifically, it is conceivable that an NDVI image is generated.

The filtering generation unit 24 uses the high-resolution image HR that is a sampling image of the farm field 300 to generate a filter image that can be used for a filtering process.

The filter image is an image corresponding to information (filtering condition) that serves as a filter when filtering is performed. In other words, the filter image is an image showing a part with specific composition or a specific state, and is an image showing a part to be extracted in the filtering process.

That is, the filtering generation unit 24 uses one or more of the high-resolution images HR to generate a filtering condition for generating a calculation result image showing a measurement result.

Note that as will be described later, the filtering generation unit 24 generates a filter image from an image in a specific wavelength range of the high-resolution image HR or from a vegetation index image such as an NDVI image. Alternatively, a generated filter image is used to generate another filter image in some cases.

The filtering execution unit 26 uses a filter image generated by the filtering generation unit 24 to generate a filtering result image.

For example, the filtering execution unit 26 performs filtering on a vegetation index image by using the filter image to generate a filtering result image.

Furthermore, the filtering execution unit 26 performs filtering on an image in a specific wavelength range of the input high-resolution image HR by using the filter image to generate a filtering result image.

Moreover, the filtering execution unit 26 can also perform filtering on a filter image by using another filter image to generate a filtering result image.

The calculation result buffer 25 is used to store the vegetation index image generated by the vegetation index calculation unit 23.

Furthermore, the calculation result buffer 25 is also used to store the filter image generated by the filtering generation unit 24.

In addition, the calculation result buffer 25 is also used to store the filtering result image generated by the filtering execution unit 26.

The presentation image generation unit 27 generates a presentation image by using the filtering result image.

A filtering result image is obtained as a result of extracting pixels from an image before filtering, according to a condition represented by a filter image. It may be difficult for a person to visually recognize a filtering result image. Therefore, the presentation image generation unit 27 performs processing to generate an image in a state suitable for presentation to a person. As will be described later, screen division and color mapping are performed as a process for generating a presentation image.

The image composition unit 29 performs a composition process for combining the low-resolution image LR and the presentation image generated by the presentation image generation unit 27 on the basis of the high-resolution image HR. The image composition unit 29 refers to the correspondence information P for the composition process.

The output buffer 28 is used to store the presentation image generated by the presentation image generation unit 27.

Furthermore, the output buffer 28 is also used to store a composite image generated by the image composition unit 29.

The image output unit 30 outputs image data read from the output buffer 28 (output image Pout). For example, the presentation image generated by the presentation image generation unit 27 and the composite image generated by the image composition unit 29 are read from the output buffer 28 and output as the output image Pout by the image output unit 30.

For example, the output image is displayed on a monitor display, transmitted to another information processing apparatus, or stored in a storage medium by a storage device.

The output image is an image representing the result of evaluation based on measurement (remote sensing) of the farm field 300. A user can know, for example, the state of the farm field 300 and the state of plant growth by viewing the presentation image and the composite image.

Note that although not shown in the drawing, the vegetation index image, the filter image, and the filtering result image stored in the calculation result buffer 25 may be output as the output image Pout to be, for example, displayed, transmitted, or stored as a result of processing of the image output unit 30.

The user input unit 31 accepts various user operation inputs, setting inputs, and the like.

For example, ON/OFF of each processing function in the calculation unit 2, processing parameters, selection of measurement details, selection of an output image, and the like are specified by user operations.

Figure 3:
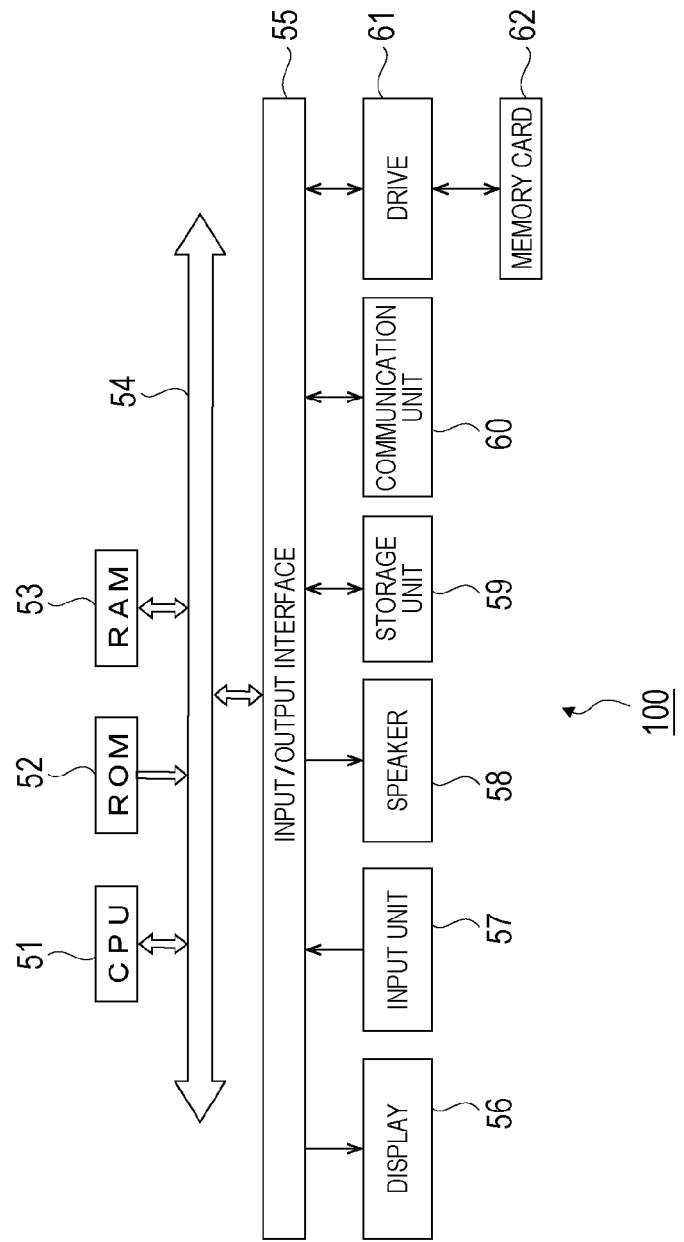
FIG. 3 is a block diagram of a computer apparatus according to the embodiment.

The information processing apparatus 1 having the above-described functional configuration as shown in FIG. 2 is implemented by, for example, the computer apparatus 100 having a hardware configuration as shown in FIG. 3.

As shown in FIG. 3, the computer apparatus 100 includes a central processing unit (CPU) 51, a read only memory (ROM) 52, and a random access memory (RAM) 53.

The CPU 51 performs various processes in accordance with a program stored in the ROM 52 or a program loaded from a storage unit 59 into the RAM 53. The RAM 53 also stores, as appropriate, data and the like necessary for the CPU 51 to perform the various processes.

The CPU 51, the ROM 52, and the RAM 53 are connected to each other via a bus 54. An input/output interface 55 is also connected to the bus 54.

The input/output interface 55 can be connected to a display 56, an input unit 57, a speaker 58, the storage unit 59, a communication unit 60, and the like. The display 56 includes a liquid crystal panel, an organic electroluminescence (EL) panel, or the like. The input unit 57 includes a keyboard, a mouse, and the like. The storage unit 59 includes an HDD, or the like.

The display 56 may be integrally formed with the computer apparatus 100 or may be formed as a separate device. For example, the display 56 displays the output image Pout.

The input unit 57 refers to an input device to be used by a user who uses the computer apparatus 100.

The communication unit 60 performs communication processing via a network including the Internet or communication with a peripheral device of each unit. For example, the communication unit 60 can also perform communication or the like with the imaging device 250.

The input/output interface 55 is also connected, as necessary, to a drive 61 in which a memory card 62 is mounted such that a computer program read from the memory card 62 is installed in the storage unit 59 as necessary or data processed in the CPU 51 are stored in the memory card 62. Of course, the drive 61 may be a recording/reproducing drive for a removable storage medium such as a magnetic disk, an optical disk, or a magneto-optical disk.

Such a hardware configuration enables processing to be performed by the calculation unit 2 of the information processing apparatus 1 according to the embodiment, that is, performed by the vegetation index calculation unit 23, the filtering generation unit 24, the filtering execution unit 26, the presentation image generation unit 27, and the image composition unit 29 shown in FIG. 2. Moreover, such a hardware configuration also enables processing to be performed by the data input unit 21 and the image output unit 30. That is, software to be activated by the CPU 51 implements the processing of these units. The program included in the software is downloaded from a network or read from a removable storage medium and installed on the computer apparatus 100 of FIG. 3. Alternatively, the program may be stored in advance in an HDD or the like as the storage unit 59. Then, when the program is activated in the CPU 51, the function of each unit described above is fulfilled.

Furthermore, the input buffer 22, the calculation result buffer 25, and the output buffer 28 are implemented by use of, for example, a storage area of the RAM 53 or a storage area of the storage unit 59.

The user input unit 31 serves a function of the CPU 51 for detecting an operation input by the input unit 57.

As the high-resolution image HR and the low-resolution image LR, the image data file, the correspondence information P, and the like are received by the communication unit 60 or read by the drive 61 from a storage medium and stored in, for example, the storage unit 59. The CPU 51 having a function as the data input unit 21 acquires an image data file necessary for generating an evaluation result from among image data files and the like thus imported, and treats the acquired image data file as a processing target.

An image output by the image output unit 30 is displayed on the display 56, stored in the storage unit 59, transmitted by the communication unit 60 to an external device, or stored in a storage medium such as the memory card 62 by the drive 61, for example. Thus, the output of an image is performed in various forms.

Note that the information processing apparatus 1 according to the embodiment is not limited to the information processing apparatus (computer apparatus) 100 configured as a single apparatus with a hardware configuration as shown in FIG. 3. Instead, a system may be configured such that a plurality of computer apparatuses is included in the system. The plurality of computer apparatuses may form a system by a LAN or the like, or may be located at distant places and connected by a virtual private network (VPN) or the like using the Internet or the like. The plurality of computer apparatuses may include a computer apparatus that can be used in a cloud computing service.

Furthermore, the computer apparatus 100 shown in FIG. 3 can be implemented as a personal computer, such as a stationary-type computer or a notebook computer, or a portable terminal such as a tablet terminal or a smartphone. Moreover, electronic apparatuses, such as a measurement apparatus, a television apparatus, a monitor apparatus, an imaging apparatus, and a facility management apparatus, having a function as the computer apparatus 100 can also be equipped with the information processing apparatus 1 according to the present embodiment.

<2. Generation of Evaluation Information Based on Sampling Image>

The following describes an example of an evaluation information generation process to be performed by the information processing apparatus 1 based on a sampling image.

First, the imaging ranges of the high-resolution image HR and the low-resolution image LR will be described with reference to FIG. 4.

In a case where the farm field 300 is imaged by the flight vehicle 200, a plurality of images is captured in a form with a certain margin in each of longitudinal and lateral directions so as to form a single large image by stitching.

Sections #1 to #5 respectively imaged as low-resolution images LR #1 to LR #5 are exemplified in FIG. 4A. Each of sections #1 to #5 is a part of the farm field 300 that is a measurement target, and represents a range to be imaged as a single low-resolution image LR. Sections #1 to #5 partially overlap with each other. The overlaps between sections #1 to #5 correspond to ranges to be imaged as margins in low-resolution images LR #1 to LR #5.

Here, only sections #1 to #5 are shown. However, capturing images is continued to also capture low-resolution image LR #5 and subsequent images during a flight on path DR of FIG. 1. As a result, there are obtained a required number of low-resolution images LR that cover the entire farm field 300. Then, a process of stitching the low-resolution images LR is performed. Thus, an image of the entire farm field 300 can be generated.

Note that sections #1, #2, . . . in the farm field 300 are determined by the angle of view of the imaging device 250 and the flight altitude of the flight vehicle 200, and are not sections divided in a fixed manner.

Meanwhile, the high-resolution images HR are captured in a discontinuous manner in one or both of the longitudinal direction and the lateral direction. FIG. 4B shows high-resolution images HR #1 to HR #5, which are images obtained as a result of imaging discrete sample sections #1C to #5C, respectively.

Here, sample section #1C corresponds to an area located substantially in the center of section #1 of FIG. 4A. However, sample section #1C does not necessarily need to be in the center thereof, and is an area at least located within section #1.

Similarly, sample sections #2C to #5C are areas (for example, areas located substantially in the centers) included in sections #2 to #5, respectively.

As described above, a single high-resolution image HR is obtained by the imaging of a sample section included in the imaging section of a corresponding low-resolution image LR.

Note that high-resolution images HR are also sequentially captured during a flight on path DR over the farm field 300. However, even if the high-resolution images HR are collected at a time point after the imaging of the entire farm field 300, a high-resolution image of the entire farm field 300 cannot be generated by stitching. This is because the high-resolution images HR are images of the respective discrete sample sections.

In the present embodiment, high-resolution images HR are obtained by the imaging of such discrete sample sections so as to enable the large farm field 300 to be efficiently imaged and to also enable fine analysis and evaluation result calculation of sample sections #1C, #2C, . . . corresponding to sections #1, #2, . . . , respectively, by use of the high-resolution images HR.

Figure 5:
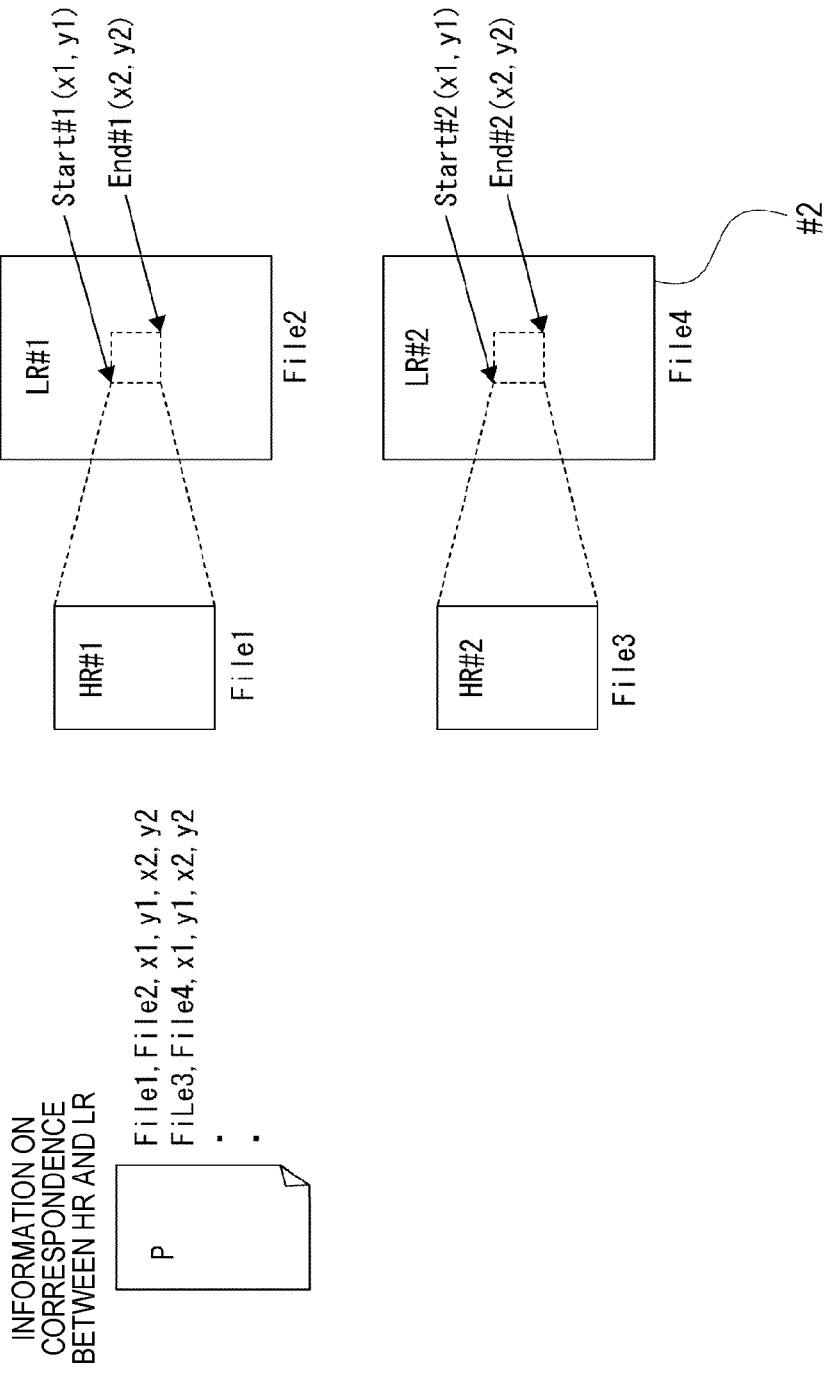
FIG. 5 is an explanatory diagram of correspondence information according to the embodiment.

Next, an example of correspondence information P is shown in FIG. 5.

Correspondence information P is information that associates the imaging sections of high-resolution images HR with those of low-resolution images LR as described above.

For example, consider a case where a camera for low-resolution images LR and a camera for high-resolution images HR are mounted as the imaging device 250, and simultaneously capture images. As shown in FIG. 5, the correspondence information P in this case is a file containing a table that describes a file name and coordinates representing the range of the angle of view of a high-resolution image HR in a low-resolution image LR so as to associate imaging results with each other.

For example, a table as the correspondence information P shown in the drawing shows a set of image data files File1 and File2. Image data file File1 is an image data file of high-resolution image HR #1. Image data file File2 is an image data file of low-resolution image LR #1. In addition, start coordinates Start #1 (x1, y1) are associated with end coordinates End #1 (x2, y2). Start coordinates Start #1 (x1, y1) and end coordinates End #1 (x2, y2) represent the range of the angle of view of the high-resolution image HR in the low-resolution image LR.

Similarly, the table associates image data file File3 with image data file File4, and also associates start coordinates Start #2 (x1, y1) with end coordinates End #2 (x2, y2). Image data file File3 is an image data file of high-resolution image HR #2. Image data file File4 is an image data file of low-resolution image LR #2. Start coordinates Start #2 (x1, y1) and end coordinates End #2 (x2, y2) represent the range of the angle of view of the high-resolution image HR in the low-resolution image LR.

Note that there is a technique for recording, in an image file, information on a location where an image has been captured by use of GPS. In that case, position information thereof can also be used as information on correspondence between the imaging range (sample section #1C or the like) of a high-resolution image HR and the imaging range (section #1 or the like) of a low-resolution image LR.

Furthermore, in a case where low-resolution images LR and high-resolution images HR are simultaneously captured in a single flight, imaging date/time information is added to each piece of image data, so that the imaging date/time information can be used as correspondence information P. That is, the imaging range (sample section #1C or the like) of a high-resolution image HR is associated with the imaging range (section #1 or the like) of a low-resolution image LR regarded as an image captured at the same time as the high-resolution image HR on the basis of the imaging date/time information.

The following describes a processing example of the information processing apparatus 1 that uses the high-resolution image HR, the low-resolution image LR, and the correspondence information P as described above.

Figure 6:
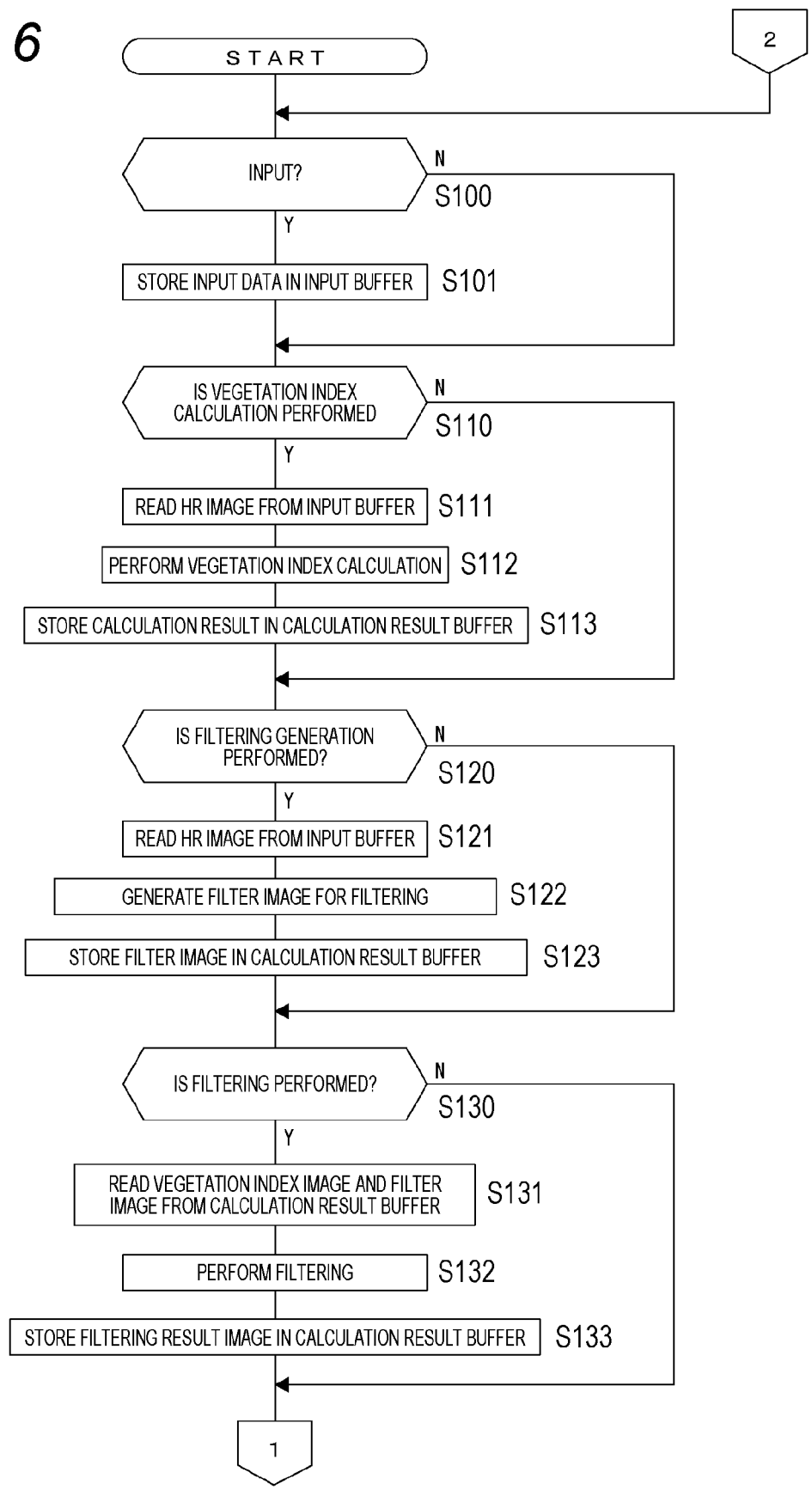
FIG. 6 is a flowchart of processing of an information processing apparatus according to the embodiment.
Figure 7:
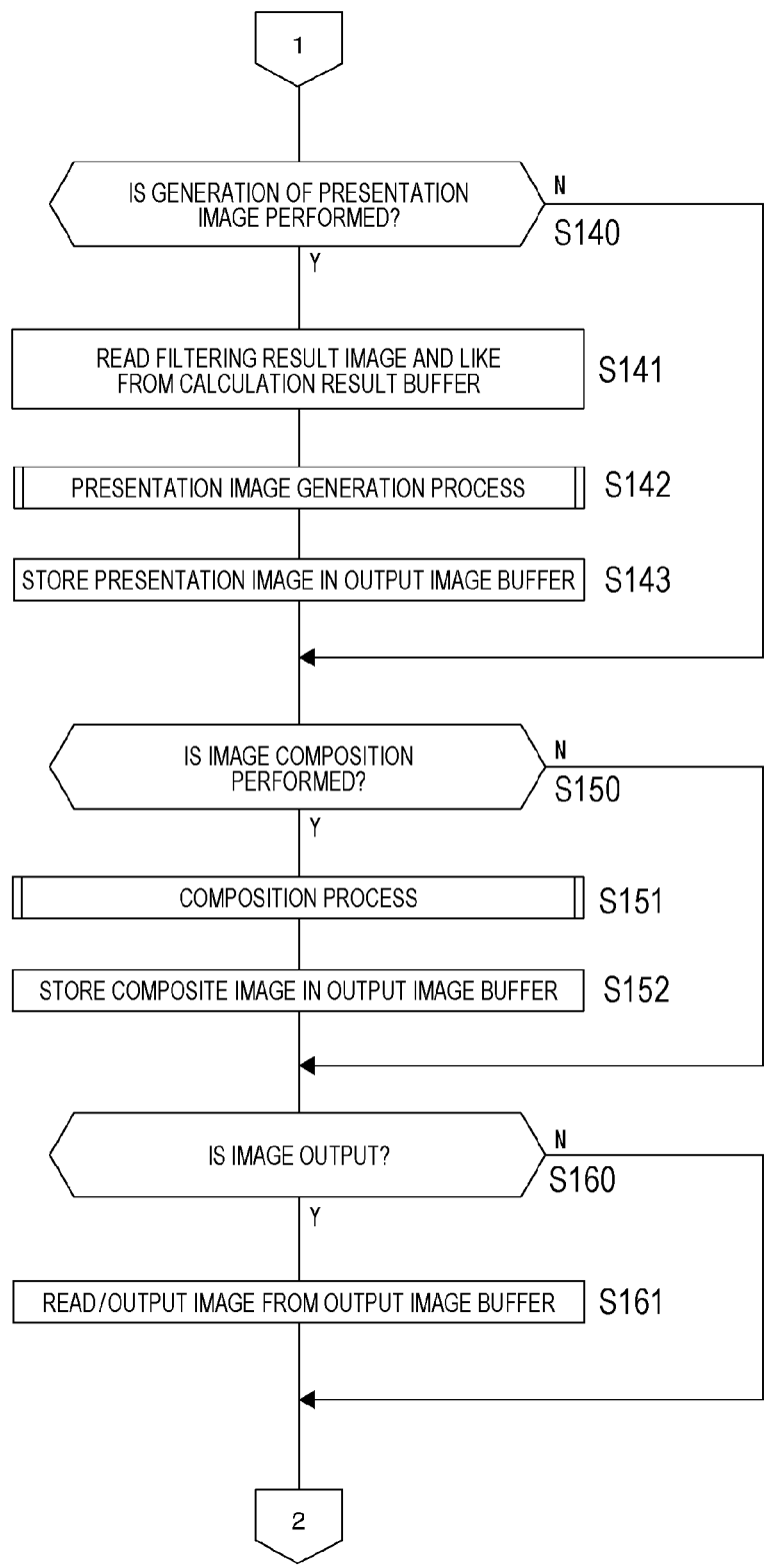
FIG. 7 is a flowchart of processing of the information processing apparatus according to the embodiment.

FIGS. 6 and 7 show examples of processing to be performed by each processing function shown in FIG. 2, in the information processing apparatus 1 (CPU 51).

In the processes of FIGS. 6 and 7, the information processing apparatus 1 determines whether or not to perform each processing in steps S100, S110, S120, S130, S140, S150, and S160. In a case where processing for a captured image of a certain measurement target is started, each processing is sequentially performed in a predetermined sequence, performed in a sequence freely set for the processing, performed in response to an external trigger or reception of information, or performed individually in response to a user operation. In each of the steps described above, it is determined whether or not it is time for each processing to be performed, according to a program, a sequence setting, a user operation, or the like.

In a case where one or both of the image data files of a high-resolution image HR and a low-resolution image LR are input to the data input unit 21 or the correspondence information P is input to the data input unit 21, the information processing apparatus 1 proceeds from step S100 to S101, and causes the input data to be stored in the input buffer 22.

The information processing apparatus 1 proceeds from step S110 to S111 at the timing when vegetation index calculation is performed by the function of the vegetation index calculation unit 23.

The information processing apparatus 1 (vegetation index calculation unit 23) reads, in step S111, a necessary high-resolution image HR to be processed from the input buffer 22, performs vegetation index calculation in step S112, and stores a vegetation index image as a calculation result in the calculation result buffer 25 in step S113.

Figure 8:
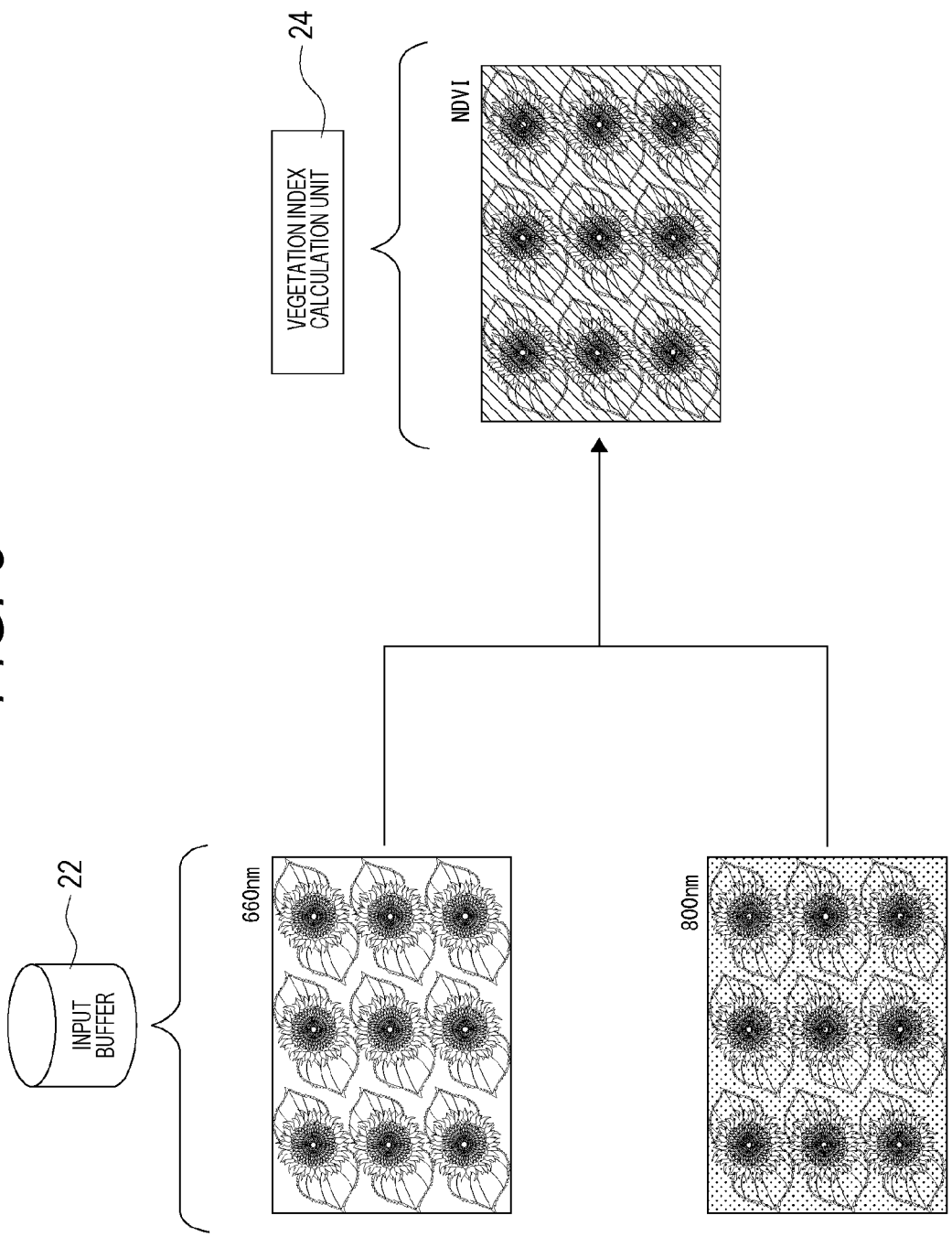
FIG. 8 is an explanatory diagram of vegetation index calculation according to the embodiment.

A specific example of the processing in steps S111 to S113 is shown in FIG. 8.

For example, the vegetation index calculation unit 23 reads, from the input buffer 22, an image (R image) with a wavelength of 660 nm and an image (NIR image) with a wavelength of 800 nm. Then, the vegetation index calculation unit 23 generates an NDVI image from the R image and the NIR image. For example, NDVI is calculated as $$NDVI=(1-(R/NIR))/(1+(R/NIR)).$$

The NDVI image is an image having a pixel value corresponding to an NDVI value calculated for each corresponding pixel of the R image and the NIR image. FIG. 8 schematically shows the NDVI image as a hatched image. The NDVI image obtained in this way is stored in the calculation result buffer 25.

Note that although an example of obtaining NDVI as a vegetation index will be described below, this is just an example, and it is also conceivable that any other vegetation index is obtained as described later. Of course, in the case of obtaining another vegetation index, an image (a wavelength range, and the like) to be read from the input buffer 22 may be different.

The information processing apparatus 1 proceeds from step S120 to S121 in FIG. 6 at the timing when filter image generation is performed by the function of the filtering generation unit 24.

The information processing apparatus 1 (filtering generation unit 24) reads, in step S121, a necessary high-resolution image HR to be processed from the input buffer 22, and generates, in step S122, a filter image (an image showing a part with specific composition or a specific state) for filtering. Then, the information processing apparatus 1 stores the filter image in the calculation result buffer 25 in step S123.

Figure 9:
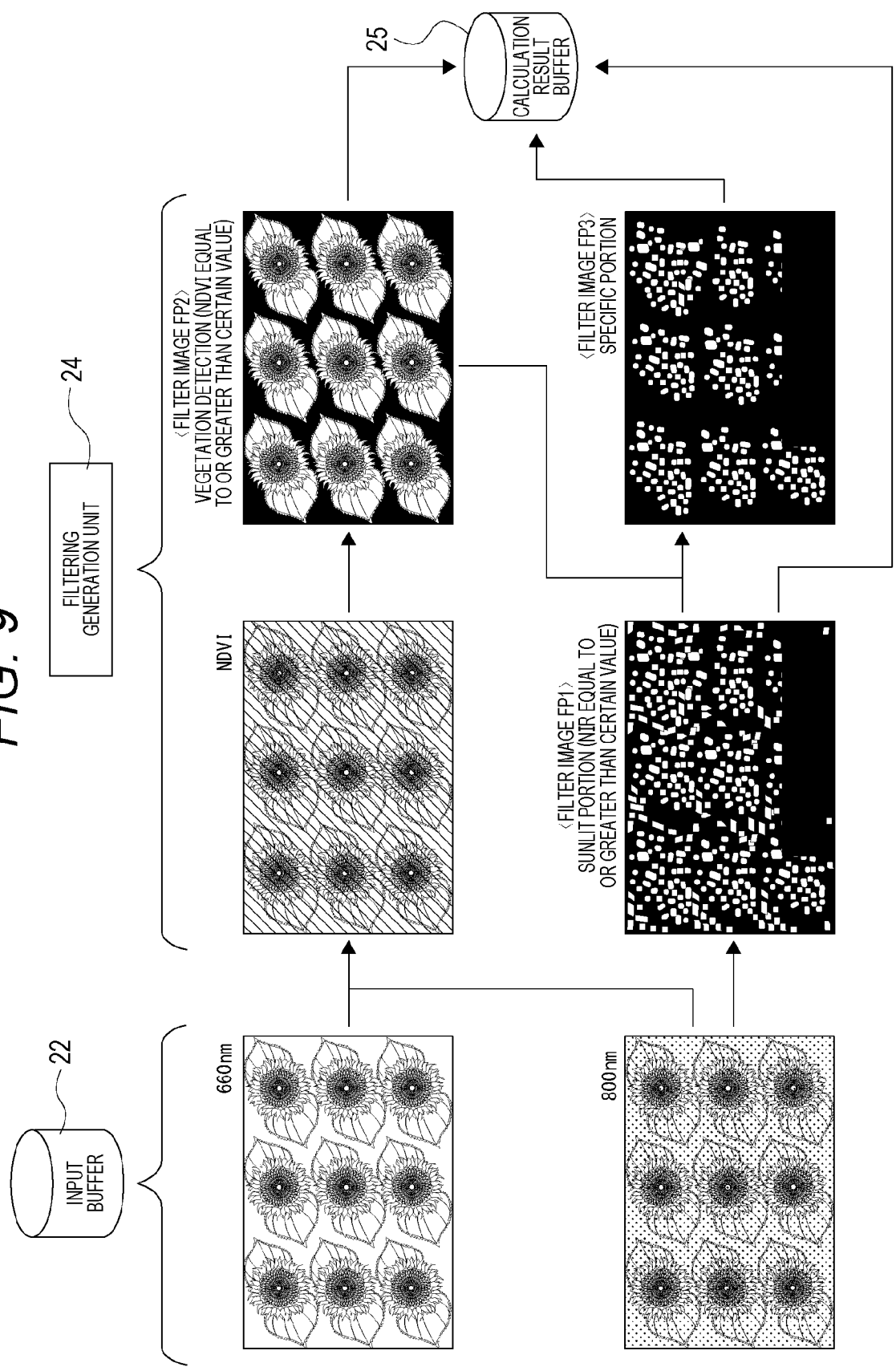
FIG. 9 is an explanatory diagram of filtering generation according to the embodiment.

A specific example of the processing in steps S121 to S123 is shown in FIG. 9. Here, an example is shown in which three filter images FP1, FP2, and FP3 are generated by use of an image (NIR image) with a wavelength of 800 nm and an NDVI image.

Filter image FP1 is an image that shows a sunlit portion of the high-resolution image HR. For example, filter image FP1 is an image generated as a result of extracting pixels having NIR values (pixel values) equal to or greater than a certain value from an NIR image. For example, only sunlit portions in the image are represented as high-luminance pixels as shown in the drawing. Filter image FP1 generated in this manner is stored in the calculation result buffer 25.

Filter image FP2 is an image obtained by detection of a portion corresponding to a vegetation portion of the high-resolution image HR. Filter image FP2 is an image in which a plant portion in the high-resolution image HR is represented as a high-luminance pixel (for example, a white pixel) and another portion (for example, a soil portion) of the high-resolution image HR is represented as a low-luminance pixel (for example, a black pixel).

First, an NDVI image is generated or acquired. For example, the filtering generation unit 24 reads an NIR image and an R image from the input buffer 22. Then, the vegetation index calculation unit 23 generates an NDVI image from the R image and the NIR image. Note that in a case where an NDVI image is generated by the vegetation index calculation unit 23 and stored in the calculation result buffer 25, the NDVI image just needs to be read from the calculation result buffer 25.

Then, pixels having NDVI values equal to or greater than a certain value are extracted from the NDVI image. As a result, filter image FP2 is an image in which only vegetation portions are represented as high-luminance pixels, as shown in the drawing. Filter image FP2 generated in this manner is stored in the calculation result buffer 25.

Filter image FP3 is an image obtained by detection of a portion corresponding to both a vegetation portion and a sunlit portion in the high-resolution image HR. Filter image FP3 is generated by use of filter images FP1 and FP2. Filter image FP3 is an image representing a specific portion corresponding to both a vegetation portion and a sunlit portion as a high-luminance pixel (for example, a white pixel) and another portion as a low-luminance pixel (for example, a black pixel).

In this case, it is sufficient if an AND condition is used on corresponding pixels (pixels at the same position) of filter pixels FP1 and FP2 to determine high-luminance pixels. That is, when a high-luminance pixel is set to "1" and a low-luminance pixel is set to "0" in filter pixels FP1 and FP2, whether a pixel is "1" or "0" is determined under the AND condition for each pixel position in filter images FP1 and FP2, to determine a corresponding pixel of filter image FP3. As a result, filter image FP3 is obtained as an image in which a portion corresponding to both a vegetation portion and a sunlit portion is represented as a high-luminance pixel, as shown in the drawing. Filter image FP3 generated in this manner is stored in the calculation result buffer 25.

Here, three filter images FP1, FP2, and FP3 have been described as examples. However, it is conceivable that more diverse filter images are generated according to various purposes of filtering, as will be described later.

That is, a filter image is an image showing a part with specific composition or a specific state, and is an image showing a part to be extracted in a filtering process. Thus, it is conceivable that various filter images are generated according to filtering conditions.

The information processing apparatus 1 proceeds from step S130 to S131 in FIG. 6 at the timing when filtering is performed by the function of the filtering execution unit 26.

In step S131, the information processing apparatus 1 (filtering execution unit 26) reads, from the calculation result buffer 25, a vegetation index image and a filter image to be processed. Then, the information processing apparatus 1 performs a filtering process in step S132. The filtering process is a process of extracting a corresponding part (pixel) from the vegetation index image by using the filter image showing a part with specific composition or a specific state.

Then, in step S133, the information processing apparatus 1 stores an image (filtering result image) as a filtering result in the calculation result buffer 25.

Figure 10:
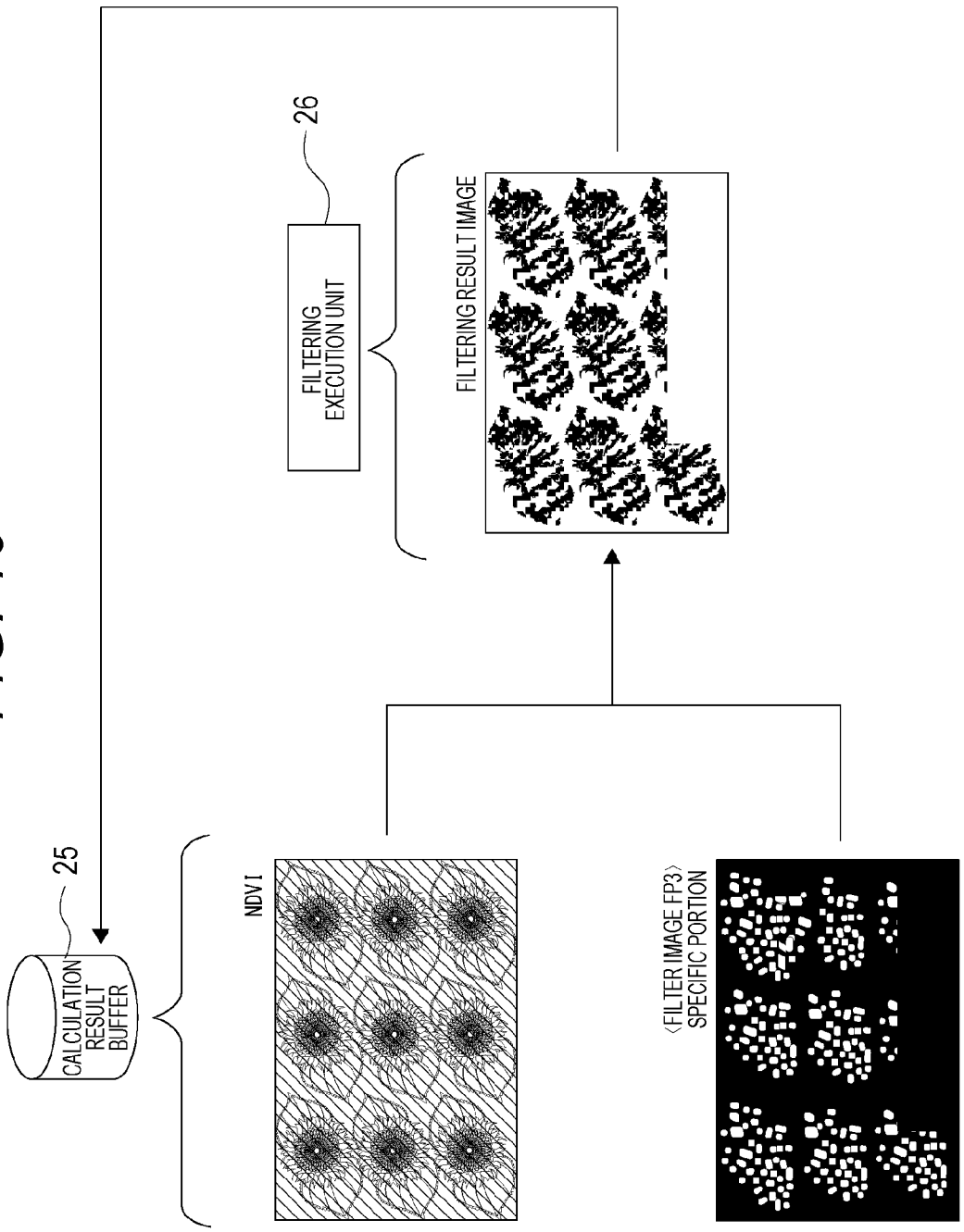
FIG. 10 is an explanatory diagram of filtering execution according to the embodiment.

A specific example of the processing in steps S131 to S133 is shown in FIG. 10. Here, an example is shown in which an NDVI image, as a vegetation index image, and filter image FP3 are read from the calculation result buffer 25 and subjected to filtering.

As described above, filter image FP3 is an image obtained as an image showing a part with specific composition or a specific state, by detection of a portion corresponding to both a vegetation portion and a sunlit portion in the high-resolution image HR.

The filtering process is a process of extracting, from the NDVI image, a pixel corresponding to the portion shown in filter image FP3. As a result, an image of a filtering result is obtained as shown in the drawing. The filtering result image is stored in the calculation result buffer 25.

Eventually, the filtering result image is an image obtained by extraction of a part to be measured or a part suitable for measurement from the high-resolution image HR.

For example, there is a technique for measuring a light source spectrum (sunlight) at the same time as measurement with a camera and correcting the result of the measurement with the camera, so as to reduce fluctuations in the light source spectrum when measuring a vegetation index (for example, NDVI). If it is possible to remove a shaded part (a part shaded mainly by plant leaves, that is, a shadow with a complicated light source spectrum affected by light absorption specific to leaves and reflection), measurement can be performed with higher accuracy. The filtering result image shown in the drawing is an image obtained by extraction of pixels satisfying conditions for such highly accurate measurement.

Of course, it is conceivable that various filtering processes are performed according to measurement purposes. Examples of such various filtering processes include the filtering of a vegetation index image by use of filter images FP1 and FP2 described above, for example.

It is also conceivable that filtering is performed by use of another filter image. For example, a filter image showing a shaded area is assumed. A shaded area, especially that located under a plant community is likely to be kept in the shade throughout the day. Thus, it is possible to achieve more accurate measurement by performing measurement only for an area in the sun rather than an area in the shade in measuring the potential of photosynthesis of the plant community. Considering this point, it is also conceivable that, as an example, filtering of a vegetation index image such as an NDVI image is performed by use of a filter image showing the location of a shaded area.

The filtering result image obtained in the filtering process as described above is an image showing a part with specific composition or a specific state in the vegetation index, and shows one measurement result.

Such a filtering result image may be stored as a measurement result in an appropriate recording medium, or may be read from the calculation result buffer 25 and output from the image output unit 30.

Of course, the filtering result image may be stored together with the original high-resolution image HR or the like. Alternatively, it is also possible to store only the filtering result image. Moreover, it is also possible to adopt a configuration in which a user can select storing both the high-resolution image HR or the like and the filtering result image or storing only the filtering result image.

However, as shown in FIG. 10, there are cases where the filtering result image is not very appropriate for the user, as an image showing the result of measuring a measurement target. That is, it may be difficult for human eyes to understand what the image represents.

Therefore, in the present embodiment, processing of the presentation image generation unit 27 enables a presentation image to be generated and output such that a person can more easily understand a measurement result when viewing the presentation image.

<3. Generation of Presentation Image>

In the processes of FIGS. 6 and 7, the information processing apparatus 1 proceeds from step S140 to S141 in FIG. 7 at the timing when generation of a presentation image is performed by the function of the presentation image generation unit 27.

In step S141, the information processing apparatus 1 (presentation image generation unit 27) reads, from the calculation result buffer 25, a filtering result image and the like to be processed. Then, the information processing apparatus 1 performs a presentation image generation process in step S142, and stores a generated presentation image in the output buffer 28 in step S143.

Hereinafter, presentation image generation process examples I, II, and III will be described as examples of the presentation image generation process of step S142.

First, presentation image generation process example I will be described with reference to FIGS. 11 and 12.

Presentation image generation process example I is an example of generating an image, in which a filtering result image is divided into specific units and a color is assigned (color mapping is applied) to a representative value of pixels included in each divided area.

Figure 11:
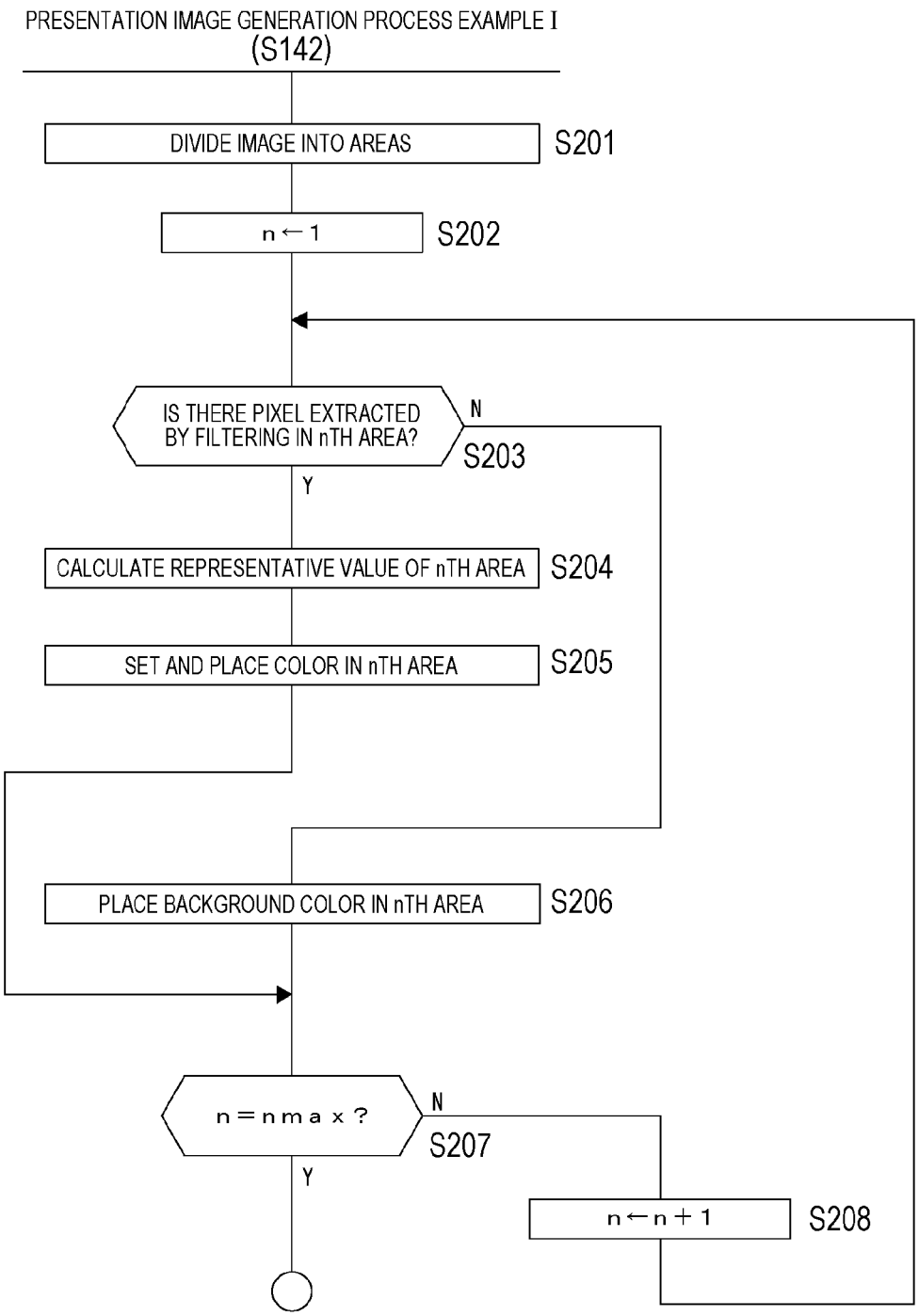
FIG. 11 is a flowchart of imaging process example I according to the embodiment.

In this case, the information processing apparatus 1 divides the filtering result image into areas in step S201 in FIG. 11. For example, FIG. 12 shows an example of division into 16 areas.

Then, the information processing apparatus 1 sets the variable n such that n=1 in step S202 of FIG. 11, and performs processing in steps S203 to S206 while incrementing the variable n in step S208 until the variable n reaches a maximum value such that n=nmax in step S207.

Note that the maximum value nmax of the variable n corresponds to the number of areas set in step S201. For example, in a case where the filtering result image is divided into 16 areas, the maximum value nmax is set such that nmax=16.

In step S203, the information processing apparatus 1 confirms whether or not a pixel extracted by the filtering process exists in an nth area among the divided areas, so that the process is branched.

In a case where an extracted pixel exists, the information processing apparatus 1 calculates a representative value of pixels in the nth area in step S204.

The representative value refers to an average value, a maximum value, a minimum value, a centroid value, a mode value, or the like of vegetation indices in pixels existing in the area. Here, for example, an average value is used as a representative value.

In step S205, the information processing apparatus 1 performs "color assignment" by using the calculated representative value (average value). Here, "color assignment" refers to assigning, to a relevant pixel, a color selected according to the calculated average value from among corresponding colors set in advance for respective numerical ranges.

For example, colors are set for NDVI values as follows.
Less than 0.700: dark green
0.700 to 0.710: green
0.710 to 0.720: yellowish green
0.720 to 0.745: yellow
0.746 to 0.760: orange
0.761 to 0.770: dark orange
0.771 to 0.799: red
0.800 or more: dark red. Then, a color is determined according to the average value.

In addition, the color corresponding to the average value is placed in the nth area. That is, this color is set as the color of the pixels in the nth area.

Meanwhile, in a case where it is confirmed in step S203 that a pixel extracted by the filtering process does not exist in the nth area, the information processing apparatus 1 places a background color in the nth area in step S206. For example, in a case where white is used as the background color, the pixels in the nth area are set as white pixels.

As a result of performing the processing in steps S203 to S206 for each area, a color-mapped presentation image is generated.

Figure 12:
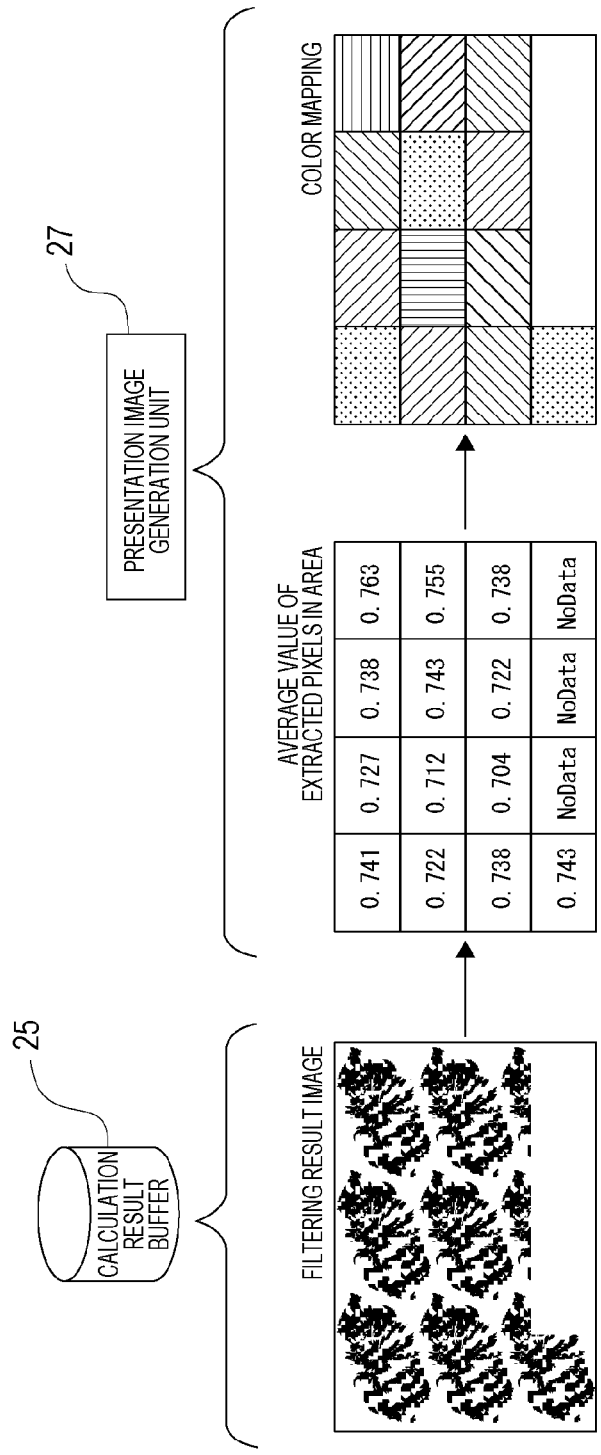
FIG. 12 is an explanatory diagram of imaging process example I according to the embodiment.

For example, as shown in FIG. 12, the filtering result image described in FIG. 10 is read from the calculation result buffer 25. The filtering result image is an image including pixels corresponding to NDVI values of pixels in a portion corresponding to both a vegetation portion and a sunlit portion.

This filtering result image is divided into 16 areas. Then, an average value (representative value) of NDVI is obtained for each area. Note that areas where no pixel (effective pixel as an NDVI value) exists are indicated as "NO DATA".

Color assignment is performed on an area for which an average value has been obtained. The background color (white) is assigned to the areas indicated as "NO DATA".

As a result, a color mapping image is generated as shown in the drawing. Note that differences in color are represented by the types of diagonal line, stipple, and the like in the drawing.

Such a color mapping image is generated as a presentation image. In this case, the vegetation index (average value) of each of the 16 areas is represented by color. Thus, the image enables a user to easily grasp a vegetation state in each area.

Note that, of course, the division into 16 areas is an example, and an image may also be divided into, for example, two areas, three areas, four areas, or eight areas. Alternatively, an image may also be divided more finely into, for example, 24 areas or 30 areas. It is not necessary for each area to have the same square measure or shape.

Next, presentation image generation process example II will be described with reference to FIGS. 13 and 14.

This is an example of image composition in which an image obtained as a result of assigning colors to a filtering result image is combined with a part with specific vegetation composition or a specific vegetation state.

Figure 13:
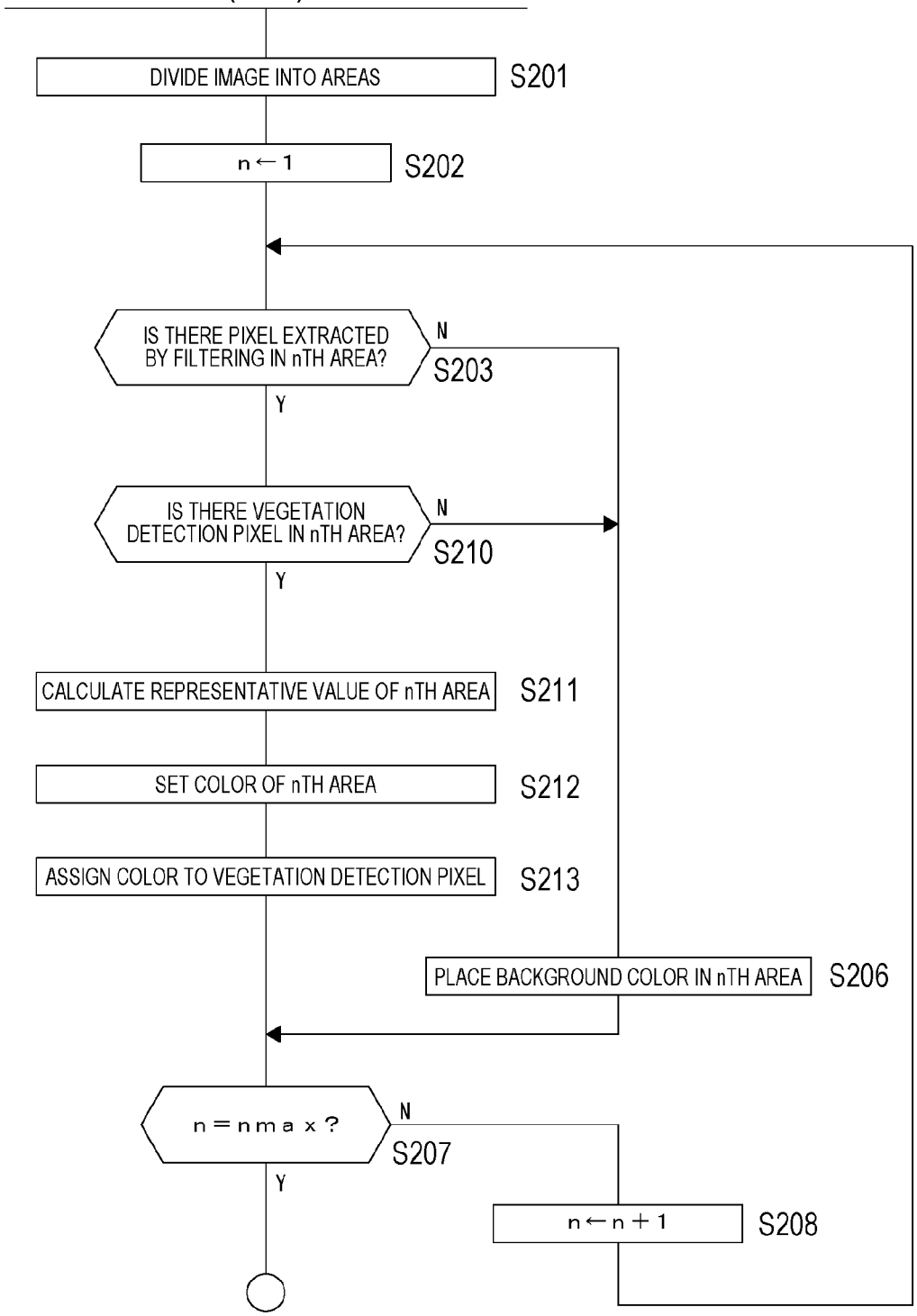
FIG. 13 is a flowchart of imaging process example II according to the embodiment.
Figure 14:
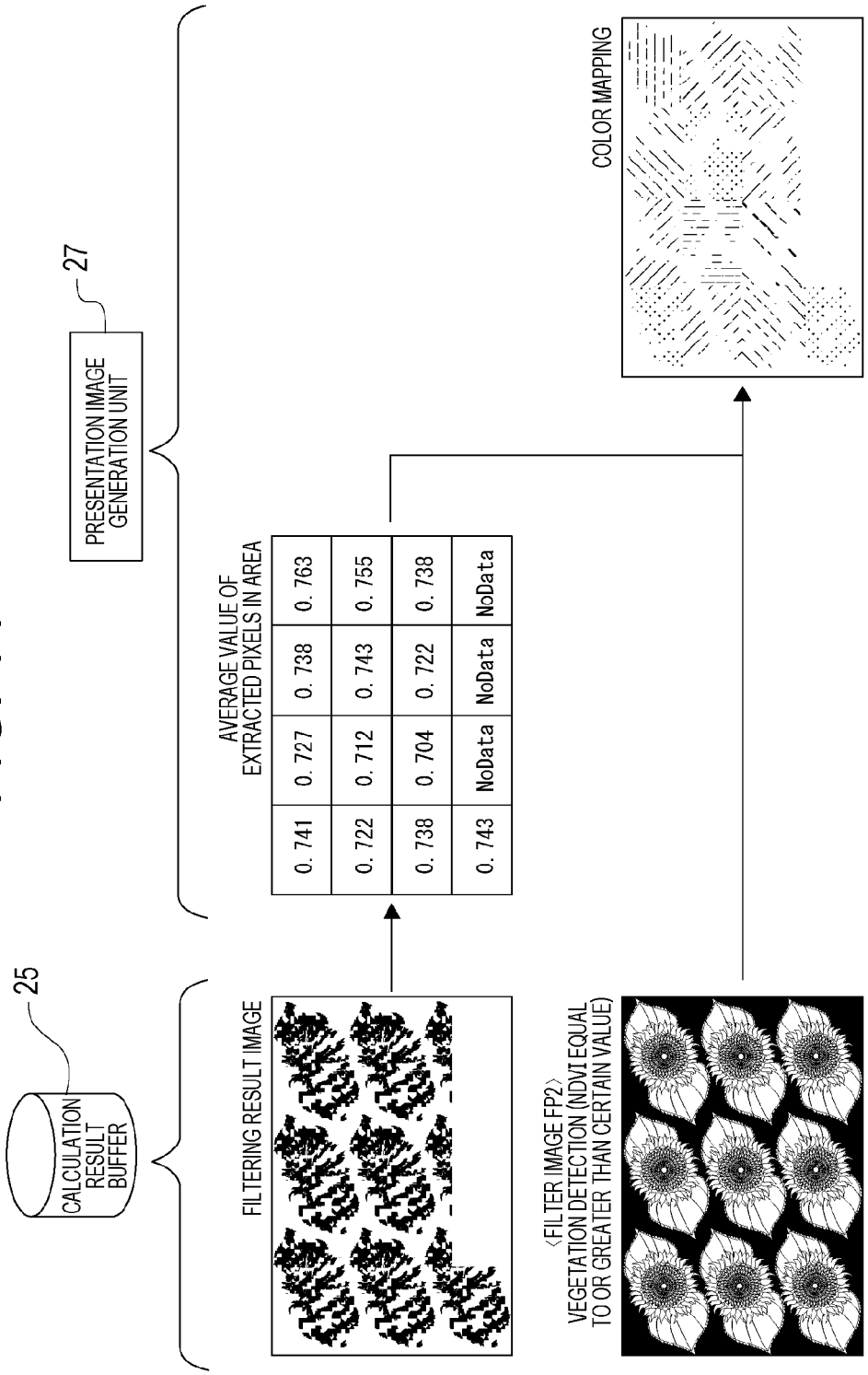
FIG. 14 is an explanatory diagram of imaging process example II according to the embodiment.

In FIG. 13, the same processing steps as those in FIG. 11 are denoted by the same step numbers to avoid redundant description.

In this case, after performing area division and the setting of the variable n (S201 and S202), the information processing apparatus 1 performs processing in steps S203, S206, and S210 to S213 while incrementing the variable n in step S208 until the variable n reaches the maximum value such that n=nmax in step S207.

Note that in the case of performing this processing example, the information processing apparatus 1 reads, in addition to the filtering result image, an image (for example, filter image FP2) showing a part with specific vegetation composition or a specific vegetation state, in step S141 of FIG. 7, as an image to which an image subjected to color assignment is to be pasted. Then, in step S201, the filtering result image and, for example, filter image FP are similarly divided into a plurality of areas.

Note that filter image FP2 is an image (vegetation detection image) obtained by extraction of pixels having NDVI values equal to or greater than a certain value.

In step S203, the information processing apparatus 1 confirms whether or not the pixel extracted by the filtering process exists in the nth area among the divided areas in the filtering result image, so that the process is branched.

In a case where the extracted pixel exists, the information processing apparatus 1 confirms whether or not a vegetation detection pixel exists in the nth area of the vegetation detection image (filter image FP2) in step S210.

In a case where the filtering extraction pixel exists in the nth area and a vegetation detection image (for example, a pixel having an NDVI value equal to or greater than a certain value) also exists in the nth area, the information processing apparatus 1 calculates a representative value (for example, an average value) of pixels in the area in step S211.

Then, in step S212, the information processing apparatus 1 sets a color corresponding to the calculated representative value (average value).

Moreover, in step S213, the information processing apparatus 1 assigns a color to pixels existing in the nth area of the vegetation detection pixel (filter image FP2).

Meanwhile, in a case where it is confirmed in step S203 that the pixel extracted by the filtering process does not exist in the nth area, or in a case where it is confirmed in step S210 that the pixel extracted as the vegetation detection image does not exist in the nth area, the information processing apparatus 1 places a background color (for example, white) in the nth area in step S206.

As a result of performing the above processing for each area, a color-mapped presentation image is generated.

The filtering result image and filter image FP2 described above are used as shown in, for example, FIG. 14.

The filtering result image is an image including pixels corresponding to NDVI values of pixels in a portion corresponding to both a vegetation portion and a sunlit portion. The filtering result image is divided into 16 areas to obtain the average value (representative value) of NDVI for each area.

Then, a color corresponding to the average value is selected and assigned to pixels in the same area of filter image FP2.

The background color (white) is assigned to all the pixels in an area indicated as "NO DATA" where an average value cannot be calculated or in an area of filter image FP2, where no pixel having an NDVI value equal to a certain value exists.

As a result, a color mapping image is generated as shown in the drawing. This is an image obtained by assignment of colors to extracted pixels in filter image FP2, according to the average values.

Therefore, the average value is represented by a color at a location where NDVI is equal to or greater than a certain value in the image. Thus, the image enables a user to easily grasp a vegetation state in each area.

Next, presentation image generation process example III will be described with reference to FIGS. 15 and 16.

This is an example of overlay display on a visible light image.

Figure 15:
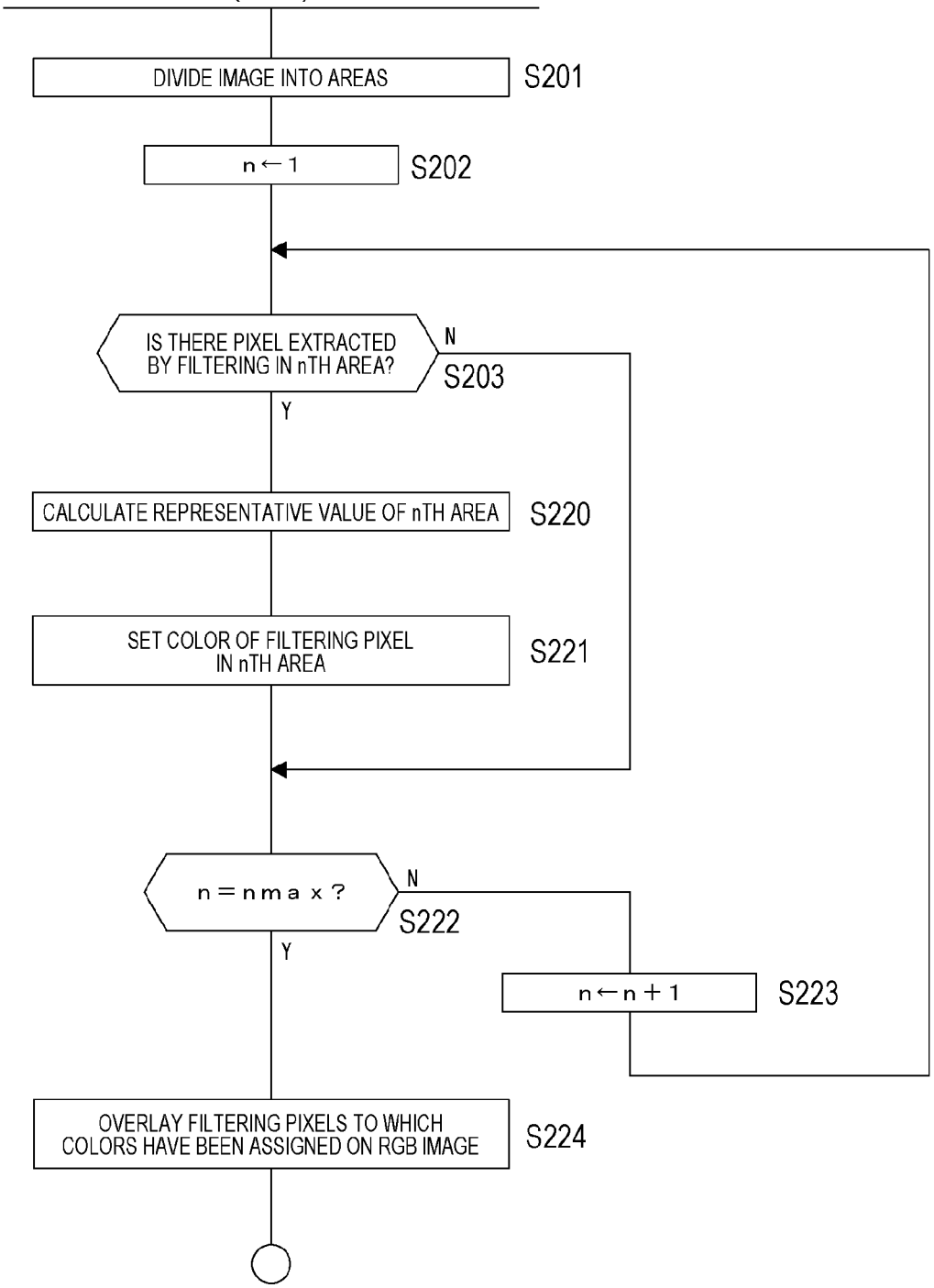
FIG. 15 is a flowchart of imaging process example III according to the embodiment.

In FIG. 15, the same processing steps as those in FIG. 11 are denoted by the same step numbers.

In this case, after performing area division and the setting of the variable n (S201 and S202), the information processing apparatus 1 performs processing in steps S203, S220, and S221 while incrementing the variable n in step S223 until the variable n reaches the maximum value such that n=nmax in step S222.

Note that in the case of performing this processing example, an RGB image (visible light image) is read in step S141 in FIG. 7, in addition to a filtering result image. Note that it is conceivable that, for example, an RGB image supplied from the imaging device 250 and stored in the input buffer 22 is read.

In step S201, the filtering result image and the RGB image are similarly divided into a plurality of areas.

In step S203, the information processing apparatus 1 confirms whether or not the pixel extracted by the filtering process exists in the nth area among the divided areas in the filtering result image, so that the process is branched.

In a case where the extracted pixel exists, the information processing apparatus 1 calculates a representative value (for example, an average value) of pixels in the area in step S220.

Then, in step S221, the information processing apparatus 1 sets a color corresponding to the calculated representative value (average value). This color is set as the color of each pixel existing in the area of the filtering result image.

Meanwhile, in a case where it is confirmed in step S203 that the pixel extracted by the filtering process does not exist in the nth area, the processing of steps S220 and S221 is not performed for the nth area.

As a result of performing the above processing for each area, the color is set for each area where the pixel extracted by the filtering process is present.

When the variable n reaches the maximum value such that n=nmax in step S222, the information processing apparatus 1 proceeds to step S224, and overlays pixels of the filtering result image, to which colors have been set, on the RGB image.

Figure 16:
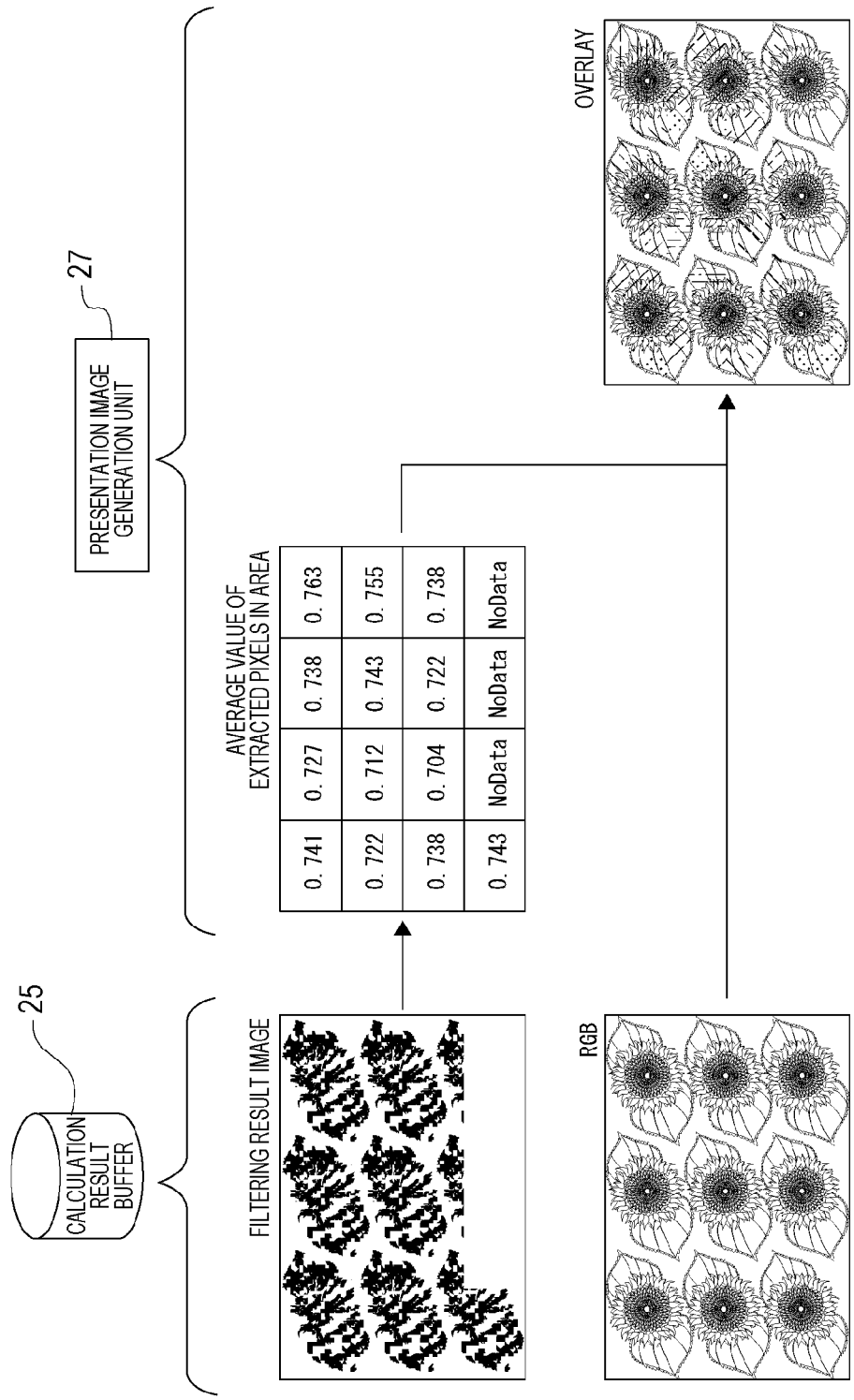
FIG. 16 is an explanatory diagram of imaging process example III according to the embodiment.

That is, as shown in FIG. 16, the color assigned to each area is overlaid on a pixel of the RGB image, which exists in the filtering result image. The drawing shows a state in which corresponding pixels are colored.

That is, a color indicating the filtering result is represented on the RGB image. Therefore, the representative value of NDVI of a sunlit portion with NDVI equal to or greater than a certain value is represented by a color on an image to be visually recognized by a user in normal cases. Thus, the image enables the user to easily grasp a vegetation state.

Note that instead of overlay, a corresponding pixel may be overwritten with an assigned color.

Presentation image generation process examples I, II, and III have been described above as examples.

Presentation image generation process example I is an example of generating an image by use of a filtering result image, in which an imaged range is divided into specific units and colors are assigned to representative values of the divided units.

In presentation image generation process example II, a filtering result image and an image (filter image FP2) of a part with specific vegetation composition or a specific vegetation state are used, and colors are assigned to the filtering result image. Then, the filtering result image subjected to color assignment is combined with the image (filter image FP2) of the part with specific vegetation composition or a specific vegetation state.

Presentation image generation process example III is an example in which a filtering result image is subjected to color assignment and overlaid on a visible light image to be displayed.

In any of the examples, colors are assigned to a filtering result image so that an evaluation result can be represented by colors.

In particular, as a result of assigning a color in units of areas, there is generated an easy-to-understand image that represents a state in a range imaged as the high-resolution image HR.

The presentation images generated in these examples are stored in the output buffer 28 in step S143 in FIG. 7.

Each of these presentation images can be output as the output image Pout by the image output unit 30 and presented to a user.

That is, the information processing apparatus 1 proceeds from step S160 to S161 in FIG. 7 at the timing of outputting an image.

In step S161, the information processing apparatus 1 (image output unit 30) reads an image (for example, a presentation image) to be output from the output buffer 28, and outputs the image as the output image Pout to the outside. As a result, a presentation image is displayed or recorded, which specifically represents the result of measurement of a sample section on the basis of, for example, color mapping and the like.

Note that the presentation images described above are images in the imaging ranges of the high-resolution images HR.

In the present embodiment, it is also possible to perform image composition by also using the low-resolution image LR and to output, as the output image Pout, an image representing the entire measurement target of the farm field 300.

<4. Composition with Low-Resolution Image>

In the processes of FIGS. 6 and 7, the information processing apparatus 1 proceeds from step S150 to S151 in FIG. 7 at the timing when a composition process is performed by the function of the image composition unit 29.

In step S151, the information processing apparatus 1 (image composition unit 29) reads necessary images, performs a composition process, and stores a generated composite image in the output buffer 28 in step S152.

Hereinafter, composition process examples I, II, III, and IV will be described as examples of the composition process of step S151.

First, composition process example I will be described with reference to FIGS. 17 and 18.

This is an example in which a presentation image and a low-resolution image LR are aligned and pasted together.

Figure 17:
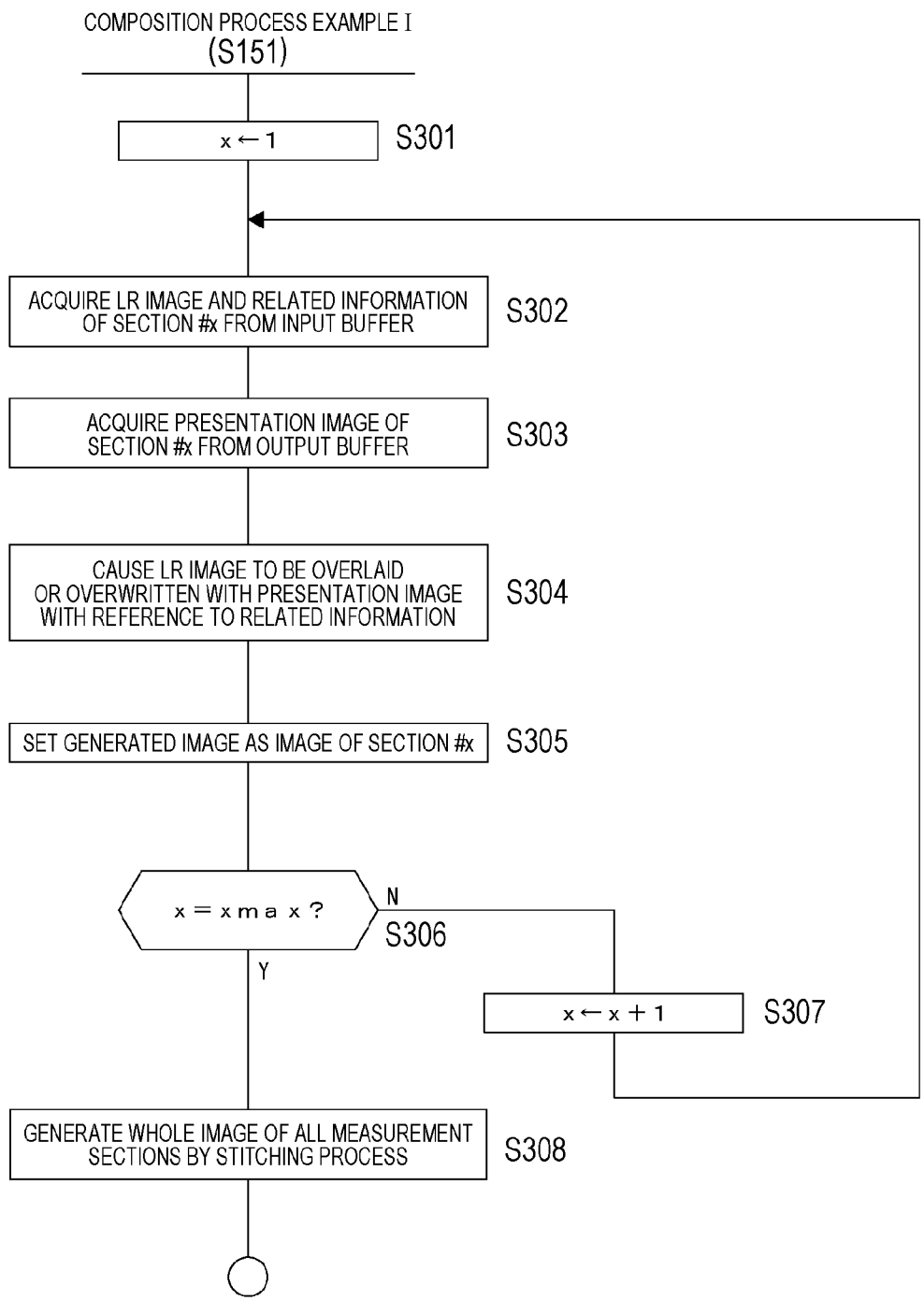
FIG. 17 is a flowchart of composition process example I according to the embodiment.

In step S301 in FIG. 17, the information processing apparatus 1 sets the variable x such that x=1. Note that the variable x is a variable for representing each section of a measurement target.

Figure 18:
FIG. 18 is an explanatory diagram of composition process example I according to the embodiment.

For example, assume that an image 300P of FIG. 18 is an image of the entire measurement target generated by the stitching of low-resolution images LR #1, LR #2, LR #3, . . . , LR #LN (although section #LN is not shown, "LN" is defined as the last section number) respectively captured as images of sections #1, #2, #3, . . . , #LN of the farm field 300 as shown in FIG. 4A.

The variable x is a variable representing certain section #x which is one of sections #1 to #LN in the measurement target to be imaged as the low-resolution images LR so as to form the image 300P as described above. Note that the section here refers to a range to be imaged as a single low-resolution image LR, and an overlap between adjacent sections serves as a margin for stitching.

The information processing apparatus 1 repeats the processing of steps S302 to S305 in FIG. 17 while incrementing the variable x in step S307 until the variable x reaches the maximum value xmax in step S306. The maximum value xmax is a value corresponding to "LN" described above. That is, the processing of steps S302 to S305 is performed for each single low-resolution image LR.

In step S302, the information processing apparatus 1 reads a low-resolution image LR and related information of section #x from the input buffer 22.

In step S303, the information processing apparatus 1 reads a presentation image (for example, the color mapping image in FIG. 12) of section #x from the output buffer 28 with reference to the related information. The presentation image of section #x is a presentation image generated on the basis of a high-resolution image HR of section #x determined from the related information.

In step S304, the information processing apparatus 1 refers to the related information to determine the position of the high-resolution image HR in the low-resolution image LR, and performs overlay (composition of a translucent presentation image) or overwriting (composition of an opaque presentation image) of the presentation image at the position of the high-resolution image HR.

Then, in step S305, the information processing apparatus 1 sets (temporarily stores), as image G #x of section #x, an image obtained by the overlay or the like of the presentation image on the low-resolution image LR.

Such processing is performed for each section. For example, only images G #10 to G #18 for sections #10 to #18 are illustrated in FIG. 18.

Each image G #x is an image obtained as a result of placing a presentation image CP in the low-resolution image LR.

When it is confirmed in step S306 that the above processing has been completed for all the sections, the information processing apparatus 1 proceeds to step S308, and generates the whole image 300P of all the measurement sections by performing a stitching process. That is, the information processing apparatus 1 generates the whole image 300P by stitching each of images G #1 to G #(xmax) temporarily stored in step S305. For the sake of description, FIG. 18 shows only a portion corresponding to stitched images G #10 to G #18 as an example of stitching the low-resolution images LR combined with the presentation images CP. Such a stitching process is performed for the entire area to generate the whole image 300P. Although not shown for simplicity, the low-resolution images LR are similarly combined with the presentation images CP also for sections other than sections #10 to #18, and resultant composite images for the respective sections are stitched to generate the image 300P.

In this way, the presentation image CP and the low-resolution image LR are aligned and pasted together. As a result, a measurement result is represented by the presentation image CP for each section as the low-resolution image LR. That is, it is possible for a user to confirm the evaluation result obtained on the basis of the high-resolution image HR while grasping the position of each section in the farm field 300.

Note that although FIG. 17 shows an example in which the stitching process is performed in step S308, the whole image 300P may be generated by a process of pasting images G #1 to G #(xmax) at the stage of, for example, step S308, instead of stitching the images. That is, the image 300P may be generated by, for example, a process of performing mapping according to position information corresponding to each low-resolution image LR. For example, it is possible to use, as the position information, GPS information and the like at the time of capturing the low-resolution image LR or the high-resolution image HR.

Furthermore, performing a stitching process as shown in FIG. 17 may cause some disadvantages in image quality in some cases. Depending on software for the stitching process, processing on images G #1 to G #(xmax) obtained as a result of combining low-resolution images LR with colorful presentation images CP may affect detection of feature points, and thus may affect stitching processing performance. In a case where there is such a concern, it is conceivable that the stitching process is first performed on low-resolution images LR and then presentation images CP are pasted thereto, which are generated from high-resolution images HR corresponding to the respective low-resolution images LR.

That is, in this case, the reading of low-resolution images LR #1, . . . , LR #LN obtained by the imaging of respective sections #1, . . . , #LN, the acquisition of related information, and the stitching process are performed as processing before step S301 of FIG. 17, so that the whole image 300P is generated. Then, steps S301, S303, S304, S306, and S307 are performed. In this case, it is sufficient if the presentation image CP is pasted to the corresponding low-resolution image LR by use of the related information (position information) in step S304. Thus, steps S302, S305, and S308 are not necessary.

Next, composition process example II will be described with reference to FIGS. 19, 20, and 21.

This is an example in which the range of the low-resolution image LR is overlaid with the representative value (average value or maximum value) of the presentation image, also including a portion that cannot be imaged as the high-resolution image HR in each section.

Figure 19:
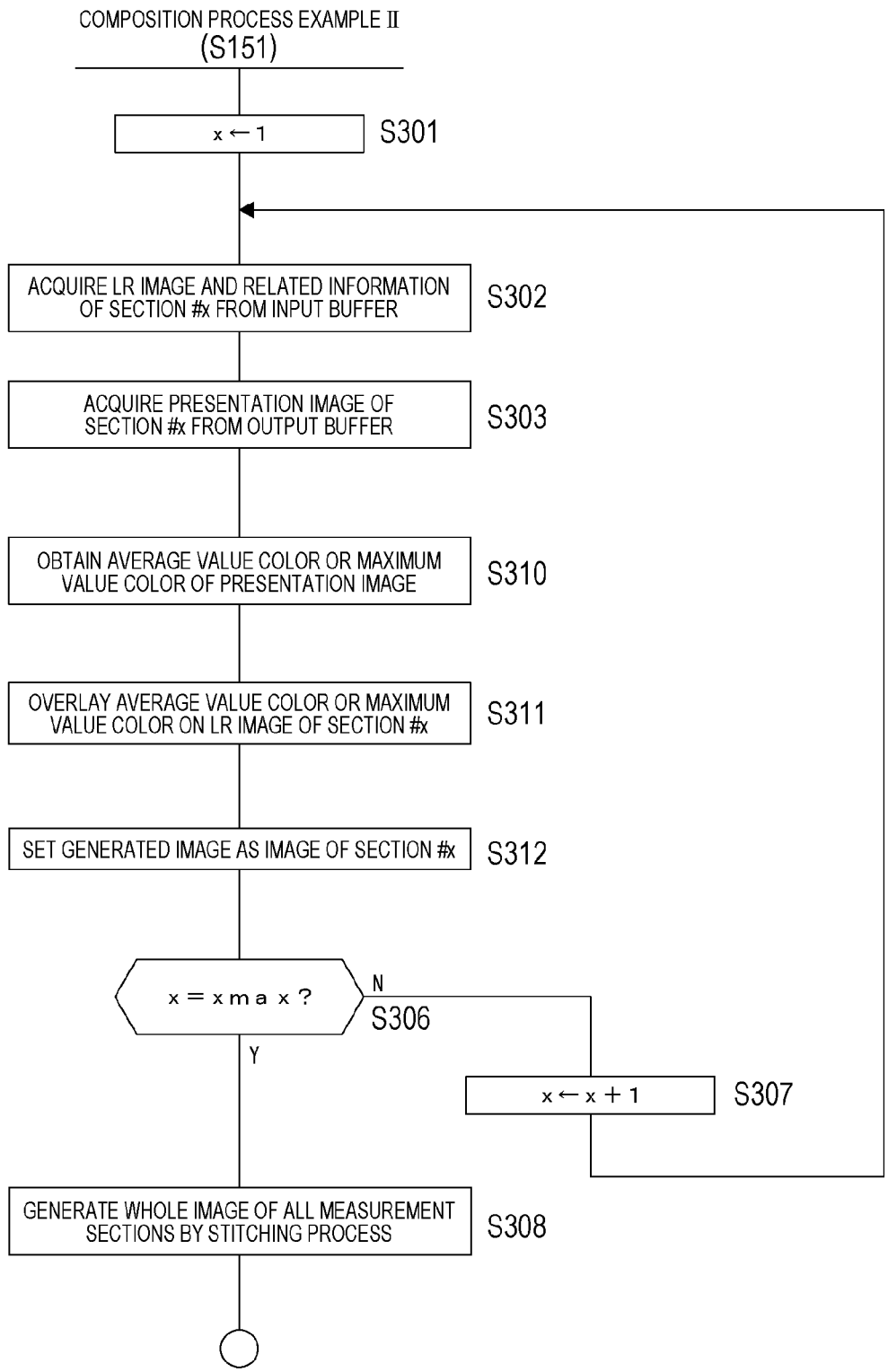
FIG. 19 is a flowchart of composition process example II according to the embodiment.

In FIG. 19, the same processing steps as those in FIG. 17 are denoted by the same step numbers.

In the process of FIG. 19, the information processing apparatus 1 performs processing of steps S302 to S312 for each section (for each low-resolution image LR) by performing the processing of steps S301, S306, and S307 similar to those in FIG. 17.

In step S302, the information processing apparatus 1 reads a low-resolution image LR and related information of section #x from the input buffer 22.

In step S303, the information processing apparatus 1 reads a presentation image (for example, the color mapping image in FIG. 12) corresponding to section #x from the output buffer 28 with reference to the related information. Note that if information on the average value or maximum value for each area calculated at the time of generating the presentation image described above is stored in the output buffer 28, the information may be read therefrom.

In step S310, the information processing apparatus 1 obtains an average value color or a maximum value color of the presentation image.

In a case where color mapping is performed on the presentation image as described above, an average value or a maximum value is obtained for each area. In contrast, for example, an average value or a maximum value is obtained for the entire range of the high-resolution image HR (presentation image) in step S310.

For example, an average color in a presentation image as a color mapping image is obtained. It is conceivable that the color is obtained as follows. The color of each area in the color mapping image is converted into a value. Then, an average value or maximum value of the converted values is obtained. Thus, a color is selected again on the basis of the value.

Alternatively, if the information on the average value or maximum value for each area calculated at the time of generating the presentation image is stored as described above, it is possible to perform recalculation by using those values and obtain the average value or maximum value of the entire presentation image. A color for the entire presentation image may be selected on the basis of the value.

In either case, a color (average value color or maximum value color) corresponding to the average value or maximum value of the entire presentation image is obtained in step S310.

In step S311, the information processing apparatus 1 performs composition by overlaying the average value color or the maximum value color on the range of the low-resolution image LR of section #x.

Then, in step S312, the information processing apparatus 1 sets (temporarily stores), as image G #x of section #x, an image obtained by the overlay or the like of the average value color or the maximum value color of the presentation image on the entire low-resolution image LR.

Such processing is performed for each section.

Then, when it is confirmed in step S306 that the above processing has been completed for all the sections, the information processing apparatus 1 proceeds to step S308, and generates the whole image 300P of all the measurement sections by performing a stitching process. That is, the information processing apparatus 1 generates the whole image 300P by stitching each of images G #1 to G #(xmax) temporarily stored in step S305.

Figure 20:
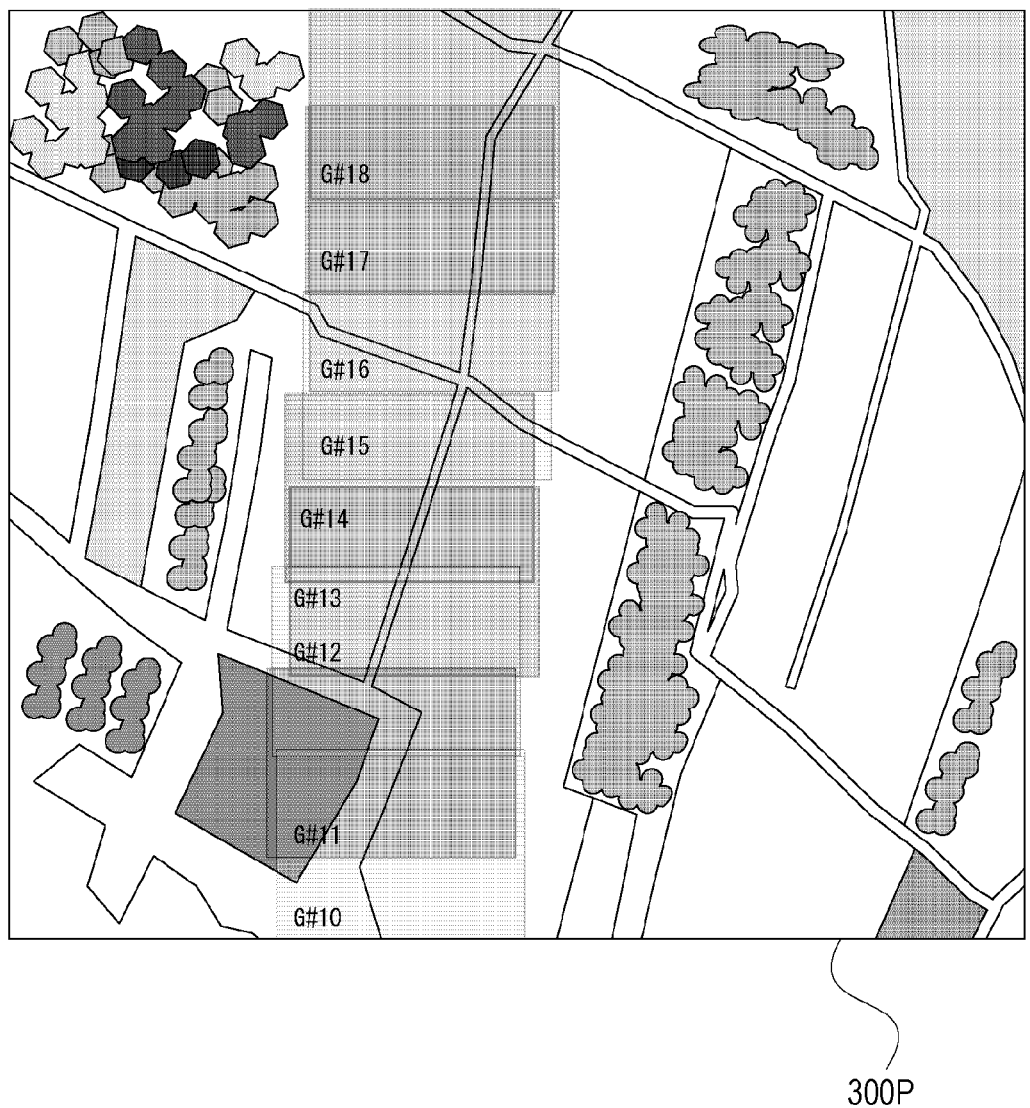
FIG. 20 is an explanatory diagram of composition process example II according to the embodiment.

FIG. 20 shows a state where images obtained by the overlay of the average value colors of presentation images on low-resolution images have been stitched. Although only images G #10 to G #18 are shown as in FIG. 18, each of images G #1 to G #(xmax) (not shown) is thus stitched to generate the whole image 300P.

Figure 21:
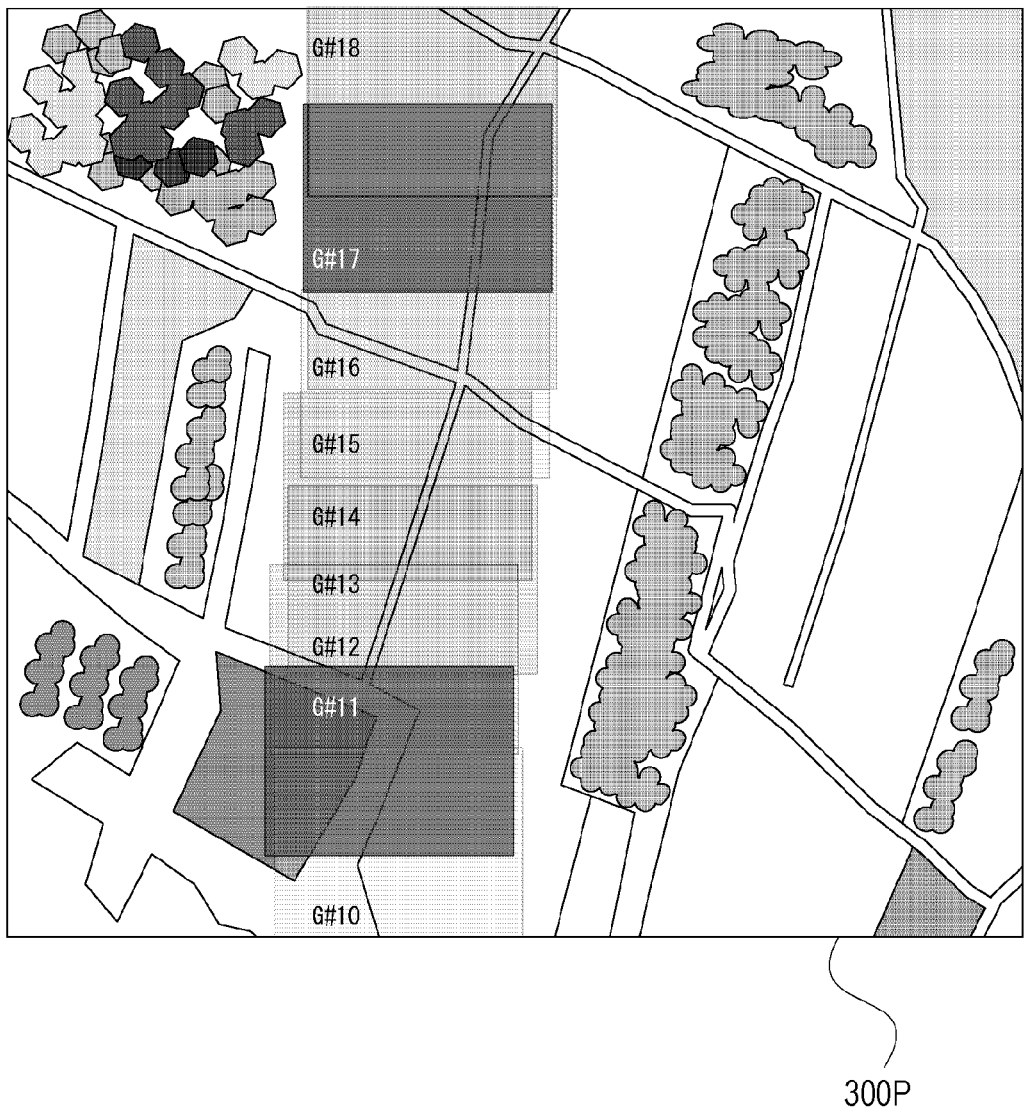
FIG. 21 is an explanatory diagram of composition process example II according to the embodiment.

Furthermore, FIG. 21 shows a state where images G #10 to G #18 obtained by the overlay of the maximum value colors of presentation images on low-resolution images have been stitched. Each of images G #1 to G #(xmax) is thus stitched to generate the whole image 300P.

The image 300P combined in this manner represents a measurement result (evaluation result) obtained from the high-resolution image HR for each section imaged as the low-resolution image LR. That is, it is possible for a user to confirm the average value or maximum value of the measurement result for each section in the farm field 300.

In particular, in the case of overlaying average value colors as shown in FIG. 20, it is easy to grasp the state of each section. According to the image 300P, it is possible to improve the visibility in viewing an overall trend from a higher perspective in a case where a coverage ratio for sampling measurement is low.

Furthermore, in the case of overlaying maximum value colors as shown in FIG. 21, although depending on a vegetation index to be used, it is easier to understand, for example, a section with good growth, a section that needs attention, or the like. For example, it is possible to improve visibility in finding a small abnormal part.

Note that although an average value color and a maximum value color are used in the above examples, it is also conceivable that, in this case, a color corresponding to the minimum value, the centroid value, the mode value, or the like of each section is overlaid on the low-resolution image LR.

Figure 28:
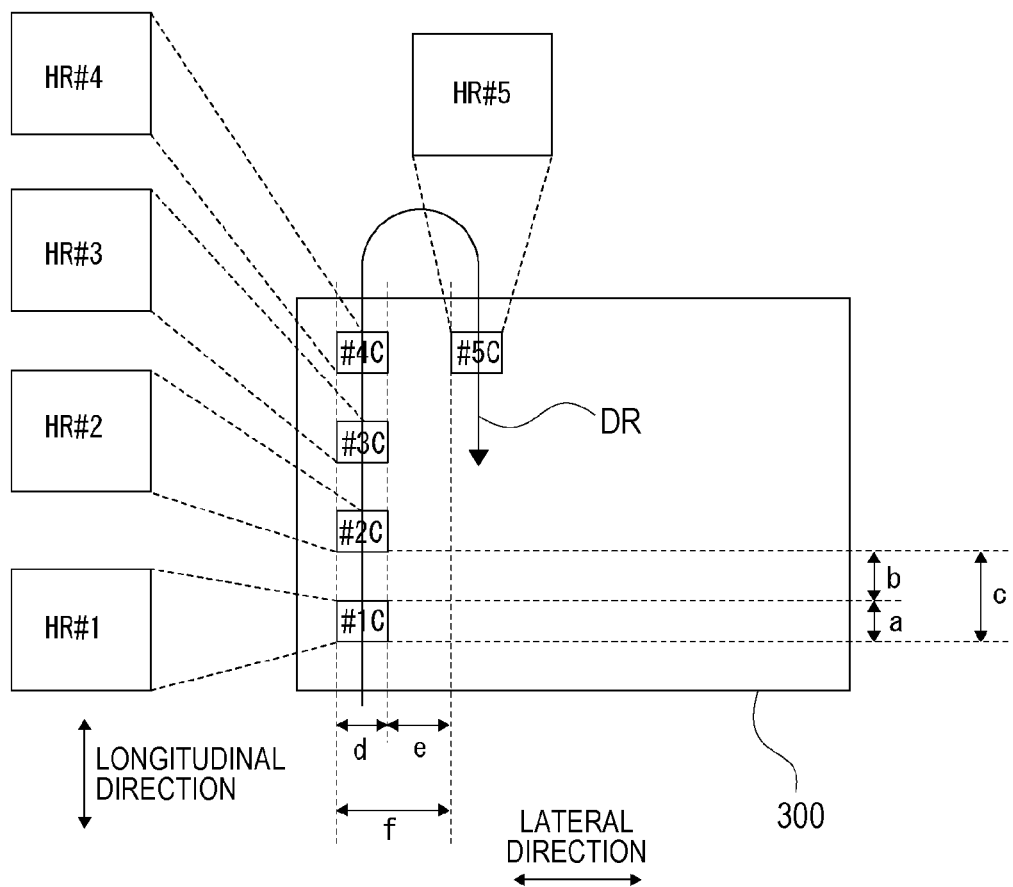
FIG. 28 is an explanatory diagram of imaging intervals between high-resolution images according to the embodiment.

Furthermore, it is also conceivable that the stitching process of the low-resolution images LR is performed first also in composition process example II and composition process examples III and IV to be described later, as in composition process example I. However, in the case of composition process example II, if the low-resolution images LR are stitched first, each boundary between the original low-resolution images LR becomes unrecognizable, so that the overlay ranges of presentation images become unrecognizable. In such a case, it is conceivable that the width a and the width d of the high-resolution image HR, which will be described later with reference to FIG. 28, are enlarged to a size with the interval c and the interval f in the same drawing by use of a coverage ratio, and that the average value color or maximum value color of a presentation image is overlaid on the range. The same applies to composition process examples III and IV to be described next.

Note that if it is possible to acquire boundary information for each original low-resolution image LR used during the stitching process, there is no such problem. In such a case, it is sufficient if average value colors or maximum value colors are overlaid, by use of the boundary information, on the image 300P generated as a result of the stitching process of the low-resolution images LR performed earlier.

Composition process example III will be described with reference to FIGS. 22 and 23.

This is an example in which different colors are assigned to the ranges of low-resolution images LR also including portions that cannot be imaged as high-resolution images HR in respective sections, according to whether or not a sampling measurement result is within a certain value range.

Figure 22:
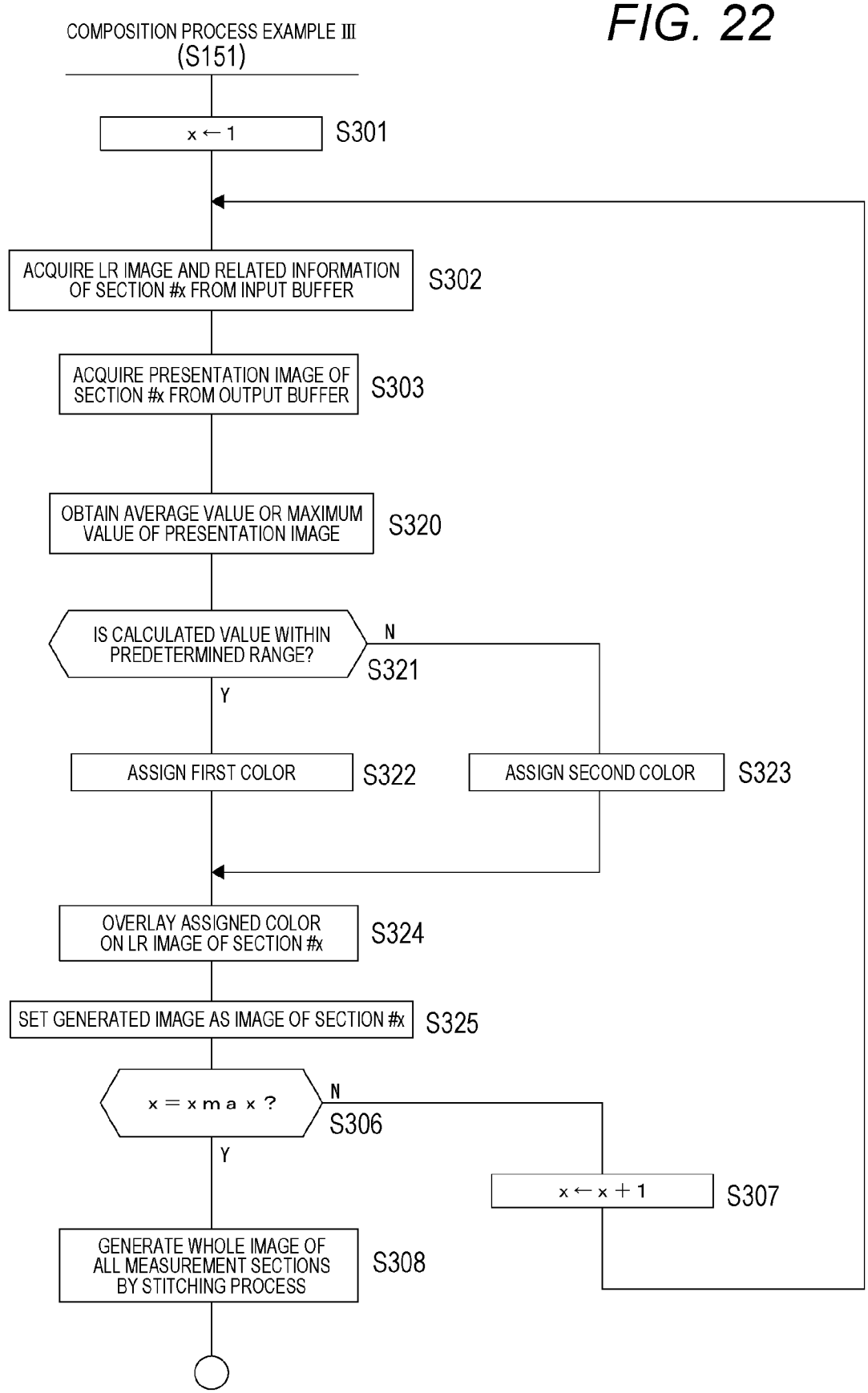
FIG. 22 is a flowchart of composition process example III according to the embodiment.

In FIG. 22, the same processing steps as those in FIG. 17 are denoted by the same step numbers.

In the process of FIG. 22, the information processing apparatus 1 performs processing of steps S302, S303, and S320 to S325 for each section (for each low-resolution image LR) by performing the processing of steps S301, S306, and S307 similar to those in FIG. 17.

In step S302, the information processing apparatus 1 reads a low-resolution image LR and related information of section #x from the input buffer 22.

In step S303, the information processing apparatus 1 reads a presentation image (for example, the color mapping image in FIG. 12) corresponding to section #x from the output buffer 28 with reference to the related information. If the information on the average value or maximum value for each area calculated at the time of generating the presentation image is stored in the output buffer 28, the information may be read therefrom also in this case.

In step S320, the information processing apparatus 1 calculates an average value or a maximum value of the presentation image.

In this case, the information processing apparatus 1 obtains, for example, an average color or a color as a maximum value in the presentation image as a color mapping image, and converts the color into a numerical value. Alternatively, if the information on the average value or maximum value for each area calculated at the time of generating the presentation image is stored as described above, an average value or a maximum value of the entire presentation image may be obtained by use of those values.

In step S321, the information processing apparatus 1 determines whether or not the calculated average value or maximum value is within a predetermined range as upper and lower threshold values.

For example, there is set in advance the appropriate range of an average value or the appropriate range of a maximum value.

Then, if the calculated value is within the appropriate range, the information processing apparatus 1 assigns a first color to section #x in step S322.

Furthermore, if the calculated value is not within the appropriate range, the information processing apparatus 1 assigns a second color to section #x in step S323.

In step S324, the information processing apparatus 1 performs composition by overlaying the color (first color or second color) assigned in step S322 or S323 on the range of the low-resolution image LR of section #x.

Then, in step S325, the information processing apparatus 1 sets (temporarily stores), as image G #x of section #x, an image obtained by the overlay or the like of the first color or the second color on the entire low-resolution image LR.

Such processing is performed for each section.

Then, when it is confirmed in step S306 that the above processing has been completed for all the sections, the information processing apparatus 1 proceeds to step S308, and generates the whole image 300P of all the measurement sections by performing a process of stitching each of images G #1 to G #(xmax) temporarily stored in step S305.

Figure 23:
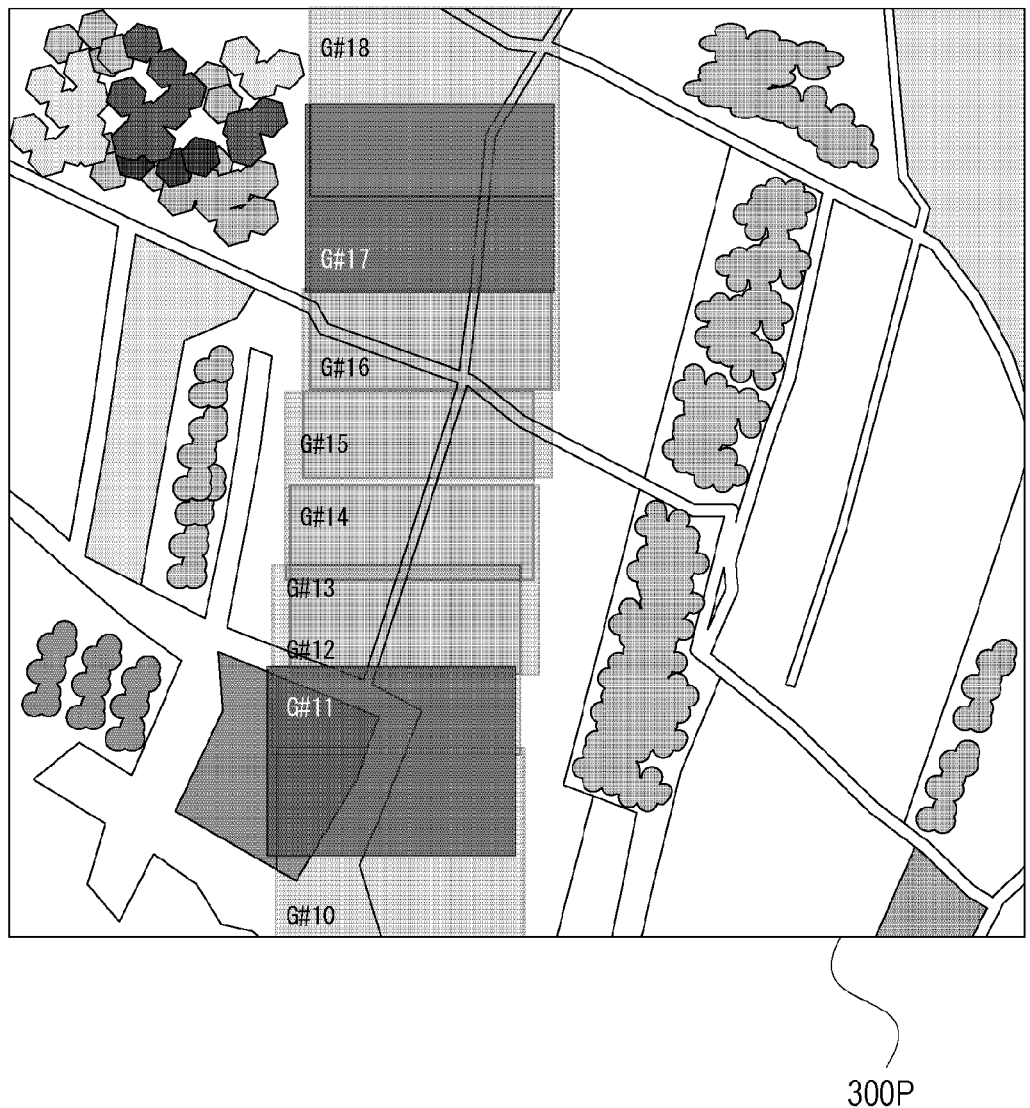
FIG. 23 is an explanatory diagram of composition process example III according to the embodiment.

FIG. 23 shows a state in which images G #10 to G #18 obtained by the overlay of the first color or the second color on low-resolution images have been stitched. Each of images G #1 to G #(xmax) (not shown) is thus stitched to generate the whole image 300P.

Each section is colored in either of the two colors. It is thus possible to clearly recognize, on the basis of the image, whether the state of each section is appropriate or inappropriate (for example, some kind of growth abnormality has occurred, or the like).

Note that in the above example, the average value or the maximum value is obtained, and it is determined whether or not the obtained value is within an appropriate range to select the first color or the second color. However, it is also conceivable that the appropriateness of the minimum value, the centroid value, the mode value, or the like of each section is determined on the basis of a comparison with a threshold range and a color is selected and overlaid on the low-resolution image LR.

Composition process example IV will be described with reference to FIGS. 24 and 25.

This is an example in which a presentation image and a low-resolution image LR are aligned and pasted together as in the composition process example described above and a color selected by either of the techniques of composition process examples II and III described above is overlaid on a portion that cannot be imaged as the high-resolution image HR, in each section.

Figure 24:
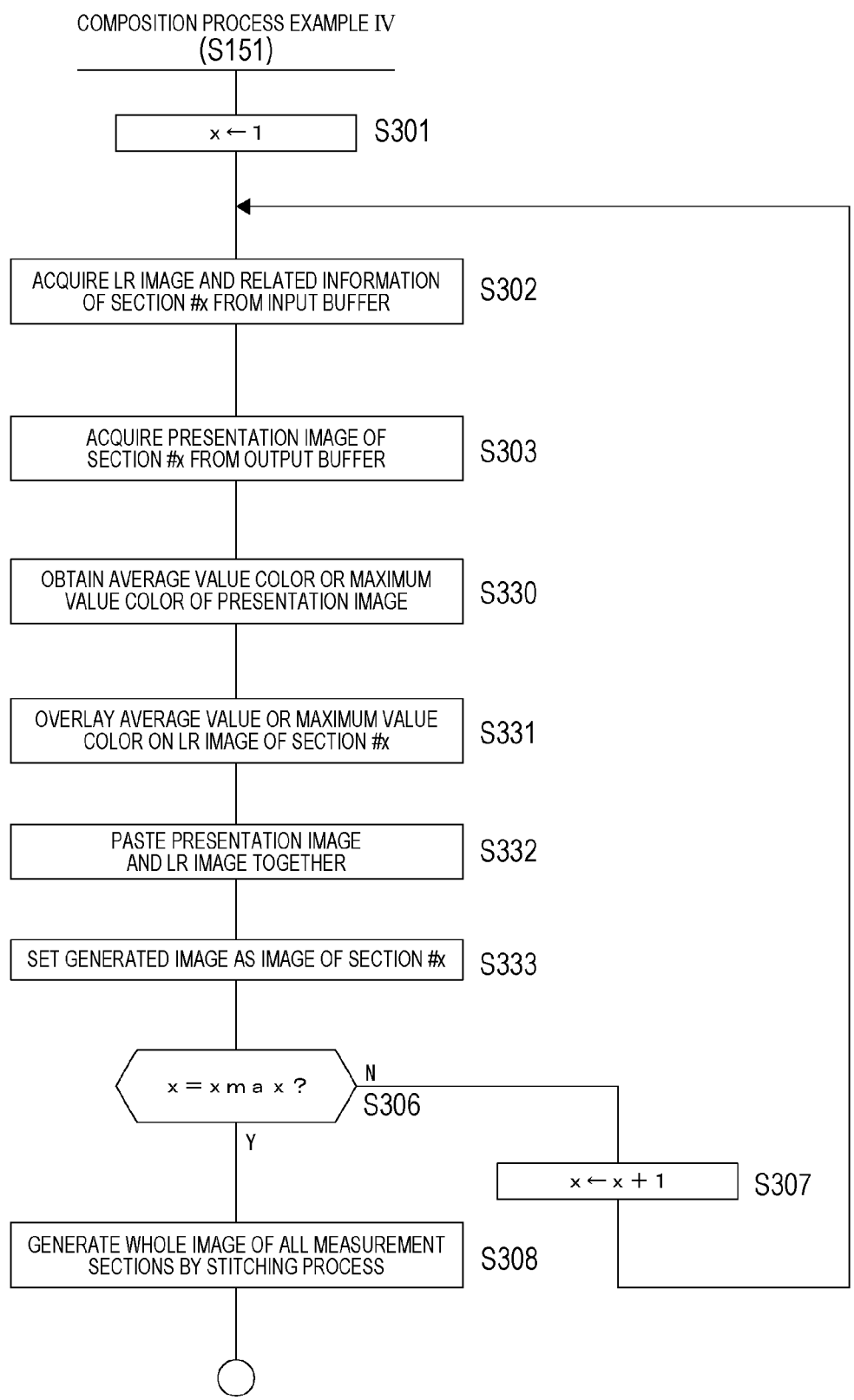
FIG. 24 is a flowchart of composition process example IV according to the embodiment.

In FIG. 24, the same processing steps as those in FIG. 17 are denoted by the same step numbers.

In the process of FIG. 24, the information processing apparatus 1 performs processing of steps S302, S303, and S330 to S333 for each section (for each low-resolution image LR) by performing the processing of steps S301, S306, and S307 similar to those in FIG. 17.

In step S302, the information processing apparatus 1 reads a low-resolution image LR and related information of section #x from the input buffer 22.

In step S303, the information processing apparatus 1 reads a presentation image corresponding to section #x from the output buffer 28 with reference to the related information. If the information on the average value or maximum value for each area calculated at the time of generating the presentation image is stored in the output buffer 28, the information may be read therefrom also in this case.

In step S330, the information processing apparatus 1 obtains an average value color or a maximum value color of the presentation image (as in step S310 of FIG. 19).

In step S331, the information processing apparatus 1 overlays the average value color or the maximum value color on the range of the low-resolution image LR of section #x.

In step S332, the information processing apparatus 1 refers to the related information to determine the position of the high-resolution image HR in the low-resolution image LR, and performs overlay (composition of a translucent presentation image) or overwriting (composition of an opaque presentation image) of the presentation image (color mapping image) at the position of the high-resolution image HR.

Then, in step S333, the information processing apparatus 1 sets (temporarily stores) the composite image generated as described above as image G #x of section #x.

Such processing is performed for each section.

Then, when it is confirmed in step S306 that the above processing has been completed for all the sections, the information processing apparatus 1 proceeds to step S308, and generates the whole image 300P of all the measurement sections by performing a process of stitching each of images G #1 to G #(xmax) temporarily stored in step S305.

Figure 25:
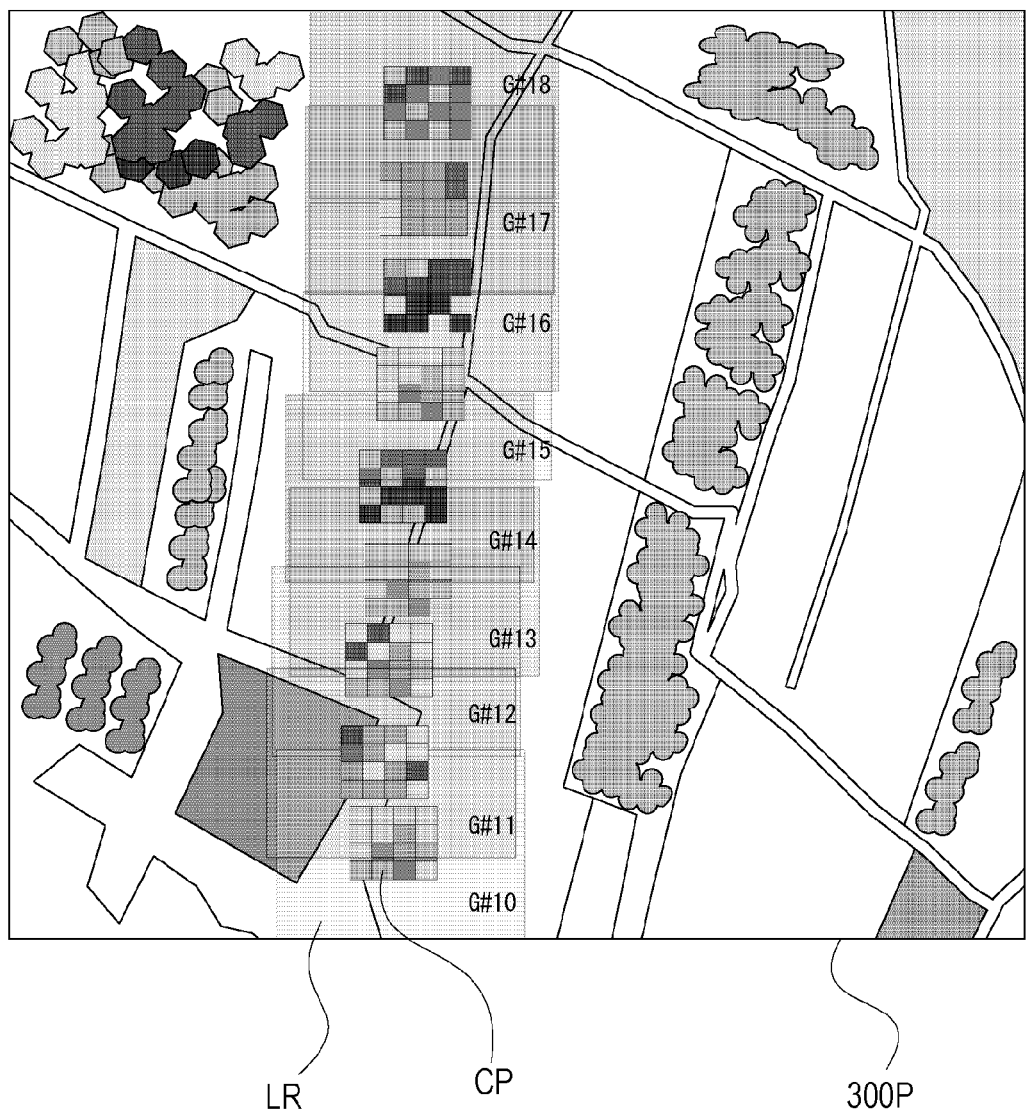
FIG. 25 is an explanatory diagram of composition process example IV according to the embodiment.

FIG. 25 shows stitched images G #10 to G #18 in which the low-resolution images LR are overlaid or overwritten with the presentation images CP and in addition, the ranges of the low-resolution images LR, excluding the presentation images CP, are overlaid with the average value colors or the maximum value colors. Each of images G #1 to G #(xmax) (not shown) is thus stitched to generate the whole image 300P.

As a result, it is possible to generate the image 300P that enables a user to confirm the presentation image CP obtained on the basis of the high-resolution image HR and to recognize the overall state of each section #x.

Note that the above-described example of overlaying the average value color or the maximum value color in step S331 corresponds to a case where composition process examples I and II are combined. In that case, it is also conceivable that a color is selected according to the minimum value, the centroid value, or the mode value of each section, and then overlaid.

Furthermore, in a case where composition process examples I and III are combined, whether or not the representative value of the entire section is within an appropriate range is determined for each section #x, and the first color or the second color is selected and overlaid. In this way, it is possible to generate the image 300P that enables a user to confirm the presentation image CP obtained on the basis of the high-resolution image HR and to clearly recognize whether the state of each section #x is appropriate or inappropriate.

Composition process examples I, II, III, and IV have been cited above as examples.

The composite images of the low-resolution images LR and the presentation images, generated in these examples are stored in the output buffer 28 in step S152 in FIG. 7.

Each of these composite images can be output as the output image Pout by the image output unit 30 and presented to a user.

That is, the information processing apparatus 1 proceeds from step S160 to S161 in FIG. 7 at the timing of outputting an image.

In step S161, the information processing apparatus 1 (image output unit 30) reads an image (for example, a composite image of the low-resolution image LR and the presentation image) to be output from the output buffer 28, and outputs the image as the output image Pout to the outside. As a result, for example, a composite image that covers the entire farm field 300 is displayed or recorded.

<5. System Configuration of Second Embodiment>

Figure 26:
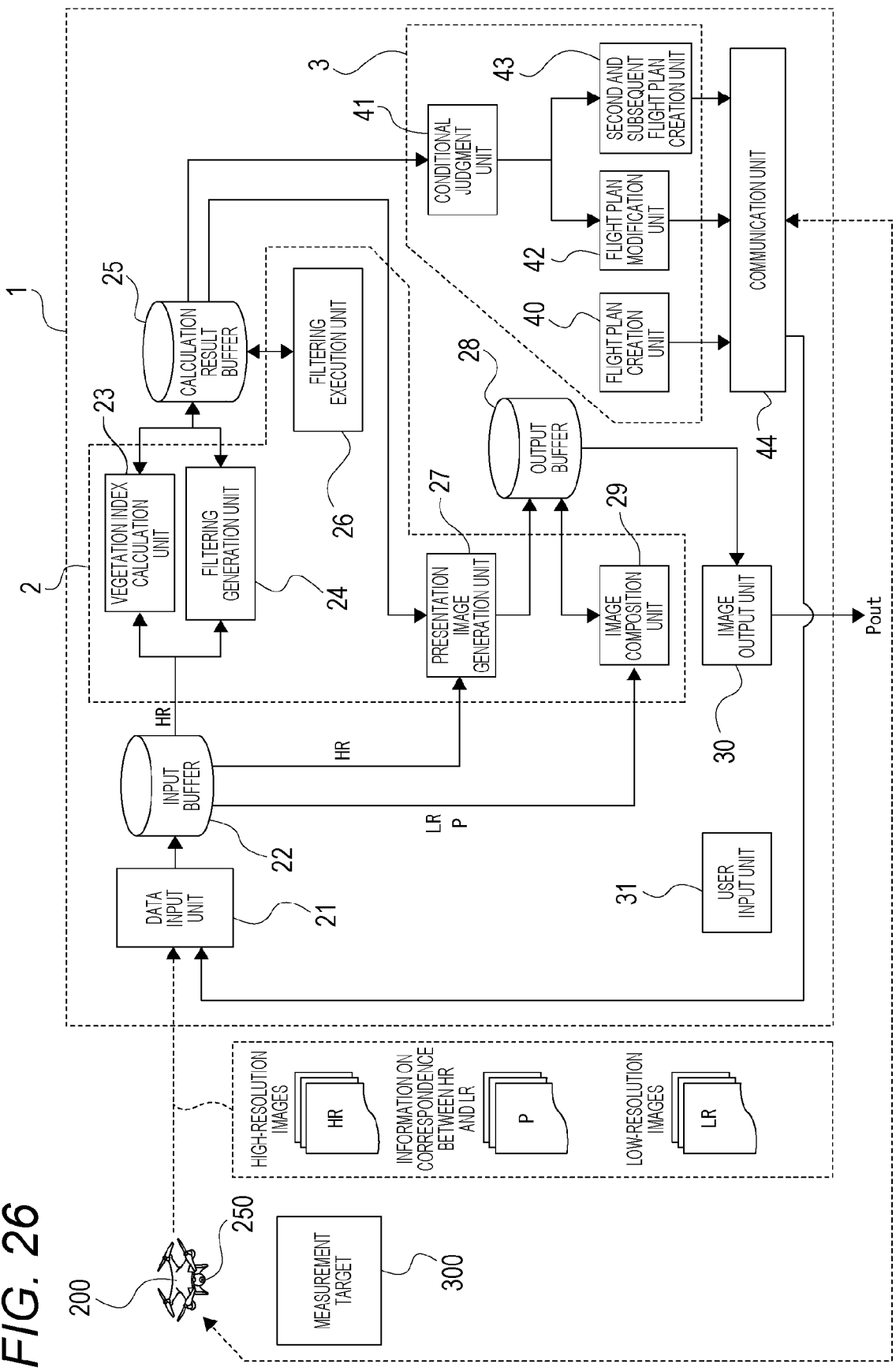
FIG. 26 is a block diagram of a system configuration according to a second embodiment.

FIG. 26 shows a system configuration according to a second embodiment. An information processing apparatus 1 according to the second embodiment includes a flight control unit 3 and a communication unit 44 in addition to the configuration according to the first embodiment shown in FIG. 2. Other constituent elements are similar to those in FIG. 2, and are denoted by the same reference numerals. Thus, descriptions thereof are omitted.

The flight control unit 3 in the information processing apparatus 1 includes a flight plan creation unit 40, a conditional judgment unit 41, a flight plan modification unit 42, and a second and subsequent flight plan creation unit 43. These indicate functions to be implemented by software in the information processing apparatus 1.

Furthermore, the communication unit 44 communicates with a flight vehicle 200 by wireless communication.

With these constituent elements, in the second embodiment, the information processing apparatus 1 controls a flight path and imaging operation (imaging timing, and the like) of the flight vehicle 200 so that flight and imaging can be performed according to circumstances.

Each function of the flight control unit 3 will be described.

The flight plan creation unit 40 serves the function of setting a flight path of the flight vehicle 200 over a measurement target (farm field 300).

The conditional judgment unit 41 acquires information on a vegetation index such as NDVI from a calculation result buffer 25, and determines whether or not the value (for example, a representative value) satisfies a certain condition. This determination result is used to modify a flight plan.

The flight plan modification unit 42 serves the function of dynamically modifying a flight plan during the flight of the flight vehicle 200 for the purpose of, for example, automatically relaxing the coverage ratio of an imaging range to reduce time required to complete measurement in a case where a value obtained as a result of calculation of the composition or state of the measurement target falls within a certain condition, or automatically increasing the coverage ratio in a case where the value obtained as a result of calculation of the composition or state of the measurement target deviates from the certain condition.

The second and subsequent flight plan creation unit 43 serves the function of automatically creating a flight plan for performing measurement of an area around a portion not measured in sampling measurement, in a case where a calculated value of the composition or state of the measurement target, as a result of a sampling inspection during a first flight, deviates from a predetermined condition.

In addition, the second and subsequent flight plan creation unit 43 also performs a process of automatically creating a flight plan for causing the flight vehicle 200 to fly only on a remaining part of a route specified in an original flight plan in a case where the flight vehicle 200 could not complete a flight according to the original flight plan during the first flight.

Figure 27:
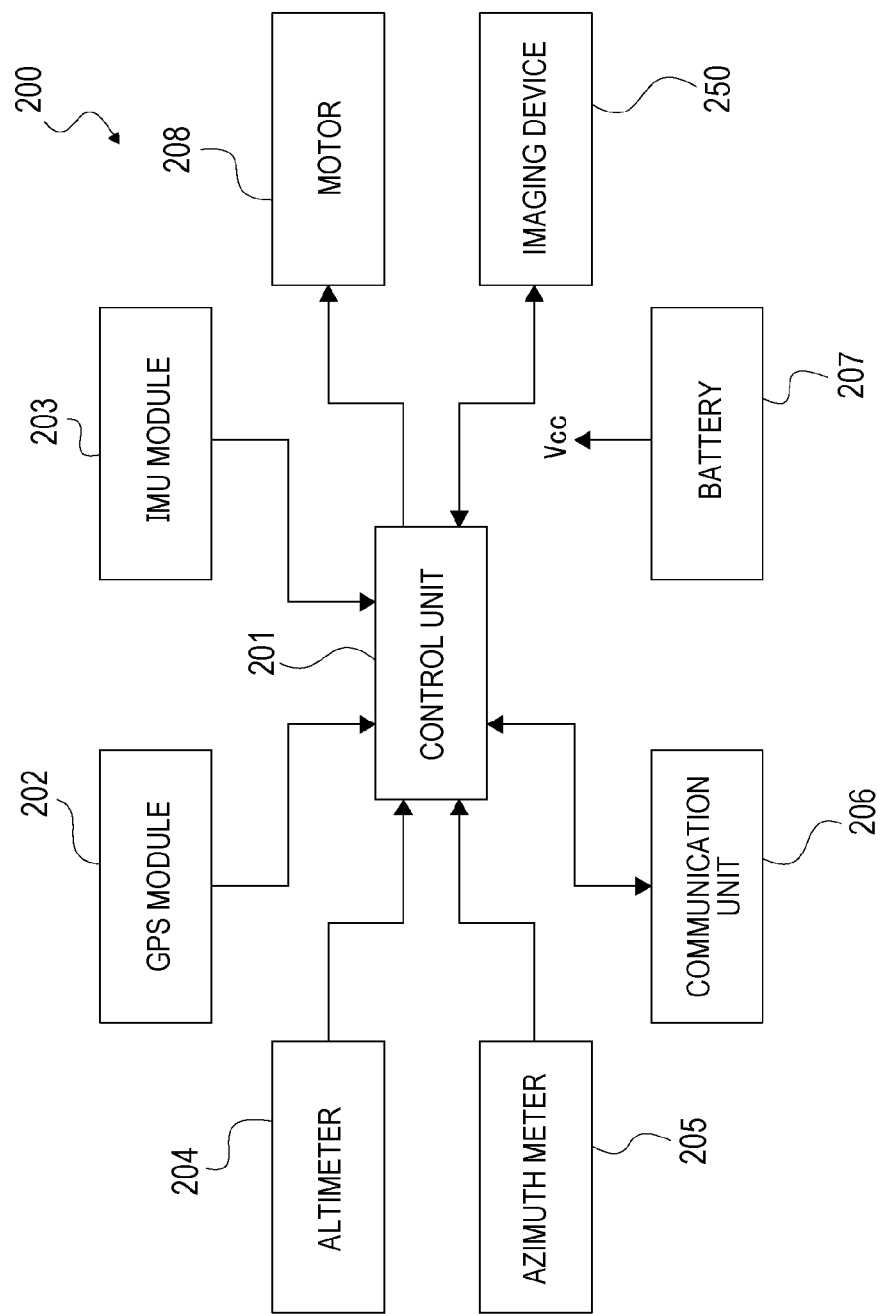
FIG. 27 is a block diagram of a control configuration of a flight vehicle according to the embodiment.

FIG. 27 shows an internal configuration example of the flight vehicle 200 that communicates with the information processing apparatus 1 including the flight control unit 3 and the communication unit 44 as described above.

The flight vehicle 200 includes, for example, a control unit 201, a GPS module 202, an inertial measurement unit (IMU) module 203, an altimeter 204, an azimuth system 205, a communication unit 206, a battery 207, a motor 208, and the above-described imaging device 250.

The GPS module 202 supplies position information to the control unit 201.

The IMU module 203 detects angles between three axes, angular velocity information, or acceleration information, and supplies the angles or the information to the control unit 201.

The altimeter 204 detects an altitude, and supplies altitude information to the control unit 201.

The azimuth meter 205 detects a direction, and supplies direction information to the control unit 201.

The control unit 201 controls flight operation of the flight vehicle 200 by using these pieces of information.

The motor 208 is a motor for a propeller to be used for the flight of the flight vehicle 200. For example, in the case of the flight vehicle 200 such as a multicopter including a plurality of propellers, the motors 208 are provided for the respective corresponding propellers. The control unit 201 controls, for example, the driving/stopping of each motor 208 and the number of rotations of each motor 208. As a result, the flight vehicle 200 can ascend/descend and fly forward, backward, leftward, and rightward.

A battery 207 refers to a power supply unit, and supplies an operation power supply voltage Vcc to each unit.

The communication unit 206 is a wireless communication unit, and can transmit and receive various data to and from, for example, the communication unit 44 of the information processing apparatus 1. For example, the communication unit 206 enables the flight vehicle 200 to transmit, to the information processing apparatus 1, a captured high-resolution image HR, a captured low-resolution image LR, tag information including correspondence information P, flight operation information, and the like.

The control unit 201 includes, for example, a microcomputer including a CPU, a RAM, a ROM, an interface unit, and the like, and controls flight operation of the flight vehicle 200 according to flight plan data.

<6. Flight Plan Control>

A specific example of flight plan control of the flight vehicle 200 will be described.

First, the function of the flight plan creation unit 40 in the information processing apparatus 1 will be described.

The flight plan creation unit 40 automatically creates a flight plan of the flight vehicle 200 in response to a user setting of a coverage ratio for sampling measurement (imaging) based on the high-resolution image HR.

A flight plan of the flight vehicle 200, which is a multicopter or the like, is basically created under conditions that allow the entire farm field 300 to be imaged as the low-resolution image LR.

In the system according to the present embodiment, a flight plan is created with priority given to the coverage ratio of sampling measurement in consideration of performing sampling imaging of the high-resolution image HR. That is, it is possible to create a flight plan suitable for the situation, such as flying more finely so as to increase the coverage ratio, or flying coarsely in a case where the coverage ratio may be low.

A scan interval is specified by the user or a computer so as to create the flight plan.

FIG. 28 shows discrete sample sections #1C to #5C serving as the imaging positions of high-resolution images HR (HR #1 to HR #5) in the farm field 300 as a measurement target, as in FIG. 4B.

Here, the width a and the width d in FIG. 28 are the widths of the imaging range of the high-resolution image HR (a range in a longitudinal direction and a range in a lateral direction, respectively). In addition, the width b and the width e respectively refer to longitudinal and lateral intervals between adjacent high-resolution images HR.

Here, the above-described scan interval corresponds to the interval c (=a+b) and the interval f (=d+e), and can be specified by, for example, the user.

At this time, the width a and the width d define the imaging range of a single high-resolution image HR to be captured in sampling imaging. Meanwhile, the width b (=c−a) or the width e (=f−d) corresponds to the width of a portion that cannot be imaged (=cannot be measured).

Therefore, it is possible to set an optimum value according to, for example, the distribution of an event to be observed (for example, submergence due to a failure of a watering system or an outbreak of pests) by specifying the scan interval.

Note that the coverage ratio refers to the ratio of the range that can be imaged as the high-resolution image HR to the entire measurement target. The coverage ratio M in the longitudinal direction (traveling direction DR of the flight vehicle 200 over the farm field 300) is written as M=a/c. The coverage ratio N in the lateral direction (the direction of the next sampling imaging row) is written as N=d/f. The user can also input the coverage ratio instead of the scan interval.

Figure 29:
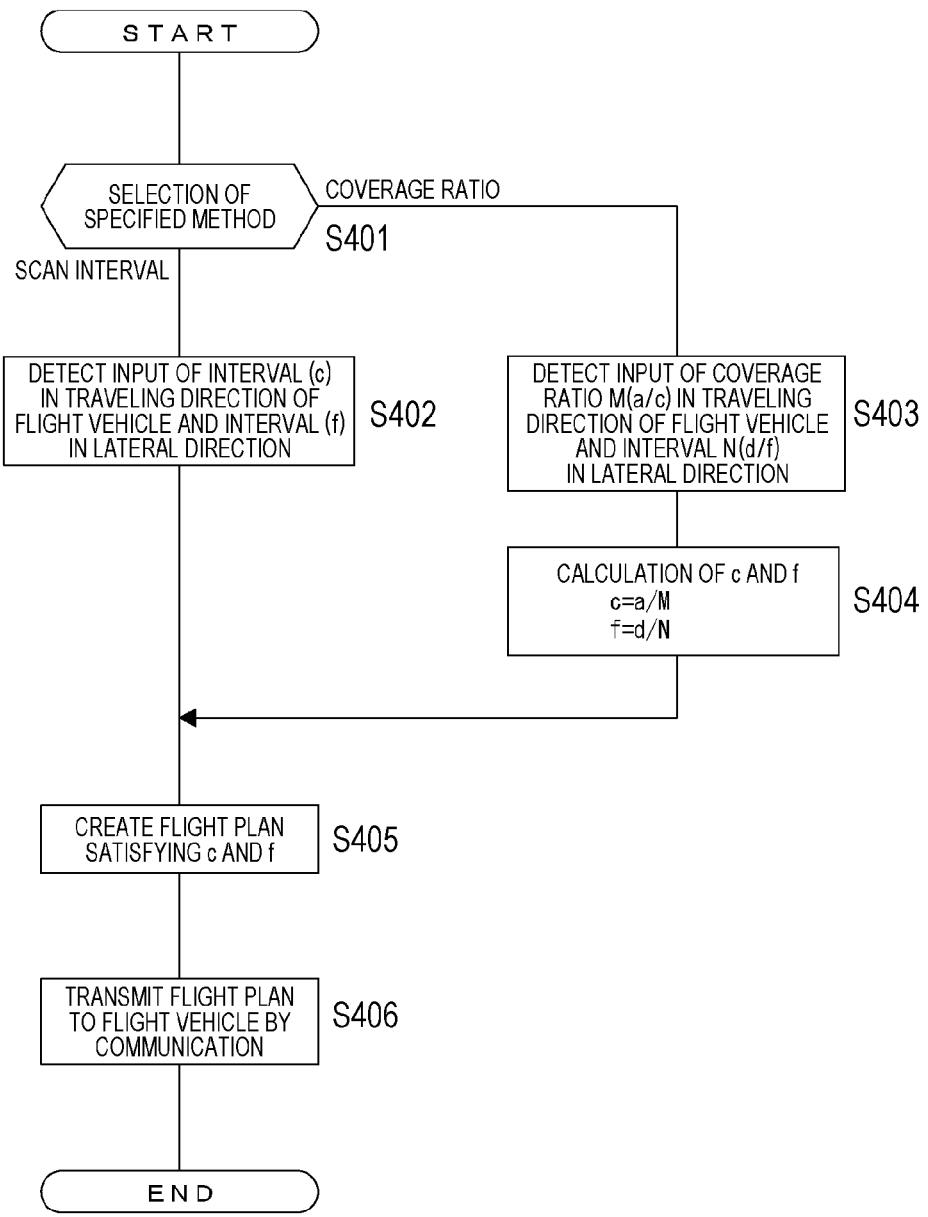
FIG. 29 is a flowchart of the setting of a scan interval and a coverage ratio according to the embodiment.

FIG. 29 shows a processing example by the function of the information processing apparatus 1 (flight plan creation unit 40).

In step S401, the information processing apparatus 1 determines a type specified by a user with a user input unit 31. When creating a flight plan, the user can select whether to specify a scan interval or a coverage ratio. The user inputs a scan interval or a coverage ratio by using a user interface of the information processing apparatus 1 (for example, a display screen and the user input unit 31).

Note that it is also assumed that instead of being input by the user, the value of a scan interval or a coverage ratio is automatically set and input in step S401 by a computer apparatus of some kind.

For example, in a case where the user has performed an input for specifying a scan interval, the information processing apparatus 1 proceeds to step S402, and detects the input scan interval c in the traveling direction of the flight vehicle and the input scan interval f in the lateral direction.

Then, in step S405, a flight plan is created, which satisfies the specified scan intervals c and f. For example, position coordinates of various points and a flight speed are set. Examples of the various points include a start point, a turnaround point, and a straight flight resumption point of flight path DR, points (or imaging timings) at which high-resolution images HR are captured, and the like.

Then, the communication unit 44 is caused to transmit information on the flight plan created in this way to the flight vehicle 200 in step S406. In the flight vehicle 200, the communication unit 206 receives the information on the flight plan, and the control unit 201 imports and stores the information. The control unit 201 controls each unit on the basis of the information on the flight plan. Thus, a flight specified in the flight plan is conducted.

In a case where the user has performed an input for specifying a coverage ratio, the information processing apparatus 1 proceeds from step S401 to step S403, and detects the input coverage ratio M in the traveling direction of the flight vehicle and the coverage ratio N in the lateral direction. Then, the scan intervals c and f are calculated by use of the coverage ratios M and N input in step S404.

Thereafter, in a manner similar to that described above, a flight plan that satisfies the scan intervals c and f is created in step S405. Then, the communication unit 44 is caused to transmit information on the flight plan to the flight vehicle 200 in step S406.

Next, modification of a flight plan will be described.

The flight plan modification unit 42 can reduce time required to complete measurement by automatically relaxing a coverage ratio during a flight of the flight vehicle 200 in a case where a value obtained as a result of calculation of the composition or state of the measurement target falls within a certain condition. Furthermore, the flight plan modification unit 42 can also dynamically modify a flight plan so as to automatically increase the coverage ratio in a case where the value obtained as a result of calculation of the composition or state of the measurement target deviates from the certain condition.

For these processes, the conditional judgment unit 41 acquires a measurement result and performs conditional judgment.

Incidentally, cited in the present embodiment is an example in which the information processing apparatus 1 acquires a high-resolution image HR in substantially real time during the flight of the flight vehicle 200 so as to modify a flight plan based on a conditional judgment.

Therefore, for example, every time the imaging device 250 on the flight vehicle 200 side captures a high-resolution image HR, the high-resolution image HR is transmitted from the communication unit 44 to the information processing apparatus 1.

The information processing apparatus 1 causes a data input unit 21 to acquire the high-resolution image HR received by the communication unit 44, and causes an input buffer 22 to store the high-resolution image HR, so that various processes can be performed on the high-resolution image HR described above.

The conditional judgment unit 1 sets, as threshold values, an upper limit and a lower limit of, for example, NDVI values. For example, the NDVI upper limit is set to 0.85, and the NDVI lower limit is set to 0.7 or the like.

Then, every time a high-resolution image HR is transmitted from the flight vehicle 200, the conditional judgment unit 1 reads, from the calculation result buffer 25, an image representing NDVI obtained on the basis of the single high-resolution image HR, and confirms whether or not a representative value of NDVI is within a range between the upper limit and the lower limit described above.

In a case where the representative value falls within this range, it is considered that there is no abnormality in plants and the representative value "falls within the certain condition".

The conditional judgment process may be performed on the basis of a filtering result image, or may be performed on the basis of a vegetation calculation image or a filter image. A representative value such as an average value is obtained from these images, and compared with the threshold values, that is, the upper limit and the lower limit to perform conditional judgment.

Note that some increase and some decrease in the case of abnormality, depending on vegetation indices. Thus, examples of conceivable setting patterns are shown in FIG. 30.

For example, whether or not a condition is satisfied is determined on the basis of patterns such as "a certain value or less", "a certain value or more", "within a certain range", and "out of a certain range".

In a case where the photochemical reflectance index (PRI) is used as a vegetation index, conditional judgment may be performed for a condition such as "a certain value (0.3) or less" or "the certain value (0.3) or more" according to a calculation method. Note that PRI will be described later.

In a case where NDVI is used as a vegetation index, conditional judgment may be performed for a condition such as "within a certain range (0.70 to 0.85)" or "out of the certain range (0.70 to 0.85)".

Figure 31:
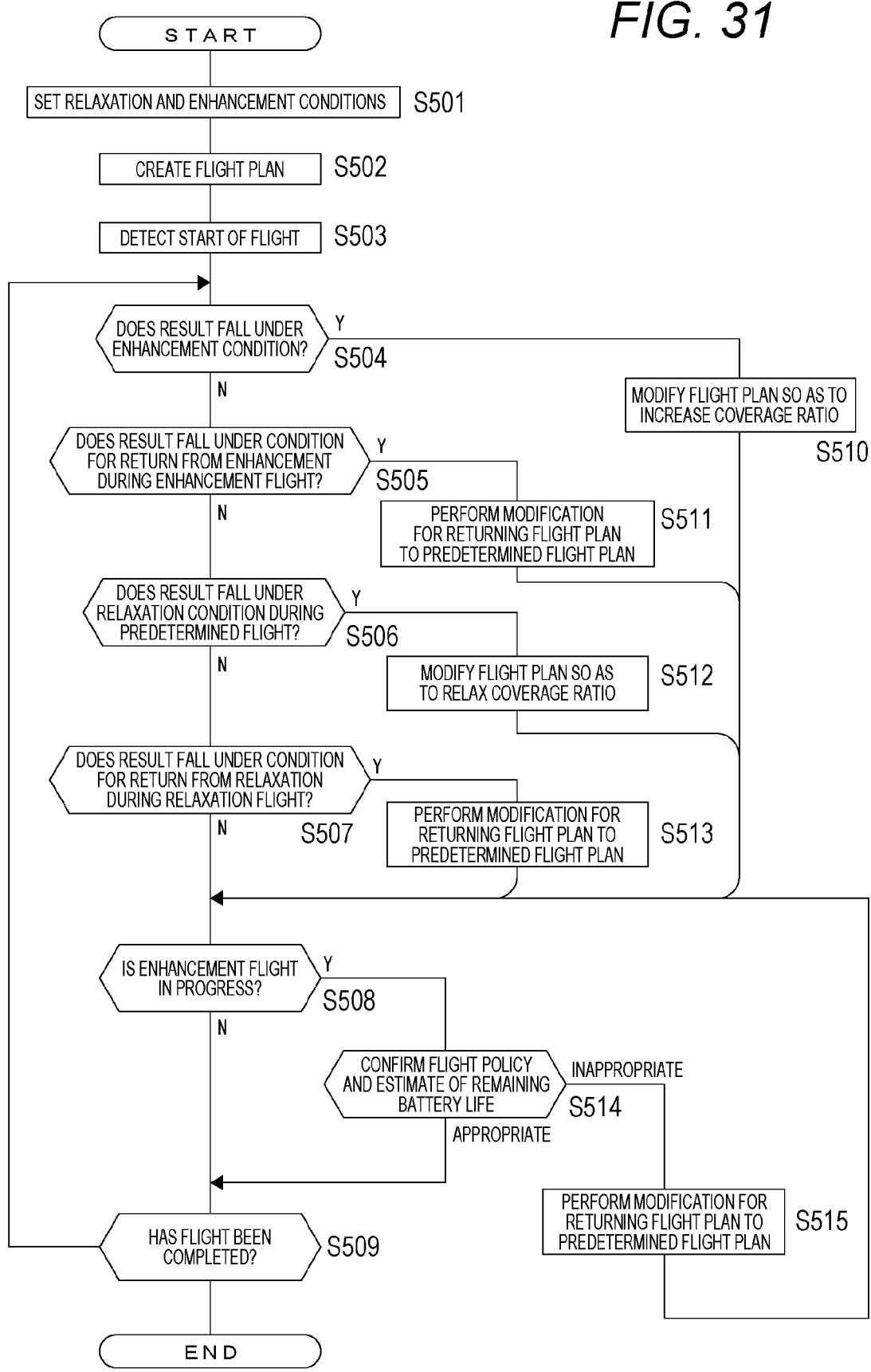
FIG. 31 is a flowchart of flight control according to the embodiment.

FIG. 31 shows a processing example of the information processing apparatus 1, including modification of a flight plan during a flight.

In step S501, the information processing apparatus 1 sets relaxation and enhancement conditions. This is a process of setting a conditional judgment method in response to a user input so as to relax or enhance the coverage ratio. That is, there is set a processing method of the conditional judgment unit 41.

For example, the setting is configured as follows. If NDVI is "within the certain range (0.70 to 0.85)", the state is considered appropriate and the coverage ratio is relaxed. If not, the coverage ratio is enhanced.

Alternatively, it is also conceivable that the setting is configured, for example, as follows. If NDVI is not "within a first certain range (for example, 0.70 to 0.85)", the coverage ratio is enhanced. If NDVI is "within a second certain range (range narrower than the first certain range)", the coverage ratio is relaxed. In other cases (within the first certain range and out of the second certain range), the coverage ratio is maintained at a current level.

In step S502, the information processing apparatus 1 performs a process of creating a flight plan. For example, the information processing apparatus 1 performs the process described with reference to FIG. 29.

In step S503, the information processing apparatus 1 detects the start of a flight of the flight vehicle 200. For example, the information processing apparatus 1 determines that the flight has been started, by receiving notification of the start of the flight from the flight vehicle 200 or by monitoring the start time of the flight according to the flight plan, or the like. Alternatively, the start of the flight may be detected as a result of a predetermined operation performed by a user at the timing of the flight start.

After the start of the flight of the flight vehicle 200, the information processing apparatus 1 repeats the processing of step S504 and subsequent steps until it is determined in step S509 that the flight has been completed.

In step S504, the information processing apparatus 1 confirms whether or not a result falling under the coverage ratio enhancement condition has been obtained by the conditional judgment. In a case where the result does not fall under the enhancement condition, the process proceeds to step S505.

In a case where the result falls under the enhancement condition, the information processing apparatus 1 proceeds to step S510, and modifies the flight plan so as to increase the coverage ratio. For example, the flight plan is modified by reduction of the scan intervals c and f described above. Then, information on the modified flight plan is transmitted to the flight vehicle 200. Then, the information processing apparatus 1 proceeds to step S508.

In step S505, the information processing apparatus 1 confirms whether or not the flight is in progress in the state of the coverage ratio enhanced by the modification in step S510 described above and whether or not a result falling under a condition for returning from the enhancement has been obtained by the conditional judgment. Note that examples of conceivable conditions for returning from the coverage ratio enhancement include the following.

A conditional judgment result returns to an appropriate state.

After a conditional judgment result returns to an appropriate state, it is consecutively determined that the conditional judgment result is in the appropriate state predetermined times.

There is achieved a state in which it is determined that a vegetation index value is in an appropriate state on the basis of a criterion stricter than that of determination as to the appropriate state based on the enhancement condition (so-called hysteresis determination).

In a case where the coverage ratio enhancement flight is not in progress or in a case where the result does not fall under the return condition as described above even during the coverage ratio enhancement flight, the process proceeds to step S506.

In a case where the coverage ratio enhancement flight is in progress and the result falls under the return condition, the information processing apparatus 1 proceeds to step S511 and performs a modification process for returning the flight plan to a predetermined flight plan (for example, the flight plan initially created in step S502). For example, an instruction to return to the original flight plan is transmitted to the flight vehicle 200. Then, the information processing apparatus 1 proceeds to step S508.

In step S506, the information processing apparatus 1 confirms whether or not a result falling under the coverage ratio relaxation condition has been obtained by the conditional judgment.

In a case where the result does not fall under the relaxation condition, the process proceeds to step S507.

In a case where the result falls under the relaxation condition, the information processing apparatus 1 proceeds to step S512, and modifies the flight plan so as to relax the coverage ratio. For example, the flight plan is modified by increase of the scan intervals c and f described above. Then, information on the modified flight plan is transmitted to the flight vehicle 200. Then, the information processing apparatus 1 proceeds to step S508.

In step S507, the information processing apparatus 1 confirms whether or not the flight is in progress in the state of the coverage ratio relaxed by the modification in step S512 described above and whether or not a result falling under a condition for returning from the relaxation has been obtained by the conditional judgment. Note that examples of conceivable conditions for returning from the coverage ratio relaxation include the following.

A conditional judgment result is not in an appropriate state.

It is consecutively determined that the conditional judgment result is not in the appropriate state predetermined times.

There is achieved a state in which it is determined that a vegetation index value is not in an appropriate state on the basis of a criterion stricter than that of determination as to the appropriate state based on the relaxation condition (so-called hysteresis determination).

In a case where the coverage ratio relaxation flight is not in progress or in a case where the result does not fall under the return condition as described above even during the coverage ratio relaxation flight, the process proceeds to step S508.

In a case where the coverage ratio relaxation flight is in progress and the result falls under the return condition, the information processing apparatus 1 proceeds to step S513, and performs a modification process for returning the flight plan to the predetermined flight plan (for example, the flight plan initially created in step S502). For example, an instruction to return to the original flight plan is transmitted to the flight vehicle 200. Then, the information processing apparatus 1 proceeds to step S508.

In step S508, the information processing apparatus 1 branches the process depending on whether or not the coverage ratio enhancement flight is in progress. If the coverage ratio enhancement flight is not in progress, the process returns to step S504 via the determination in step S509.

In a case where the coverage ratio enhancement flight is in progress, the information processing apparatus 1 proceeds from step S508 to step S514 to confirm a flight policy and an estimate of remaining battery life, and branches the process depending on whether or not the result of the confirmation is appropriate.

The confirmation of the flight policy refers to confirmation as to, for example, what is to be emphasized in conducting a flight for measurement. For example, either of the following can be set as the flight policy.

(P1) Priority is given to measurement of the entire measurement target. In a case where flight time estimated from the remaining battery life is insufficient, the measurement returns to measurement at a normal coverage ratio. That is, priority is given to the measurement (imaging) of the entire measurement target.

(P2) Priority is given to detection of abnormal points, and the measurement does not return to measurement at the normal coverage ratio based on the remaining battery life. That is, in the case of the enhanced coverage ratio, priority is given to focused measurement over measurement of the entire measurement target.

For example, a specific determination process of step S514 is performed as follows.

In a case where there remains (sufficient) battery life equal to or more than a predetermined value, it is determined that the current state is appropriate regardless of the flight policy.

In a case where there remains battery life less than the predetermined value, it is determined that the current state is appropriate if the flight policy (P2) is applied.

In a case where there remains battery life less than the predetermined value, it is determined that the current state is inappropriate if the flight policy (P1) is applied. This is an example. However, in a case where, for example, it is determined that the current state is appropriate, the process directly proceeds to step S509.

Meanwhile, in a case where it is determined that the current state is inappropriate, the information processing apparatus 1 proceeds to step S515, and performs a modification process for returning the flight plan to the predetermined flight plan. For example, an instruction to return to the original flight plan is transmitted to the flight vehicle 200. Then, the information processing apparatus 1 proceeds to step S508.

In the case of detecting the completion of the flight of the flight vehicle 200 in step S509, the information processing apparatus 1 ends the process of FIG. 31.

The information processing apparatus 1 ends the process when the information processing apparatus 1 recognizes the completion of the flight by, for example, receiving notification of the completion of the flight from the flight vehicle 200, detecting the elapse of predetermined time (time required to complete the flight), detecting a user's end operation, or the like.

As a result of performing the above-described process as shown in FIG. 31, flight control (measurement control) is achieved in which the coverage ratio is dynamically changed according to the situation during the flight. Therefore, for example, if a section to be intensively monitored is found on the basis of, for example, the state of plant growth, it is possible to take measures such as increasing the coverage ratio of an area in the vicinity of the section. Thus, more valuable measurement can be performed in a single flight. In contrast, for example, in a case where there are no major problems with the state of plant growth, a flight can be completed in a short time due to relaxation of the coverage ratio. Thus, it is possible to improve the efficiency of remote sensing work.

Furthermore, according to the process including the flight plan creation described above, the information processing apparatus 1 can automatically generate a flight plan of the flight vehicle 200 on the basis of a coverage ratio set by a user for sampling measurement.

Regarding the setting of the flight plan, it is possible to use the scan interval or coverage ratio in the lateral direction and the scan interval or coverage ratio in the longitudinal direction.

Note that the scan interval or coverage ratio in either of the longitudinal direction or the lateral direction may be fixed, and the scan interval or coverage ratio in the other direction may be set by the user.

Furthermore, it is possible to reduce the time required to complete measurement by automatically relaxing a coverage ratio during the flight of the flight vehicle 200 in a case where a value obtained as a result of calculation of the composition or state of the measurement target falls within a certain condition.

Coverage ratio relaxation conditions can be set as, for example, "equal to or lower than", "equal to or greater than", or "range".

Relaxation rates in the case of relaxing the coverage ratio include:
 a relaxation rate of the scan interval or coverage ratio in the lateral direction, and
 a relaxation rate of the scan interval or coverage ratio in the longitudinal direction. One or both of these may be changed. Alternatively, the relaxation rate may be variable.

Conditions for returning from relaxation can be set as, for example, "equal to or lower than", "equal to or greater than", or "range".

Furthermore, it is possible to automatically enhance the coverage ratio and perform measurement in a case where a value obtained as a result of calculation of the composition or state of the measurement target deviates from the certain condition during the flight of the flight vehicle 200.

Coverage ratio enhancement conditions can be set as, for example, "equal to or lower than", "equal to or greater than", or "range".

Relaxation rates in the case of enhancing the coverage ratio include:
 an enhancement rate of the scan interval or coverage ratio in the lateral direction, and
 an enhancement rate of the scan interval or coverage ratio in the longitudinal direction. One or both of these may be changed. Alternatively, the relaxation rate may be variable.

Conditions for returning from enhancement can be set as, for example, "equal to or lower than", "equal to or greater than", or "range".

Furthermore, a flight can be performed in consideration of remaining battery life according to the setting of the flight policy.

Next, the following describes processing by the function of the second and subsequent flight plan creation unit 43.

The second and subsequent flight plan creation unit 43 can automatically create a flight plan for performing measurement of an area around a portion not measured in sampling measurement, in a case where a calculated value of the composition or state of the measurement target, as a result of a sampling inspection during a first flight, deviates from a desired value range.

Furthermore, it is also possible to automatically create a flight plan for flying only on a remaining part of a route specified in an original flight plan in a case where a flight according to the original flight plan could not be completed during the first flight.

An example of intensively measuring the center of a measurement value deviation part on the basis of a first result will be described with reference to FIGS. 32 and 33.

FIG. 32A shows sample sections #1C to #20C for which high-resolution images HR (HR #1 to HR #20) have been captured in the first flight. Here, assume a case where vegetation index values of black sample sections #11C and #15C deviate from the desired value range.

In such a case, a second flight plan is created as an additional flight.

That is, the second flight plan (measurement range) is determined on the basis of the center point of a sample section as a sampling measurement range such that a surrounding range to be remeasured is remeasured not as sampling measurement, but in an exhaustive manner.

For example, FIG. 32B shows a measurement range 700 and a flight range 701 defined as follows. A surrounding range defined by the longitudinal width g and the lateral width h with respect to the center point of sample section #11C is referred to as the measurement range 700. In addition, a surrounding range defined by the longitudinal width g and the lateral width h with respect to the center point of sample section #15C is referred to as the flight range 701. Then, a second flight plan is created such that high-resolution images HR are captured so as to cover the flight ranges 700 and 701. In this case, all images are captured as high-resolution images HR to perform measurement in the flight ranges.

Although the width g and the width h may be fixed values, it is desirable that the user can specify these values.

Note that although, for the sake of description, the term "sample section" is also used for a range of imaging to be performed the second time, sample sections are not discrete but continuous in the second and subsequent flights.

Figure 33:
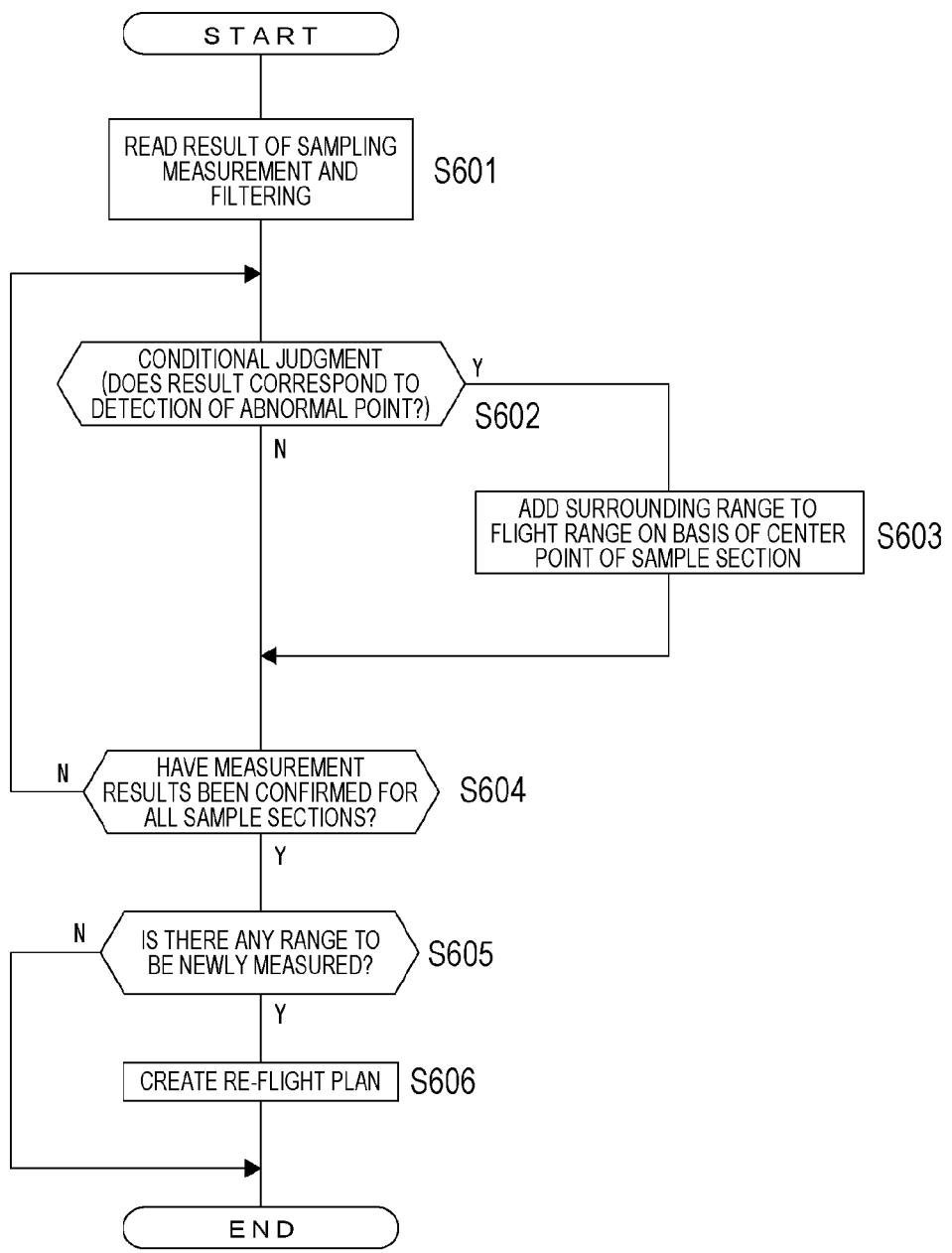
FIG. 33 is a flowchart of flight control according to the embodiment.
Figure 38:
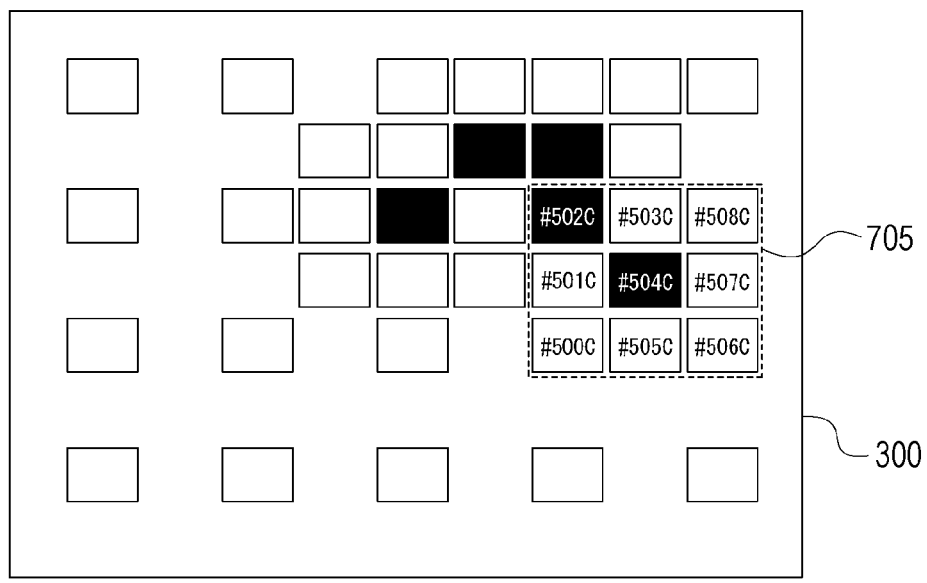
FIG. 38 is an explanatory diagram of flight control according to the embodiment.
Figure 39:
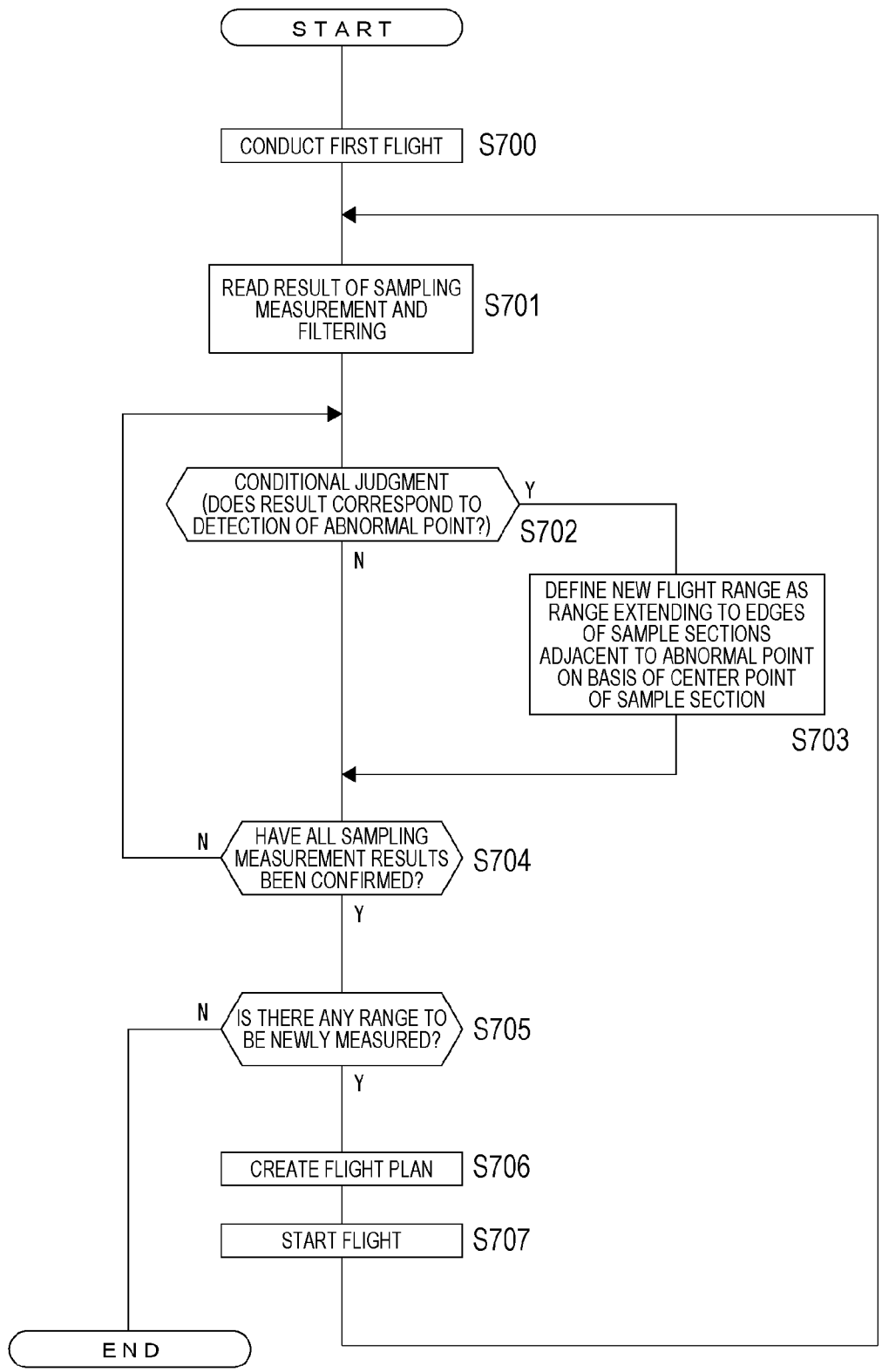
FIG. 39 is a flowchart of flight control according to the embodiment.

FIG. 33 shows a processing example of the information processing apparatus 1.

In step S601, the information processing apparatus 1 reads the results of sampling measurement and a filtering process from the calculation result buffer 25.

This is to read information on calculation results obtained as a result of performing the above-described filtering process or the like based on a high-resolution image HR.

In step S602, the information processing apparatus 1 performs conditional judgment from a filtering result image or the like based on a single high-resolution image HR. For example, the information processing apparatus 1 performs conditional judgment such as to whether or not a vegetation index representative value extracted from the filtering result image is within a predetermined range to determine whether or not a corresponding sample section is in an abnormal state (for example, in a state of poor growth, or the like).

If an abnormal point is detected as a result of the conditional judgment, the information processing apparatus 1 adds, to the flight range, a range around the position of the center point of a sample section where the high-resolution image HR has been captured, in step S603. At this time, the width g and the width h shown in FIG. 32B may be variable and be set according to a user input in determination of a flight range.

For example, the information processing apparatus 1 performs processing in steps S602 and S603 above by using filtering result images based on, for example, all sample sections #1C to #20C in FIG. 32A, that is, based on the high-resolution images HR (HR #1 to HR #20) obtained by the imaging of these sample sections.

For example, no abnormality has been found in a filtering result image based on high-resolution image HR #1. Accordingly, step S603 is not performed, and an area around sample section #1C is not added to the flight range. Meanwhile, abnormalities have been detected in filtering result images based on high-resolution images HR #11C and HR #15C.

Thus, areas around sample sections #11C and #15C are set as the flight ranges 700 and 701, respectively, in the processing of step S603.

After performing the above processing for all sampling measurement ranges (all sample sections #1C to #20C) in the first flight, the information processing apparatus 1 proceeds from step S604 to S605, and confirms whether or not there is any range to be newly measured (that is, the flight range set in step S603). If not, the information processing apparatus 1 ends the process without creating a second flight plan. In other words, this corresponds to a case where it is determined that a flight for second intensive measurement is unnecessary.

Meanwhile, in a case where the flight ranges 700, 701 and the like are set, the information processing apparatus 1 proceeds from step S605 to S606 to create a re-flight plan.

In this case, a flight path and imaging timing are set such that high-resolution images HR can be captured, covering all the set flight ranges 700, 701 and the like. Then, information on the re-flight plan is transmitted to the flight vehicle 200. In response thereto, the flight vehicle 200 conducts a second flight.

Another example of creating second and subsequent flight plans will be described with reference to FIGS. 34 to 39.

In this example, additional measurement is performed with a focus on a sample section where a value has deviated, up to a boundary point between the sample section and a point where a judgment result indicating a normality has been obtained. Moreover, a re-flight is repeated until a range to be remeasured is not detected.

FIG. 34A shows the result of sampling measurement in the first flight. Assume a case where, as a result of conditional judgment, an abnormality has been detected in sample section #11C.

A flight range to be set in a second flight plan extends from the sample section where the abnormality has been found to the edges of adjacent sample sections. For example, as shown in FIG. 34B, a flight range 702 is set as a range extending from sample section #11C, where an abnormality has been found, to the edges of sample sections #7C, #6C, #5C, #12C, #13C, #14C, #15C, and #10C adjacent to sample section #11C.

Then, a second flight plan is created such that high-resolution images HR are captured in the flight range 702.

Note that although, for the sake of clarity, a broken line representing the flight range 702 is shown slightly apart from the adjacent sample sections, assume that the flight range 702 is in contact with the adjacent sample sections. The same applies to flight ranges 703 to 705 in the following drawings.

FIG. 35A shows the result of measurement in the second flight. High-resolution images HR are captured throughout the flight range 702 in the second flight. Sections where the high-resolution images HR are captured are shown as sample sections #200C to #208C. Note that sample sections #200C to #208C do not overlap for easy viewing of the drawing. In fact, however, it is assumed that sample sections #200C to #208C slightly overlap with each other so that the entire flight range 702 is imaged. The same applies to the subsequent drawings.

Note that sample section #204C in this case corresponds to sample section #11C in FIG. 34B, in which the abnormality has already been detected in the first flight.

Assume that as a result of the second flight, a judgment result indicating an abnormality has been newly detected in sample section #208C.

There exists a sample section judged to be abnormal. Thus, a third flight plan is additionally created.

A flight range to be set in the third flight plan extends from sample section #208 where the abnormality has been newly found to the edges of adjacent sample sections. For example, as shown in FIG. 35B, the flight range 703 is set as a range extending from sample section #208C to the edges of adjacent sample sections.

Then, the third flight plan is created such that high-resolution images HR are captured in the flight range 703.

FIG. 36A shows the result of measurement in the third flight. In the third flight, high-resolution images HR are captured in sample sections #300C to #308C in the flight range 703. Assume that, as a result, judgment results indicating abnormalities have been newly detected in sample sections #306C and #307C.

Note that sample section #304C corresponds to sample section #204C where the abnormality has been detected in the second flight, and sample section #300C corresponds to sample section #11C where the abnormality has been detected in the first flight.

There exist sample sections newly judged to be abnormal. Thus, a fourth flight plan is additionally created.

For example, as shown in FIG. 36B, the flight range 704 to be set in the fourth flight plan extends from sample sections #306C and #307C, where the abnormalities have been newly found, to the edges of adjacent sample sections. Then, the fourth flight plan is created such that high-resolution images HR are captured in the flight range 704. In this case, the fourth flight range 704 is centered on two sample sections #306C and #307C. Thus, the fourth flight range 704 is wider than the third flight range 703.

FIG. 37A shows the result of measurement in the fourth flight. In the fourth flight, high-resolution images HR are captured in sample sections #400C to #411C in the flight range 704. Assume that, as a result, a judgment result indicating an abnormality has been newly detected in sample section #408C.

Note that sample sections #405C and #406C correspond to sample sections #306C and #307C where the abnormalities have been detected in the third flight. In addition, sample section #402C corresponds to sample section #208C where the abnormality has been detected in the second flight.

There exists a sample section newly judged to be abnormal. Thus, a fifth flight plan is additionally created.

For example, as shown in FIG. 37B, the flight range 705 to be set in the fifth flight plan extends from sample section #408C, where the abnormality has been newly found, to the edges of adjacent sample sections. Then, the fifth flight plan is created such that high-resolution images HR are captured in the flight range 705.

FIG. 38A shows the result of measurement in the fifth flight. In the fifth flight, high-resolution images HR are captured in sample sections #500C to #508C in the flight range 705. Assume that, as a result, there exists no sample section that has been newly judged to be abnormal. Note that sample section #504C corresponds to sample section #408C where the abnormality has been detected in the fourth flight, and sample section #502C corresponds to sample section #306C where the abnormality has been detected in the third flight.

No abnormal sample section has been newly found. Accordingly, the flight for measurement is completed.

A processing example including creation of flight plans for the second and subsequent flights as described above will be described with reference to FIG. 39.

In step S700, the information processing apparatus 1 performs processing for the first flight. This corresponds to, for example, the process of FIG. 29 and a stand-by process for completion of the flight.

When the first flight is completed, the information processing apparatus 1 reads the results of sampling measurement and the filtering process from the calculation result buffer 25 in step S701. That is, the information processing apparatus 1 reads information on calculation results obtained as a result of performing the above-described filtering process or the like based on a high-resolution image HR.

In step S702, the information processing apparatus 1 performs conditional judgment from a filtering result image or the like based on a single high-resolution image HR. For example, the information processing apparatus 1 performs conditional judgment such as to whether or not a vegetation index representative value extracted from the filtering result image is within a predetermined range to determine whether or not a corresponding sample section is in an abnormal state (for example, in a state of poor growth, or the like).

If an abnormality is detected as a conditional judgment result, the information processing apparatus 1 add, to the flight range, a range extending from the position of the center point of a sample section where the high-resolution image HR has been captured to the edges of adjacent sample sections, in step S703.

The processing in steps S702 and S703 described above is performed for all the sample sections of the current flight, that is, for each of filtering result images based on the high-resolution images HR obtained by the imaging of these sample sections.

After performing the processing of steps S702 and S703 for all the sample sections of the immediately preceding flight, the information processing apparatus 1 confirms whether or not there is any range to be newly measured in step S705 (that is, the flight range set in step S703).

If there is no range (flight range) to be newly measured, the flight control process ends with step S705. That is, the next flight is not performed.

If any of the sample sections of the immediately preceding flight is judged to be abnormal, the information processing apparatus 1 proceeds from step S705 to S706 to create a next flight plan.

In this case, a flight path and imaging timing are set such that high-resolution images HR can be captured, covering the set flight range. Then, information on the re-flight plan is transmitted to the flight vehicle 200. In response thereto, the flight vehicle 200 conducts the next flight.

The information processing apparatus 1 detects the start of a flight in step S707. After completion of the flight, the information processing apparatus 1 performs the processing in and after step S701 on the basis of a measurement result of the flight.

As a result, the second and subsequent flights as exemplified in FIGS. 34 to 38 are conducted.

Measurement is performed during the second and subsequent flights conducted as described above. As a result, it is possible to achieve analysis with higher accuracy and depth using high-resolution images HR, without significantly increasing measurement time or data volume.

Note that it is also possible to create a flight plan for the second flight not only for flying over a range centered on a sample section judged to be abnormal as described above, but also for flying only on a remaining part of a route specified in the original flight plan in a case where a flight according to the original flight plan could not be completed during the first flight. In that case, it is sufficient if a re-flight plan is created after determination of a range in which high-resolution images HR have not been obtained at a predetermined coverage ratio in the measurement target in the farm field 300 such that the range is set as a flight range in the re-flight plan.

Alternatively, as a simpler way, it is sufficient if a flight plan is created by subtraction of a range covered in the flight from the initial flight plan.

As a result of performing such flight plan creation control, it is possible to exhaustively perform sampling measurement on the entire measurement target of the farm field 300.

For the information processing apparatus 1 according to the embodiment that performs the process of creating the second and subsequent flight plans described above, it is possible to automatically create a flight plan for measuring an area around a portion not measured in sampling measurement, in a case where a calculated value of the composition or state of the measurement target, as a result of a sampling inspection, deviates.

In this case, it is possible to perform additional measurement within a specified range centered on a point where the value has deviated. Furthermore, it is possible to perform additional measurement with a focus on the point where the value has deviated, up to a boundary point between the point and a point where there is no change.

In addition, it is also possible to automatically create a flight plan for a flight on the remaining part of the route in a case where the flight according to the original flight plan could not be completed during the first flight.

Note that in the present embodiment, the second and subsequent flights of the flight vehicle 200 do not necessarily need to be conducted by the physically identical flight vehicle, and may be conducted by other flight vehicles.

Incidentally, the example in which the flight control unit 3 is included in the information processing apparatus 1 has been described as the configuration of FIGS. 26 and 27. However, the configuration is not limited thereto.

Figure 40:
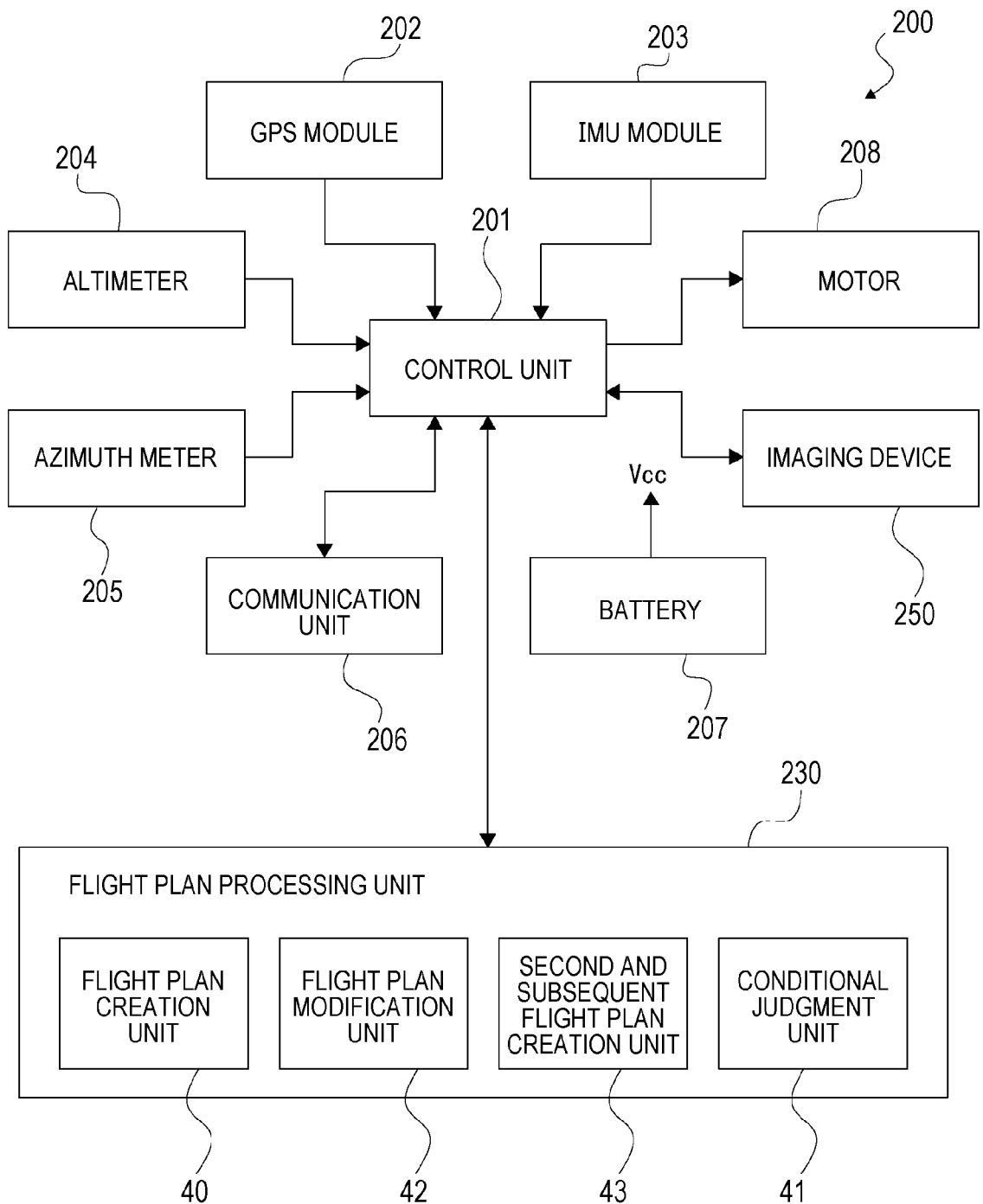
FIG. 40 is an explanatory diagram of the disposition of a flight plan processing unit according to the embodiment.

For example, FIG. 40 shows a configuration example of the flight vehicle 200. This is an example in which the flight vehicle 200 has a configuration as a flight plan processing unit 230 in addition to the configuration of FIG. 27. That is, the above-described flight plan creation unit 40, conditional judgment unit 41, flight plan modification unit 42, and second and subsequent flight plan creation unit 43 are included in the flight vehicle 200. It is sufficient if the flight plan processing unit 230 is implemented as a software function in the control unit 201 or in a separate microcomputer.

Such a configuration may be adopted such that the flight vehicle 200 (control unit 201) can fly while autonomously modifying a flight plan according to measurement results. In particular, it is preferable that the function of the flight plan modification unit 42 (function of processing shown in FIG. 31) is performed in the flight vehicle 200 so as to modify a flight plan during a flight.

Figure 41:
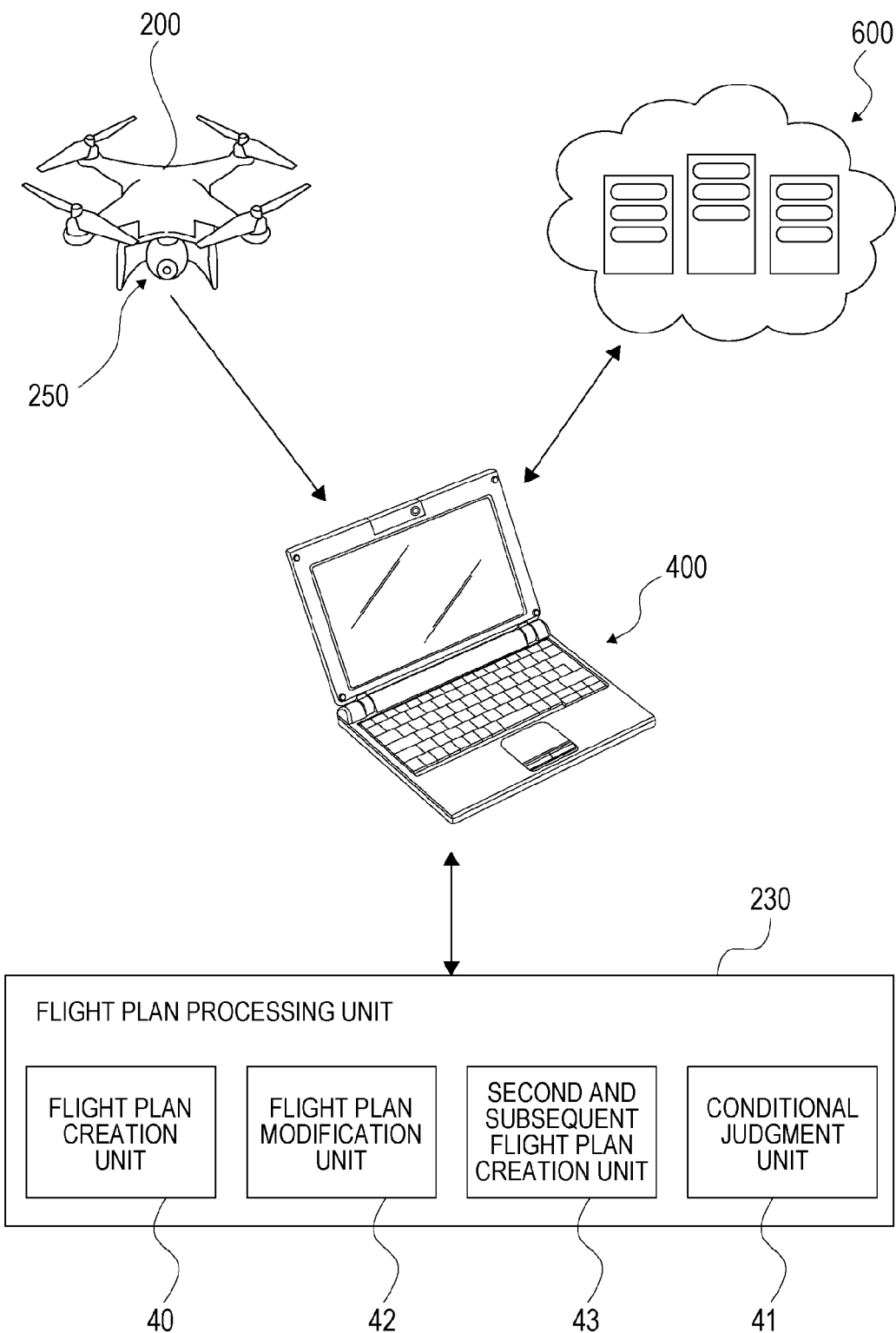
FIG. 41 is an explanatory diagram of the disposition of the flight plan processing unit according to the embodiment.

In addition, flight plan creation or the like may be performed in an information processing apparatus 1 provided separately from the information processing apparatus 1 of FIG. 26. For example, this corresponds to an example shown in FIG. 41, in which the flight plan processing unit 230 is included in an information processing apparatus 400 provided separately from the information processing apparatus 1 so as to perform flight vehicle control including flight plan generation, modification, and the like.

Furthermore, as an example, it is also conceivable that the flight plan processing unit 230 is provided in an information processing apparatus 600 as a network server, a cloud computing server, or the like such that a flight plan created by the information processing apparatus 600 is transmitted to the flight vehicle 200 via the information processing apparatus 400.

<7. Summary and Modifications>

The embodiments have been described above. Meanwhile, the following effects can be obtained according to the information processing apparatuses 1 of the embodiments.

The information processing apparatuses 1 according to the embodiments each include the calculation unit 2 that performs arithmetic processing on a sampling image, as a processing target, obtained by the imaging of a part of a measurement target with a multi spectrum camera, and generates a calculation result image serving as evaluation information for the measurement target.

As a result, it is possible to obtain a measurement result of the entire measurement target without exhaustively acquiring images of the entire measurement target.

In particular, performing sampling imaging prevents deterioration of efficiency even if high-resolution images are acquired. Thus, it is possible to use high-resolution sampling images (high-resolution images HR) and to achieve analysis with higher accuracy and depth without increasing measurement time or data volume.

Furthermore, since measurement is performed on the basis of sampling images, measurement can be efficiently performed. This is also suitable for a case where there is a demand to find a small object or a slight scratch or the like from a wide range.

The information processing apparatuses 1 according to the embodiments each include, as the calculation unit 2, the filtering generation unit 24 that generates a filter image that can be used for a filtering process, by using a sampling image (high-resolution image HR).

As described above, the filter image is an image (an image showing a part with specific composition or a specific state) corresponding to information serving as a filter when filtering is performed.

Images in various wavelength bands are obtained in imaging with a multi spectrum camera. For example, it is possible to perform appropriate filtering for presenting a measurement result, by using one or more of the images to generate a filter image. For example, in the embodiment, filter image FP1 (see FIG. 9) for extracting a sunlit portion is generated by use of a sampling image with a wavelength of 800 nm.

Therefore, it is possible to generate a filter condition that enables filtering that matches a sampling image for extracting pixels that satisfy a specific filter condition from the image content of the sampling image.

The information processing apparatuses 1 according to the embodiments each include, as the calculation unit 2, an evaluation index calculation unit (vegetation index calculation unit 23) that generates an evaluation index image by using a sampling image (high-resolution image HR).

Images in various wavelength bands are obtained in imaging with a multi spectrum camera. For example, the vegetation index calculation unit 23 generates a vegetation index image by using the images. Such a vegetation index is appropriate information to be used for evaluation of the entire measurement target.

Particularly, in the embodiment, a vegetation index image representing a vegetation index serves as the evaluation index image.

There is generated an image representing, for example, NDVI and the like as a vegetation index. Images in various wavelength bands are obtained in imaging with a multi spectrum camera. A vegetation index such as NDVI can be obtained from such a sampling image. In addition, it is possible to appropriately evaluate vegetation by using the vegetation index image.

The information processing apparatuses 1 according to the embodiments each include, as the calculation unit 2, the evaluation index calculation unit (vegetation index calculation unit 23) and the filtering generation unit 24. The evaluation index calculation unit generates an evaluation index image by using a sampling image (high-resolution image HR). The filtering generation unit 24 generates a filter image that can be used for the filtering process, by using the evaluation index image.

That is, the filter image is generated by use of an image (evaluation index image) representing an evaluation index (for example, a vegetation index). In the example cited in the embodiment, filter image FP2 indicating pixels that satisfy a condition that NDVI is equal to or greater than a certain value is generated by use of an NDVI image (see FIG. 9). As a result, a vegetation index such as NDVI can be reflected in the filter condition, and thus, a filter for obtaining various and appropriate measurement result images can be generated.

Note that the filter images to be used for filtering are not limited to filter images FP1, FP2, and FP3 described with reference to FIG. 9, and there are more diverse possible examples of the filter images depending on intended filtering.

It is conceivable that various filter images are generated by, for example, extraction of a certain vegetation index on the basis of a numerical value thereof, extraction of the vegetation index on the basis of another vegetation index value, extraction of the vegetation index on the basis of a plurality of other vegetation index values, extraction of the vegetation index by use of brightness, color information, or the like, and the like.

The information processing apparatuses 1 according to the embodiments each include, as the calculation unit 2, the filtering generation unit 34 that generates filter image FP3 capable of being used for the filtering process, by using filter image FP1 and filter image FP2. Filter image FP1 is generated by use of a sampling image (high-resolution image HR). Filter image FP2 is generated by use of an evaluation index image.

That is, a filter image is generated by use of a plurality of filter images.

As a result, a filter image reflecting a plurality of filter conditions can be generated. For example, filter image FP3 is generated in the example of FIG. 9 cited in the embodiment. Filter image FP3 is a vegetation image representing a specific portion for extraction of a sunlit portion. This enables filtering to be performed such that pixels satisfying a plurality of specific filter conditions are extracted from the image content of a sampling image.

The information processing apparatuses 1 according to the embodiments each include, as the calculation unit 2, the filtering generation unit 24 and the filtering execution unit 26. The filtering generation unit 24 generates a filter image. The filtering execution unit 26 generates a filtering result image by using the filter image.

That is, filtering is performed according to a condition represented by a filter image, so that a filtering result image is generated.

FIG. 9 shows each filter image example. As shown in FIG. 9, examples of filter images include a filter image generated from a sampling image, a filter image generated from a vegetation index image, a filter image generated from a plurality of filter images, and the like. An image of a sunlit portion is an example of the filter image generated from a sampling image. An image generated on the basis of a condition that NDVI is equal to or greater than a certain value is an example of the filter image generated from a vegetation index image. A vegetation image representing a specific portion for extraction of a sunlit portion is an example of the filter image generated from a plurality of filter images. Various filtering result images can be generated by use of these filter images.

The information processing apparatuses 1 according to the embodiments each include, as the calculation unit 2, the evaluation index calculation unit (vegetation index calculation unit 23), the filtering generation unit 24, and the filtering execution unit 26. The filtering execution unit 26 generates a filtering result image of an evaluation index image (vegetation index image) by using a filter image.

That is, filtering is performed on the evaluation index image (for example, a vegetation index image) according to a condition represented by the filter image (image corresponding to a filtering condition) to generate a filtering result image.

As shown in FIG. 10, filtering is performed on an NDVI image by use of the filter image. As a result, it is possible to generate a filtering result image by extracting a pixel satisfying a predetermined filter condition (for example, a vegetation image and a sunlit portion) represented by the filter image from among vegetation indices such as NDVI. Therefore, it is possible to extract only a portion of the vegetation index, desired to be used for evaluation, and to obtain a highly accurate evaluation result.

The information processing apparatuses 1 according to the embodiments each include, as the calculation unit 2, the evaluation index calculation unit (vegetation index calculation unit 23), the filtering generation unit 24, the filtering execution unit 26, and the presentation image generation unit 27. The presentation image generation unit 27 generates a presentation image by using a filtering result image.

The filtering result image is obtained by extraction of pixels from an image before filtering according to a condition represented by a filter image, and may not be suitable to be visually recognized by a person (an evaluation result may be difficult to understand) in some cases. Therefore, an image is generated in a state suitable for presentation to a person.

As a result, it is possible to provide a user with the result of evaluation of a measurement target based on a sampling image and filtering, in the form of an easily understandable image.

The presentation image generation unit 27 according to the embodiment divides the filtering result image into areas and generates a presentation image in which each area has been color-mapped (see FIGS. 11 and 12).

As a result, it is possible to provide a user with an image that enables the user to recognize an evaluation result on the basis of colors.

In addition, the presentation image generation unit 27 divides the filtering result image into areas, and generates a presentation image subjected to color mapping by use of the representative value of each area (see FIGS. 11 and 12).

A color is assigned to each area according to the representative value of the area, such as an average value, a maximum value, a minimum value, a centroid value, and a mode value. Thus, it is possible to provide a user with an image representing the evaluation result of each area that can be recognized by color.

Furthermore, the presentation image generation unit 27 divides the filtering result image into areas, and generates a presentation image by combining an image in which each area has been color-mapped and another image (see FIGS. 13, 14, 15, and 16).

A color-mapped image and another image are combined in the form of, for example, overlay, overwriting, or the like. As a result, it is possible to provide a user with an image that enables the user to recognize an evaluation result for each area by color while recognizing each area on the basis of the another image.

The another image in the above-described case is any of a sampling image (high-resolution image HR), an evaluation index image (vegetation detection image), a filter image, or a filtering result image.

As a result of combining a sampling image and a color-mapped image, it is possible to provide a user with an image that enables the user to recognize an evaluation result for each area by color while recognizing each area on the basis of the original image of the measurement target.

Furthermore, as a result of combining an evaluation index image and a color-mapped image, it is possible to provide a user with an image that enables the user to recognize an evaluation result for each area by color while checking the evaluation index image of each area.

In addition, as a result of combining a filter image and a color-mapped image, it is possible to provide a user with an image that enables the user to recognize an evaluation result for each area by color while recognizing a filtering condition represented by the filter image.

Moreover, as a result of combining a filtering result image and a color-mapped image, it is possible to provide a user with an image that enables the user to recognize an evaluation result for each area by color while recognizing each area as a filtering result.

The information processing apparatuses 1 according to the embodiments each include, as the calculation unit 2, the image composition unit 29 that combines a presentation image with a low-resolution image LR captured as an image of a measurement target lower in resolution than a sampling image (high-resolution image HR).

The presentation image is generated from a filtering result image, and the filtering result image is based on a sampling image. That is, the presentation image is based not on an image of the entire measurement target, but on an image of a part of the measurement target. Therefore, a presentation image is combined with a low-resolution image obtained by the imaging of a wider range than the sampling image.

As a result, it is possible to provide a user with an evaluation result shown with an image of the measurement target with a range wider than a range imaged as the sampling image.

The image composition unit 29 performs image composition by using correspondence information that associates a presentation image with the low-resolution image obtained by the imaging of a range including a sampling image that is the source of the presentation image (see FIGS. 17 and 18).

In a composition process, a presentation image for an imaging range of a sampling image is combined with a low-resolution image obtained by the imaging of a wider range including the imaging range of the sampling image. Therefore, the presentation image and the low-resolution image are combined by use of the correspondence information representing correspondence relationships such as information on an imaging position, information on imaging time, and the like.

As a result, it is possible to generate a composite image by accurately associating a presentation image with a low-resolution image of a section including the imaging range of a sampling image that is the source of the presentation image.

The image composition unit 29 performs composition in which a presentation image is disposed at a position corresponding to the imaging range of a sampling image that is the source of the presentation image in a low-resolution image LR (see FIGS. 17 and 18).

For example, in the composition process, a sampling image is overlaid or overwritten with a presentation image in a low-resolution image. In this case, the presentation image is disposed at the position corresponding to the imaging range of the sampling image in the low-resolution image. That is, the presentation image and the low-resolution image are aligned and pasted together.

As a result, it is possible to generate a composite image that clearly shows the position of the sampling image in the measurement target and provide the composite image to a user.

In the example of FIGS. 17 and 18, a part of a low-resolution image LR is overlaid or overwritten with a presentation image CP in units of sections (G #1 to G #LN: note that only G #10 to G #18 are shown, and the same applies hereinafter). Thus, the evaluation result of each section is easy to visually recognize.

The image composition unit 29 performs composition such that the representative value of the presentation image is reflected in the low-resolution image.

Thus, an image is generated in such a way as to reflect the representative value of a presentation image for each section. Thus, it is possible to provide a user with an image that enables the user to easily grasp the state of each section.

For example, a low-resolution image is combined with the representative value color of a presentation image for each section (G #1 to G #LN) in the example of FIGS. 19, 20, and 21. As a result, the evaluation result of each section is easy to visually recognize.

Furthermore, in the example of FIGS. 22 and 23, the quality of the evaluation result is determined from the presentation image for each section (G #1 to G #LN), and the result of the determination is represented in each section. This makes it possible to provide a user with an image that enables the user to recognize the quality of evaluation of a farm field or the like at a glance.

Moreover, in the example of FIGS. 24 and 25, low-resolution images are combined with the representative value colors of presentation images after the presentation images are aligned and arranged for the respective sections (G #1 to G #LN). As a result, it is possible to provide a user with an image showing the evaluation result of each section, which is easy to visually recognize, and also containing detailed information on the imaging range of a sampling image.

Note that a presentation image and a low-resolution image LR are combined in the examples of the embodiment. However, it is also conceivable that a low-resolution image LR is combined with a filtering result image before being processed into a presentation image. Moreover, it is also conceivable that a vegetation index image is combined with a low-resolution image LR, or a filter image is combined with a low-resolution image LR. These composite images may be output from the image output unit 30 and presented to a user.

The information processing systems according to the embodiments each include the information processing apparatus 1 described above and a multi spectrum camera (imaging device 250) that performs imaging to capture images in a plurality of different wavelength bands.

As a system for calculating the composition or state of a measurement target by optical measurement with a camera, for example, the normalized difference vegetation index (NDVI) using a near-infrared wavelength and a red wavelength is used for vegetation measurement.

In the case of imaging a large farm field, it is possible to perform exhaustive measurement of the entire farm field by capturing images a plurality of times with these cameras mounted on a flight vehicle and stitching the images.

Furthermore, at this time, analysis with higher accuracy and depth can be performed by use of high-resolution information (high-resolution image HR). For example, if imaging is performed with a resolution that enables soil and plants to be separated, only a plant portion can be extracted from an image by use of a certain NDVI threshold value in filtering. Then, NDVI is calculated only for that portion. As a result, it is possible to eliminate the influence of soil and improve the accuracy of NDVI. Furthermore, it is possible to improve the accuracy of NDVI by calculating NDVI only for a part of a leaf surface in the shade of another leaf.

However, a high-resolution image needs to be captured with a zoom lens or captured at a short distance. Therefore, a measurement range to be covered in a single imaging process is narrow. Thus, in a case where imaging of a wide range is attempted, a significant amount of time is required for measurement of the entire range.

In addition, comprehensive imaging of high-resolution images HR increases the size of measurement data, also increases time to upload data over a network, and also causes an increase in storage capacity in a case where storage of data is attempted.

Moreover, a multi spectrum camera capable of multi-wavelength imaging is generally lower in resolution than a camera for visible light imaging. Thus, the number of times imaging is performed increases when imaging of the same area is attempted with the same resolution.

These increases in imaging time and upload time are major issues in the field of agriculture where quick response is required in a case where pests and irrigation system failures are detected. Thus, it is not realistic to perform measurement over a wide range by means of high-resolution imaging and multi-wavelength imaging.

In view of this, imaging is performed as sampling imaging in the techniques according to the present embodiments. Therefore, although high-resolution imaging is performed so as to perform highly accurate analysis, it is possible to prevent an increase in imaging time and an increase in data size. That is, the entire range to be measured is not measured with a high-resolution image HR, but only a part thereof is sampled and measured in inspection of a measurement target. As a result, a measurement target extending over a wide range can also be measured and evaluated with high accuracy in a short time and at a low cost.

The present technology is not limited to that exemplified in the embodiments, and there are various possible modifications.

NDVI has been cited as an example of vegetation data. However, it is possible to use various vegetation indices as vegetation data. Examples of the various vegetation indices include the following.

PRI
Magnitude of chlorophyll fluorescence
State transition reflectance

PRI is an index of spectral reflectance that changes with deepoxidation of the xanthophyll cycle. The xanthophyll cycle is a mechanism that releases, as heat, excess light energy that cannot be used for photosynthesis. Examples of the mechanism includes stomatal blockage caused by strong light or water stress.

Here, PRI is calculated as follows.

$$PRI=(R570-R531)/(R570+R531)$$

Note that "R570" refers to reflected light intensity at a wavelength of 570 nm, and "R531" refers to reflected light intensity at a wavelength of 531 nm.

Note that PRI may be calculated as follows.

$$PRI=(R531-R570)/(R531+R570)$$

The definitions shown in FIG. 30 refer to either of the calculation methods described above. FIG. 30 shows the numerator portion of each of the formulas described above.

The magnitude of chlorophyll fluorescence may be the magnitude of solar-induced chlorophyll fluorescence (SIF) or the magnitude of chlorophyll fluorescence induced by use of a laser or LED instead of sunlight.

Stress detection can also be performed by use of chlorophyll fluorescence. Chlorophyll fluorescence is fluorescence to be emitted from plants in association with photosynthesis of the plants, and is a phenomenon in which if energy is not extracted within a certain period of time from a reaction center where electrons are excited by light, energy is released as fluorescence with a wavelength of approximately 680 nm to 770 nm in the case of higher plants.

The released energy is 0.5% to 3% of the energy of input light, and varies depending on the state of photosynthesis of the plants. The released energy varies in a case where there is a lot of excess light energy that cannot be used for photosynthesis, such as the case of stomatal blockage caused by strong light or water stress.

In addition, vegetation indices also include Green Normalized Difference Vegetation Index (GNDVI), Visible Atmospherically Resistant Index (VARI), and the like.

Visible Atmospherically Resistant Index (VARI) is an index that emphasizes vegetation in the visible part of the spectrum while reducing differences of sunshine and atmospheric effects. VARI is calculated as (Green−Red)/(Green+Red−Blue).

Furthermore, Crop Water Stress Index (CWSI) using thermal images and thermals can also be applied.

Vegetation of the farm field 300 has been set as the measurement target in the embodiments. However, this is an example. For example, the present technology can also be applied to vegetation observation of grass on athletic fields, such as a soccer field and a baseball field, and vegetation observation of a natural grassland, a forest land, a primary forest, and the like.

Furthermore, the techniques according to the present embodiments can be applied not only to the sensing of vegetation or the like, but also to various fields.

For example, it is conceivable that the techniques according to the present embodiments are applied to a system for measuring cell movement on the basis of sampling measurement in the field of life science.

In addition, the present technology can also be applied to the capturing of images such as an endoscopic image, a microscopic image, and a fundus examination image in the field of medical examination.

Moreover, the present technology can also be applied to the field of infrastructure inspection.

For example, as a mega solar inspection, it is possible to search for a defective portion on the basis of remote sensing with the flight vehicle 200 in an area where solar cell panels are located. The sampling measurement based on the high-resolution images HR according to the present embodiments is effective in this case.

Furthermore, the sampling measurement based on the high-resolution images HR according to the present embodiments is also effective in a case where a search is made for a defective portion in a concrete crack inspection of a target area on the basis of remote sensing with the flight vehicle 200.

In addition, although the flight vehicles 200 according to the embodiments are each equipped with a multi spectrum camera as the imaging device 250, it is also conceivable that an RGB camera, a thermal imaging camera, or the like is used as the imaging device 250.

The configurations described in the embodiments are examples.

For example, the flight vehicle 200 may be equipped with the calculation unit 2. Furthermore, a microcomputer in the imaging device 250 may function as the calculation unit 2.

A program according to the embodiment causes the CPU 51 of the computer apparatus 100 as shown in FIG. 3 to perform processes (the processes of FIGS. 6 and 7) of performing arithmetic processing on a sampling image, as a processing target, obtained by the imaging of a part of the range of a measurement target with a multi spectrum camera, and generating a calculation result image serving as evaluation information for the entire measurement target.

The information processing apparatus 1 according to the present embodiment can be easily implemented by such a program.

In addition, such a program can be previously stored in, for example, a built-in recording medium of an apparatus such as a computer apparatus, or a ROM in a microcomputer including a CPU. Alternatively, such a program can be stored temporarily or permanently in a removable recording medium such as a semiconductor memory, memory card, optical disk, magneto-optical disk, or magnetic disk. Moreover, such a removable recording medium can be provided as so-called package software.

Furthermore, in addition to being installed from a removable recording medium to a personal computer or the like, such a program can also be downloaded from a download site via a network such as a LAN or the Internet.

Note that the effects described in the present specification are merely illustrative and not restrictive, and other effects may also be achieved.

Note that the present technology can also adopt the following configurations.

(1)

An information processing apparatus including:

a calculation unit that performs arithmetic processing on a sampling image, as a processing target, obtained by imaging of a part of a measurement target with a multi spectrum camera, and generates a calculation result image serving as evaluation information for the measurement target.

(2)

The information processing apparatus according to (1) above, in which the calculation unit includes:

a filtering generation unit that generates a filter image that can be used for a filtering process, by using the sampling image.

(3)

The information processing apparatus according to (1) or (2) above, in which the calculation unit includes:

an evaluation index calculation unit that generates an evaluation index image by using the sampling image.

(4)

The information processing apparatus according to (3) above, in which the evaluation index image is a vegetation index image representing a vegetation index.

(5)

The information processing apparatus according to any one of (1) to (4) above, in which the calculation unit includes:

an evaluation index calculation unit that generates an evaluation index image by using the sampling image; and a filtering generation unit that generates a filter image that can be used for a filtering process, by using the evaluation index image.

(6)

The information processing apparatus according to any one of (1) to (5) above, in which the calculation unit includes:

an evaluation index calculation unit that generates an evaluation index image by using the sampling image; and a filtering generation unit that generates a filter image that can be used for a filtering process, by using a filter image generated by use of the sampling image and a filter image generated by use of the evaluation index image.

(7)

The information processing apparatus according to any one of (1) to (6) above, in which the calculation unit includes:

a filtering generation unit that generates a filter image that can be used for a filtering process; and a filtering execution unit that generates a filtering result image by using the filter image.

(8)

The information processing apparatus according to any one of (1) to (7) above, in which the calculation unit includes:

an evaluation index calculation unit that generates an evaluation index image by using the sampling image;

a filtering generation unit that generates a filter image that can be used for a filtering process; and a filtering execution unit that generates a filtering result image of the evaluation index image by using the filter image.

(9)

The information processing apparatus according to any one of (1) to (8) above, in which the calculation unit includes:

an evaluation index calculation unit that generates an evaluation index image by using the sampling image;

a filtering generation unit that generates a filter image that can be used for a filtering process;

a filtering execution unit that generates a filtering result image of the evaluation index image by using the filter image; and a presentation image generation unit that generates a presentation image by using the filtering result image.

(10)

The information processing according to (9) above, in which the presentation image generation unit divides the filtering result image into areas, and generates a presentation image in which each area has been color-mapped.

(11)

The information processing apparatus according to (9) or (10) above, in which the presentation image generation unit divides the filtering result image into areas, and generates a presentation image color-mapped by use of a representative value of each area.

(12)

The information processing apparatus according to (9) to (11) above, in which the presentation image generation unit divides the filtering result image into areas, and generates a presentation image by combining an image in which each area has been color-mapped and another image.

(13)

The information processing apparatus according to (12) above, in which the another image is any of the sampling image, the evaluation index image, the filter image, or the filtering result image.

(14)

The information processing apparatus according to any one of (9) to (13) above, in which the calculation unit further includes:

an image composition unit that combines a low-resolution image and the presentation image, the low-resolution image being obtained by imaging of the measurement target, as an image lower in resolution than the sampling image.

(15)

The information processing apparatus according to (14) above, in which the image composition unit performs image composition by using correspondence information that associates a presentation image with the low-resolution image obtained by imaging of a range including a sampling image that is a source of the presentation image.

(16)

The information processing apparatus according to (14) or (15) above, in which the image composition unit performs composition in which the presentation image is disposed at a position corresponding to an imaging range of a sampling image that is a source of the presentation image in the low-resolution image.

(17)

The information processing apparatus according to any one of (14) to (16) above, in which the image composition unit performs composition such that a representative value of the presentation image is reflected in the low-resolution image.

(18)

An information processing method to be performed by an information processing apparatus, the method including:

performing arithmetic processing on a sampling image, as a processing target, obtained by imaging of a part of a measurement target with a multi spectrum camera; and performing a process of generating a calculation result image serving as evaluation information for an entire measurement target.

(19)

A program that causes an information processing apparatus to perform:

arithmetic processing on a sampling image, as a processing target, obtained by imaging of a part of a measurement target with a multi spectrum camera; and a process of generating a calculation result image serving as evaluation information for an entire measurement target.

(20)

An information processing system including:

a multi spectrum camera that performs imaging to capture images in a plurality of different wavelength bands; and an information processing apparatus including a calculation unit that performs arithmetic processing on a sampling image, as a processing target, obtained by imaging of a part of a measurement target with the multi spectrum camera, and generates a calculation result image serving as evaluation information an entire measurement target.

REFERENCE SIGNS LIST

1 Information processing apparatus
2 Calculation unit
3 Flight control unit
21 Data input unit
22 Input buffer
32 Vegetation index calculation unit
24 Filtering generation unit
25 Calculation result buffer
26 Filtering execution unit
27 Presentation image generation unit
28 Output buffer
29 Image composition unit
30 Image output unit 30
31 User input unit
200 Flight vehicle
250 Imaging device
300 Farm field

The invention claimed is:

1. An information processing apparatus comprising:
a memory storing program code, and
a processor configured to execute the program code to perform operations comprising:
performing arithmetic processing on a sampling image, as a processing target, obtained by imaging of a part of a measurement target with a multi spectrum camera;
generating a calculation result image serving as evaluation information for the measurement target;
generating an evaluation index image by using the sampling image; and
generating a first filter image that can be used for a filtering process, by using the evaluation index image.

2. The information processing apparatus according to claim 1, wherein the operations further comprise:
generating a second filter image that can be used for the filtering process, by using the sampling image.

3. The information processing apparatus according to claim 1, wherein the evaluation index image is a vegetation index image representing a vegetation index.

4. An information processing apparatus, comprising:
a memory storing program code, and
a processor configured to execute the program code to perform operations comprising:

performing arithmetic processing on a sampling image, as a processing target, obtained by imaging of a part of a measurement target with a multi spectrum camera;

generating a calculation result image serving as evaluation information for the measurement target;

generating an evaluation index image by using the sampling image; and generating a first filter image that can be used for a filtering process, by using a second filter image generated by use of the sampling image and a third filter image generated by use of the evaluation index image.

5. The information processing apparatus according to claim 1, wherein the operations further comprise:

generating a filtering result image by using the first filter image.

6. An information processing apparatus, comprising:

a memory storing program code, and a processor configured to execute the program code to perform operations comprising:

performing arithmetic processing on a sampling image, as a processing target, obtained by imaging of a part of a measurement target with a multi spectrum camera;

generating a calculation result image serving as evaluation information for the measurement target;

generating an evaluation index image by using the sampling image;

generating a filter image that can be used for a filtering process; and generating a filtering result image of the evaluation index image by using the filter image.

7. The information processing apparatus according to claim 6, wherein the operations further comprise:

generating a presentation image by using the filtering result image.

8. The information processing apparatus according to claim 7, wherein the operations further comprise:

dividing the filtering result image into areas, and generating a presentation image in which each area has been color-mapped.

9. The information processing apparatus according to claim 7, wherein the operations further comprise:

dividing the filtering result image into areas, and generating a presentation image color-mapped by use of a representative value of each area.

10. The information processing apparatus according to claim 7, wherein the operations further comprise:

dividing the filtering result image into areas, and generating a presentation image by combining an image in which each area has been color-mapped and another image.

11. The information processing apparatus according to claim 10, wherein the operations further comprise:

the another image is any of the sampling image, the evaluation index image, the filter image, or the filtering result image.

12. The information processing apparatus according to claim 7, wherein the operations further comprise:

combining a low-resolution image and the presentation image, the low-resolution image being obtained by imaging of the measurement target, as an image lower in resolution than the sampling image.

13. The information processing apparatus according to claim 12, wherein the operations further comprise:

performing image composition by using correspondence information that associates a presentation image with the low-resolution image obtained by imaging of a range including a sampling image that is a source of the presentation image.

14. The information processing apparatus according to claim 12, wherein the operations further comprise:

performing composition in which the presentation image is disposed at a position corresponding to an imaging range of a sampling image that is a source of the presentation image in the low-resolution image.

15. The information processing apparatus according to claim 12, wherein the operations further comprise:

performing composition such that a representative value of the presentation image is reflected in the low-resolution image.

16. An information processing method to be performed by an information processing apparatus, the method comprising:

performing arithmetic processing on a sampling image, as a processing target, obtained by imaging of a part of a measurement target with a multi spectrum camera;

generating a calculation result image serving as evaluation information for the measurement target;

generating an evaluation index image by using the sampling image;

generating a filter image that can be used for a filtering process; and generating a filtering result image of the evaluation index image by using the filter image.

17. A non-transitory computer readable medium storing program code, the program code being executable by a processor to perform operations comprising:

performing arithmetic processing on a sampling image, as a processing target, obtained by imaging of a part of a measurement target with a multi spectrum camera;

generating a calculation result image serving as evaluation information for the measurement target;

generating an evaluation index image by using the sampling image;

generating a filter image that can be used for a filtering process; and generating a filtering result image of the evaluation index image by using the filter image.

18. An information processing system comprising:

a multi spectrum camera that performs imaging to capture images in a plurality of different wavelength bands; and a control unit configured to perform arithmetic processing on a sampling image, as a processing target, obtained by imaging of a part of a measurement target with the multi spectrum camera, generate a calculation result image serving as evaluation information for the measurement target, generate an evaluation index image by using the sampling image, generate a filter image that can be used for a filtering process, and generate a filtering result image of the evaluation index image by using the filter image.

* * * * *